United States Patent [19]

Berger et al.

[11] Patent Number: 5,740,278

[45] Date of Patent: Apr. 14, 1998

[54] FACSIMILE-BASED VIDEO COMPRESSION METHOD AND SYSTEM

[75] Inventors: Toby Berger; Yi-Jen Chiu, both of Ithaca, N.Y.

[73] Assignee: Cornell Research Foundation, Inc., Ithaca, N.Y.

[21] Appl. No.: 606,043

[22] Filed: Feb. 16, 1996

[51] Int. Cl.[6] .................................. G06K 9/36; H04N 7/12
[52] U.S. Cl. ........................... 382/232; 348/415; 348/416
[58] Field of Search ........................... 348/400, 415, 348/412, 417, 399, 700, 416; 382/238, 240, 232; 386/111; 375/246

[56] References Cited

U.S. PATENT DOCUMENTS

| | | | |
|---|---|---|---|
| 4,591,909 | 5/1986 | Kuroda et al. | 348/415 |
| 4,689,671 | 8/1987 | Ohki et al. | 348/416 |
| 5,008,748 | 4/1991 | Carr et al. | 348/417 |
| 5,323,247 | 6/1994 | Parker et al. | 358/456 |
| 5,363,139 | 11/1994 | Keith . | |

OTHER PUBLICATIONS

"Bayesian Block-Wise Segmentation of Interframe Differences in Video Sequences" Ken Sauer et al, CVGIP: Graphical Models and Image Processing, vol. 55, No. 2, pp. 129-139, Mar. 1993.

CCITT Recommendation T.4, "Standardization of Group 3 Facsimile Apparatus for Document Translmission" pp. 1-12.

Ebrahimi, Tourdj et al., "New Trends in Very Low Bitrate Video Coding", IEEE Proc., vol. 83, No. 6, pp. 877-891, Jun. 1995.

*Primary Examiner*—Leo Boudreau
*Assistant Examiner*—Wenpeng Chen
*Attorney, Agent, or Firm*—Jones, Tullar & Cooper, P.C.

[57] ABSTRACT

A method and system for compressing and decompressing video image data in real time employs thresholding and facsimile-based encoding to eliminate the need for computationally intensive two-dimensional transform-based compression techniques. The method operates first by forming a difference frame which contains only information pertaining to the difference between a current video image frame and a computed approximation of the video image frame. The difference frame is fed to a thresholder which categorizes each pixel in the frame as being either in a first set having intensities above or at a preset threshold, or a second set having intensities below a preset threshold. A facsimile-based compression algorithm is then employed to encode the first set of above or at threshold pixel locations. To compress the intensity data for each above or at threshold pixel, a quantizer and lossless encoder are preferably employed, with the quantizer serving to categorize the intensities by groups, and the lossless encoder using conventional coding, such as Huffman coding, to compress the intensity data further. Various techniques may be employed with the embodiments of the invention to adjust the actual amount of compressed data generated by the method and system to accommodate communication lines with different data rate capabilities.

46 Claims, 8 Drawing Sheets

FACSIMILE-BASED VIDEO COMPRESSION METHOD AND SYSTEM

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to a method and system for compressing and decompressing video and other image data in which difference frames are compressed in the spatial or spatio-temporal domain, rather than in the transform domain, by thresholding pixel values in the difference frames, and employing modifications of compression techniques from facsimile standards to represent the locations of the above-threshold pixels.

2. Description of the Background Art

Video compression in desktop computers usually is accomplished by means of special-purpose hardware, often referred to as video boards. By contrast, decompression of video representations prepared in conformance with the H.261 and MPEG-1 ITU standards now can be performed and displayed in full-color and near-full-motion (at least 15 and preferably 30 frames per second) in large formats, (240 horizontal and 320 vertical lines or more per frame) on workstations and high-end personal computers without the need for any special-purpose hardware. Indeed, software packages that achieve this decompression are available as freeware via ftp from various sites on the Internet.

Despite the above advances, video conferencing is not yet a household utility. In fact, it is not even ubiquitous in high-tech offices let alone general home and office environments. There are several factors responsible for this.

Perhaps the primary factor retarding widespread availability of video conferencing, desktop video telephony and distance learning is that the aforementioned video boards needed to do the real-time compression are expensive. Indeed, they sometimes cost almost as much as the entire desktop computer in which they reside. An extreme imbalance exists between the highly intensive computational demands of compression and the relatively mild computational demands of decompression in most video standards and, hence, in most video codecs (compressor/decompressors). This is attributable in the main to the use of block-based motion compensation during compression. Two-dimensional block-based transforms and lossless compression of quantized transform coefficients add to the computational burden, but it is motion estimation/compensation that accounts for at least 75% of the computational effort in most video compression algorithms. Although there are algorithms that eschew motion compensation, such as JPEG on the fly, they tend to consume some ten times more transmission bandwidth or storage space because they fail to capitalize on the heavy dependence that usually prevails between the content of successive frames of video, especially in video conferencing and distance learning applications.

The imbalance between the computational intensities of compression and decompression is not problematic in broadcast video and CD-ROM applications where video is played in real time but accessed in non-real time, so one does not mind that encoding is tens or even hundreds of times more difficult than decoding because the encoding can be done at relative leisure at sites that are highly computation-capable. Lacking in the present state of the art of desktop video conferencing is an approach that can eliminate the computational drain of motion compensation, and accordingly eliminate the need for expensive video cards, without incurring a significant reduction in compression factor or ratio for the same quality of the video stream.

Data compression methods which reduce computational intensity at the expense of a significant reduction of compression factor or ratio are not desirable because of transmission data rate limitations. More particularly, a second key factor deterring the widespread deployment of high quality desktop video systems is that full color, full motion, large format video requires transmission data rates of several megabits per second even after it has been compressed by state-of-the-art methods. Such bandwidth does tend to be available on modern local area computer networks, but on wide area networks, such as the Internet, it is available only sporadically and unreliably. The requisite bandwidth can be obtained for wide-area applications in a circuit-switched fashion by leasing lines from telephone and other communications companies, but the charge per minute of broadband connect time is prohibitive to the average user. It is therefore imperative that any video data compression method be able to provide as high a compression ratio or factor as possible to help mitigate this problem.

A third demand placed on desktop video systems is the need for simple and effective rate scalability. Specifically, it is necessary for the system to negotiate a quality of service consistent both with the capabilities of the network linking the transmitter and receiver, and the computational powers of the communicating computer platforms. In a manner quite analogous to that of fax machines and data modems, it is desirable for interactive video conferencing equipment to be able to conduct a handshaking process during the initiation of communication that negotiates the maximum data rate and the associated communication protocol consistent with the bandwidth of the connection and the computational abilities of the communication equipment at each terminal. Rate scalability is needed even in predominantly one-way video applications, such as CD-ROM video and video-on-demand, in which the delay that intervenes between when the video is compressed and when it is accessed, decompressed and displayed may be seconds or even years long. In such applications, it is necessary for the compression to be effected in such a way that decompression can be performed over a potentially broad range of data rates at various receivers that may differ appreciably in their abilities to access and to process the stored file of compressed video data.

Another set of rate scalability concerns arises in applications that involve broadcasting of multicasting of the video. Here, one wishes to transmit simultaneously to users whose available data rates and/or computational powers vary. In such cases, one seeks to establish a priority hierarchy for the compressed video data that permits coarse reconstruction of the video from only the highest priority data, and then progressively finer reconstruction by those to whom lower priority data also is available. Some video compression schemes are highly rate-scalable in the sense of allowing this sort of progressive refinement with minimal doubling and tripling of encoder computation and memory requirements, and little expansion in encoded output data rate over that which would have been needed to send to only the most capable of the receivers; others are not.

In view of the foregoing, it is apparent that in order for video conferencing to become ubiquitous in both home and office environments, an improved video compression technique is needed which (1) cuts or even eliminates costs of video boards without increasing the requisite transmission data rates for full motion video data, and (2) accommodates the scalability needs discussed above.

SUMMARY OF THE INVENTION

To address the foregoing problems, the present invention provides a system and method for compressing and decompressing data, such as video and other image data, which eliminates the need for computationally intensive two-dimensional transforms, but at the same time provides a high compression ratio. In addition, the invention provides a simple means by which the data rate can be adjusted in point-to-point applications, and some of its embodiments also readily accommodate progressive transmission. Hence, the rate scalability requirements of point-to-point, and of broadcast and multicast, can be accommodated.

To achieve high data compression without using two-dimensional transforms, all embodiments of the present invention employ two key steps in combination to process and compress data, particularly digital image data. The digital image data comprise digital representations, in the form of data words, of pixel locations and corresponding intensities in an image. In a video application, the image comprises a single video frame in a multiple frame video sequence. To simplify processing of a video sequence, each video frame in the sequence is compared with a computed approximation of that frame to form a digital image known as a difference frame which is comprised of pixel data words corresponding to the pixel-by-pixel differences between the current frame and the computed approximation. The computed approximation can be formed in various ways, such as from information derived from a previous frame in the video sequence, or by using a pixel-by-pixel estimation technique.

The key steps of the invention are then applied to the difference frame. The first of these is to threshold the difference frame by comparing each pixel intensity data word to a present threshold, and assigning a first digital value (e.g. 1) to each pixel location in a set of pixel locations in the difference frame each having intensities greater than or equal to the preset threshold. A second digital value, e.g. 0, is assigned to all of the remaining pixel locations, each of which has an intensity lower than the threshold.

The set of pixel locations having intensities at or above the threshold, i.e., those assigned digital value 1, is next compressed by using an algorithm based on an international facsimile compression standard, such as Group 3, Group 4 or JBIG. Although facsimile compression techniques were originally designed for use with black and white facsimile images, and thus can only be used for compressing pixel intensity data having only two different possible values, these techniques can be employed in the present invention with full motion, full color image data by virtue of the thresholding step which effectively divides the pixel intensity data into two single valued (e.g. 1 and 0) sets. The preset threshold is set high enough that the set of pixel locations above the intensity threshold in video conferencing scenarios typically is much smaller, e.g. less than 5%, than the total number of pixels in the difference frame. This greatly reduces the amount of data that needs to be compressed by the facsimile-based encoder. In addition, a conventional lossless encoding technique, such as a Huffman code, can also be employed to compress the data representations of the intensities for each of the above threshold pixels, and a quantizer may also be employed to reduce the total possible number of discrete above threshold intensities, thereby further facilitating compression of the data.

The present invention incorporates the basic concepts discussed above in a number of preferred embodiments, and variations thereof. These embodiments incorporate a number of other features of the present invention. For example, where the computed approximation of the image which is employed in forming the difference frame is computed based upon a previous frame in the sequence, motion estimation techniques can also be employed to further increase the accuracy of the computed approximation, at the expense of increased computational intensity. In addition, a temporal inner loop can be employed to provide the fax-based encoder with knowledge of the above threshold pixel locations in the previous frame during encoding of the current frame. This permits the fax-based encoder to represent the above threshold pixel locations in the current frame more efficiently and more effectively. Threshold adjust logic can also be provided for varying the threshold value from frame to frame. Alternatively, pixel to pixel threshold adjustment capability can be provided which allows the system to capitalize on limitations in the human visual system to appreciably improve the tradeoff between bit rate and picture quality. Finally, the difference frames can be formed using subtraction which is performed either on deinterlaced frame data or interlaced frame data. The interlaced embodiment can operate somewhat faster because subtraction can begin as soon as the first pixel of the first field of the interlaced frame is received instead of having to wait until after the first field has been fully received and deinterlacing of the first and second fields has begun.

BRIEF DESCRIPTION OF THE DRAWINGS

The foregoing and other features and advantages of the present invention will become apparent from the following detailed description of a number of preferred embodiments thereof, taken in conjunction with the accompanying drawings in which.

DETAILED DESCRIPTION OF THE PREFERRED EMBODIMENTS

A. INTRODUCTION

The present invention is preferably implemented by a number of preferred embodiments, all of which incorporate certain fundamental key concepts that result in a compression and decompression method and system which is particularly suited for use with video image data. The method and system does not require the use of computationally intensive transform coding, yet provides a high compression ratio with a capability for rate-scalable transmission to permit trading off bit rate for picture quality. Essentially, the invention makes possible the use of conventional encoding techniques for black and white facsimile image data as the core of a method and system for compression and decompression of full color, full motion video data. This is made possible by thresholding the magnitude of the intensity difference datum at each pixel for each video image frame, and then applying modified facsimile-based encoding techniques to the thresholded data.

Figure 1:
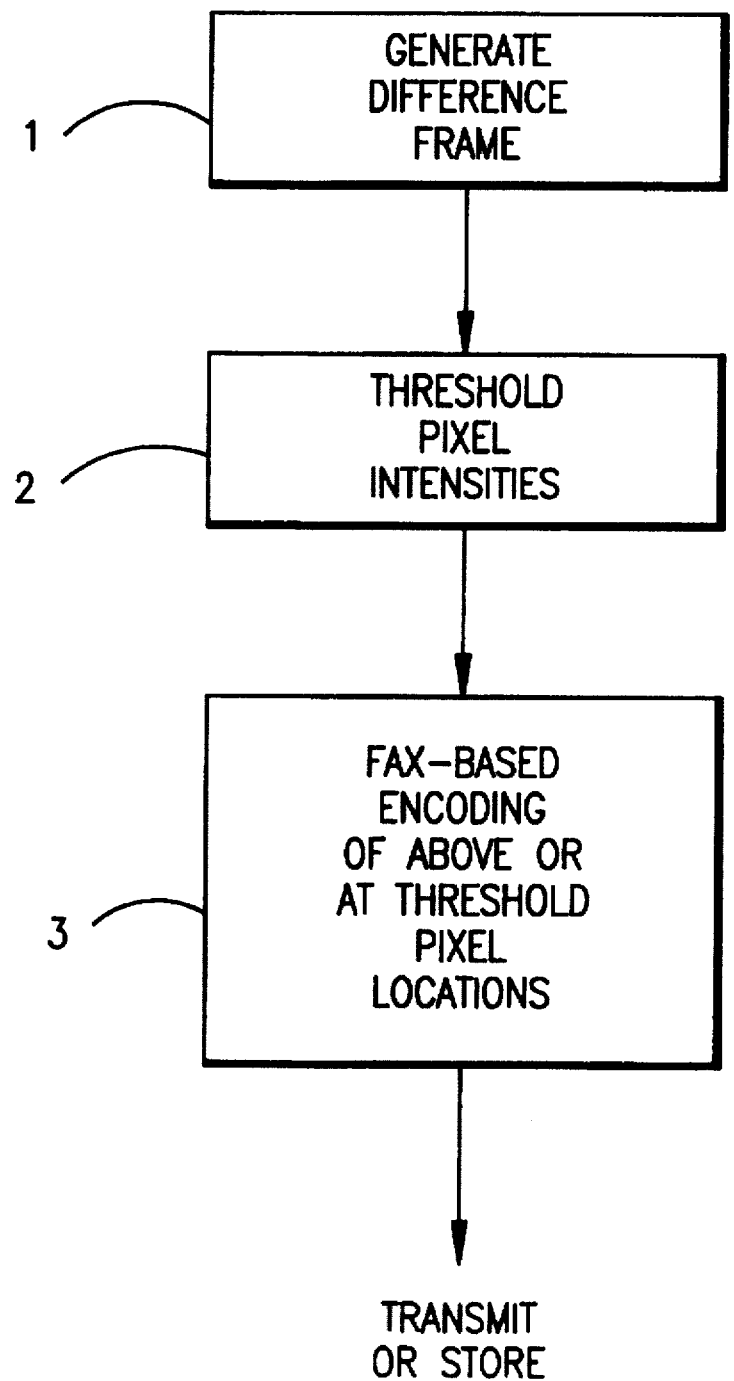
FIG. 1 is a flow chart illustrating the broad concepts which are employed in all of the preferred embodiments of the present invention.

FIG. 1 is a flow chart which illustrates the fundamental concepts of the present invention as applied to full motion video. Video image data is received for compression as a series of sequential frames. As discussed in greater detail below in conjunction with FIG. 2, each frame comprises a plurality of pixels, and each pixel is represented digitally by one or more data words identifying a pixel location and a pixel intensity. The first step implemented by all embodiments of the present invention to compress the video image data, as indicated at numeral 1 in FIG. 1, is to form a difference frame by calculating the pixel-by-pixel differences between the pixel intensities of the current frame and the pixel intensities of a computed approximation of the current frame. As will be discussed in greater detail in conjunction with the preferred embodiments illustrated in FIGS. 2-8, the computed approximation of the current frame can be formed using any of a number of techniques. For example, the information in the previous frame of a video sequence can be employed to form this computed approximation since successive frames in a video sequence typically do not differ very much from one another, especially in video conferencing applications where there is little movement of the objects in the images from frame to frame. The reason for forming the difference frame is to eliminate the need for repeatedly transmitting unnecessary data corresponding to portions of images which effectively do not change from frame to frame.

The difference frame pixel intensity data words are thresholded in step 2 to define the locations of two sets of pixels; those having an intensity and value above or equal to a predetermined threshold, and those having an intensity value below the predetermined threshold. The locations of the above or at threshold pixels in the first set are assigned a digital value, e.g. 1, while the locations of the below threshold pixels in the second set are assigned a second, e.g. 0, digital value, but are not employed any further in the compression of the current frame. At step 3, facsimile-based encoding is employed to compress the set of above or at threshold pixel location data which can then be either transmitted to a receiving device containing an appropriate decompressor, or stored for later transmission.

Although facsimile-based encoding normally can be employed only for encoding black and white images containing only two possible pixel intensity values, the thresholding at step 2 permits the use of this encoding technique as the core of a system and method for compression and decompression of full color, full motion video image data. Through proper selection of the threshold level, the number of pixels with intensities above or at the threshold level can be minimized (e.g. to only 2–5% of the total number of pixels), thereby substantially increasing the data compression ratio. In addition, rate scalability can be provided by adjusting the threshold as necessary to accommodate a particular data rate.

The method of the invention is preferably implemented using a system comprised of a compressor and a decompressor, both of which can be implemented using various combinations of hardware and/or software. Specific preferred embodiments and variations thereon of the compressors and decompressors of the present invention are illustrated in the block diagrams of FIGS. 2–8. To emphasize the distinction between the high-rate signals that have components at every pixel site in the basic raster scan of a video image, and the low-rate signals that have a totality of components that is only on the order of the total number of above threshold pixels, thicker lines have been employed in FIGS. 2–8 for the high-rate signals, while thin lines have been employed in the figures for low-rate signals. Any component receiving a thick line input must perform its function(s) at the high-rate (13.824 million times per second for full NTSC), whereas any component receiving only thin line inputs need perform its function(s) fewer than 300,000 times per second on the average, even for full frame NTSC at 30 fps. It is this distinction that accounts for how the present invention is capable, unlike its predecessors, of encoding large-frame, full-frame-rate video on desktop personal computers.

B. NON-MOTION COMPENSATED COMPRESSOR

1. OVERALL DESCRIPTION

Figure 2:
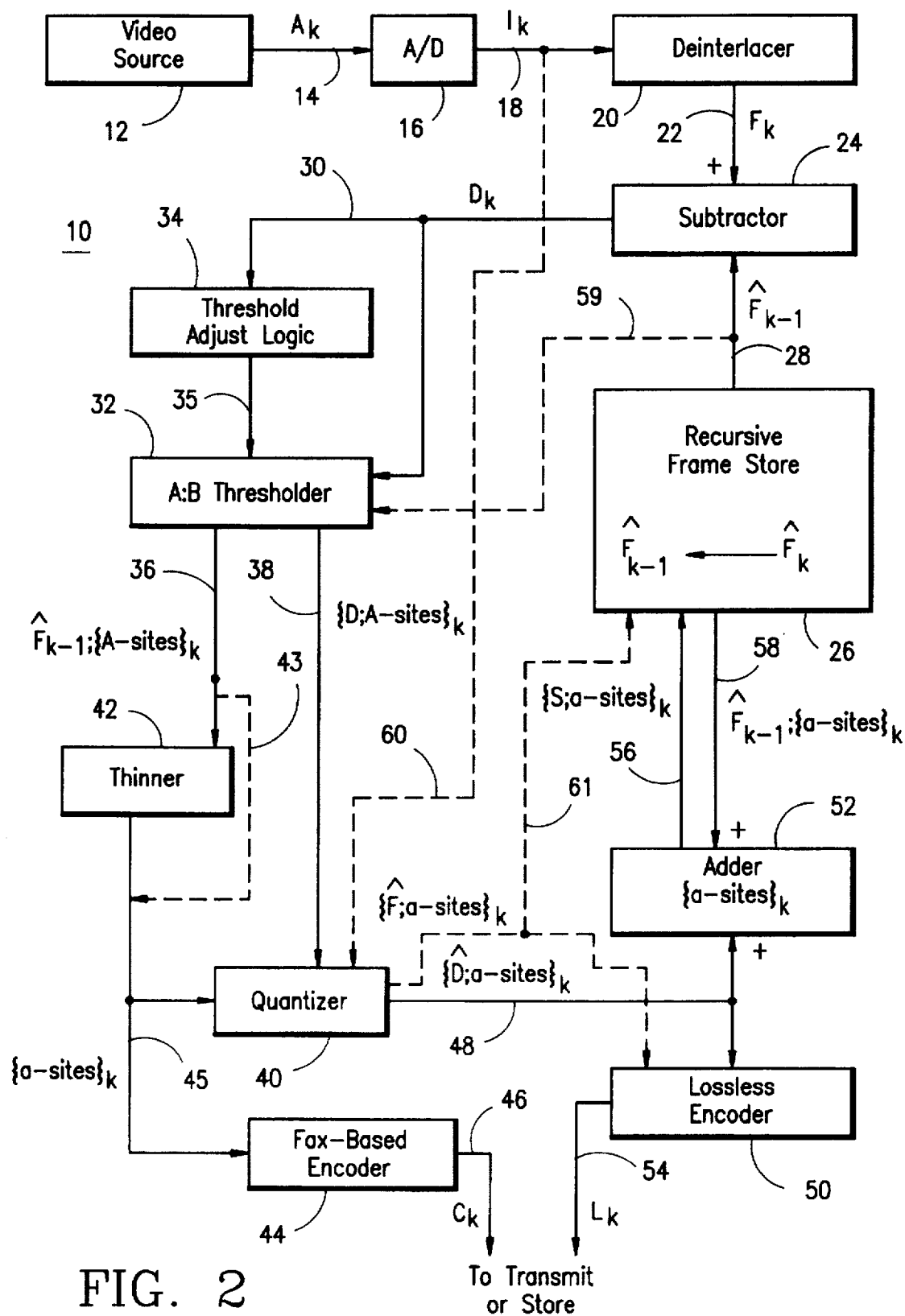
FIG. 2 is a block diagram of a video compressor constructed in accordance with a first preferred embodiment of the present invention.

Turning now to FIG. 2, a block diagram of a video compressor 10 which is employed in a first preferred embodiment of the present invention is illustrated. This embodiment employs "direct" subtraction to form difference frames, rather than motion compensated subtraction as is employed in a number of other conventional video compression schemes, as well as the embodiment of the present invention illustrated in FIG. 5. A video source 12, such as for example, a video camera, video cassette, broadcast television signal, or a movie film, produces an analog video output 14 that consists of a sequence or series of rectangular frames, the $k^{th}$ of which is denoted $A_k$. Typical frame rates are 30 frames per second (fps) for video and 16 to 24 fps for movies. In the event that the source 12 is a video camera or a video cassette, each frame will be comprised of m rows and n columns with typical values for m and n being 480 and 640, respectively, these being the values for the NTSC standard. Each row-column intersection point in the frame is called a pixel site. $A_k$ is produced by scanning the pixel sites, often via a so-called interlaced raster scan. An interlaced raster scan first proceeds from left to right along successive odd rows from top to bottom to produce the so-called odd field, and then similarly proceeds along successive even rows from top to bottom to produce the so-called even field. For each pixel site in the scan, an analog voltage level is produced with an amplitude that is proportional to the intensity of some optical signal in the frame at the pixel site. In some cases, this is done separately for each of the three primary colors, red (R), green (G) and blue (B), thus producing 3 mn analog pulses in all. In other cases, it is done for a luminance signal and also for two of each chrominance signals; each chrominance signal usually is subsampled, commonly by a factor of two in one or both of the horizontal and vertical dimensions.

The analog signals for each frame are then fed to a conventional analog-to-digital (A/D) converter 16 which demodulates the multiplexed analog signal and quantizes either the (R, G, B) or the luminance and chrominance voltage levels for each pixel site, and converts each to a J-bit data word, the usual value of J being 8. This yields a digital representation of $A_k$ which is denoted $I_k$. $I_k$ is fed from an output 18 of the A/D converter 16 into a deinterlacer 20 which inserts the successive rows of the even field between those of the odd field to obtain a digital representation of each input frame denoted by $F_k$. $F_k$ is formed of a plurality of data words, and comprises three components: a luminance frame $Y_k$ and two subsampled chrominance frames $U_k$ and $V_k$. It is implicit in all that follows that each frame referred to actually consists of a Y frame and subsampled U and V frames. This convention also extends to certain subsets of frames which will be subsequently introduced. Alternatively, the compression and decompression can be done for each of the R, G and B frames in primary color formats, but Y, U, V will be assumed for definitiveness.

In the embodiment illustrated in FIG. 2, difference frames are formed by direct pixel-by-pixel subtraction of the pixel intensities of a decompressed version of the previous frame in the sequence from the current frame pixel intensities; the decompressed version of the previous frame representing a computed approximation of the current frame. (In other embodiments of the present invention, as will be discussed below in conjunction with FIG. 5, the difference frames are formed by subtracting a motion compensated version of the previous frame from the current frame through use of employing conventional motion compensation techniques.) To accomplish this direct subtraction, the input frame $F_k$ is fed through an output 22 from the deinterlacer 20 to a first, + input of a subtractor 24. The previous decompressed frame denoted by $\hat{F}_{k-1}$ is fed from a recursive frame store memory 26 through an output 28 to a second, — input of the subtractor 24. The subtractor 24 performs pixelwise subtractions to produce a difference frame $D_k$. That is, the intensity at each pixel site in $\hat{F}_{k-1}$ is subtracted from the intensity of the corresponding pixel site in $F_k$ to produce the intensity at that pixel site in $D_k$. In the preferred embodiments of the invention, the intensities in $F_k$ and in $\hat{F}_{k-1}$ are represented by fixed-point J–bit integer data words, so the subtraction can be performed by fixed point, as opposed to floating point arithmetic. The resulting intensities in $D_k$ therefore are J+1–bit integers consisting of a sign bit and J magnitude bits. Often, the least significant of these J magnitude bits is discarded.

The difference frame $D_k$ is fed from an output 30 of the subtractor 24 to both an A:B thresholder 32 and a threshold adjust logic 34 which controls the threshold value of the thresholder 32 through a control line 35. (The threshold adjust logic 34 can be deleted, if desired.) In the A:B thresholder 32, the sign-bit at each pixel site in the difference frame is ignored, and the magnitude of the intensity in the difference frame at each pixel site is compared to a threshold that is kept fixed for the duration of the frame, but may be varied by the threshold adjust logic 34 from frame-to-frame or pixel-to-pixel (the operation of the threshold adjust logic 34 is discussed in detail later). If the intensity at a pixel site in $D_k$ is at or above the threshold, that location is denoted an A-site for frame k; if it is below the threshold, that location is denoted a B-site for frame k. Intensities at A-sites are called high-intensity differences, while intensities at B-sites are called low-intensity differences. The A:B thresholder 32 outputs the set of A-sites for frame k, denoted by $\{A\text{-sites}\}_k$, and the pixel intensity values from $D_k$ at each of the A-sites for frame k, denoted compactly as $\{D; A\text{-sites}\}_k$; through first and second outputs 36 and 38, respectively, to a quantizer 40; the set of A-sites being fed first through a thinner 42 described below. (The thinner 42 can be eliminated or bypassed, if desired, as indicated by the dashed line 43.) It should be noted that the B-sites for frame k are "zeroed" by the thresholder 32, and are not employed any further in processing the current frame.

The quantizer 40 quantizes the difference intensities in $D_k$ at the $\{A\text{-sites}\}_k$. Either a vector or a scalar quantizer could be used for this. The result is a set of approximations $\{\hat{D}; a\text{-sites}\}_k$ to the intensities of the difference frame at the A-sites in the $k^{th}$ frame. Vector quantization is more complicated, but can take advantage of dependencies between the intensity levels of neighboring high-intensity pixels. The simplest example of this is when the difference is quantized between the D-value at the next of the A-sites and the $\hat{D}$-value at the previous A-site. This has been found to save data rate, especially in the case of scan-contiguous A-sites.

The thinner 42 is preferably interposed between the $\{A\text{-sites}\}_k$ output 36 of the A:B thresholder 32 and the quantizer 40. The thinner 42 implements an algorithm that deletes certain elements of $\{A\text{-sites}\}_k$ to form a reduced, or thinned, set which is denoted $\{a\text{-sites}\}_k$. A typical thinning algorithm is to delete every A-site that is isolated in the sense that none of its immediate neighbors to the north, east, south or west is an A-site. Similar thinning algorithms would use all eight nearest neighbors—north, northeast, east, . . . . , northwest. The thinner 42 may also store its input $\{A\text{-sites}\}_{k-1}$ from the previous frame and/or its own output $\{a\text{-sites}\}_{k-1}$ from the previous frame. Then it may determine whether or not a pixel site belonging to the $\{A\text{-sites}\}_k$ is isolated, and hence should be deleted, by referring not only to which of its four or eight nearest neighbors in frame $k^{th}$ are A-pixels, but also to which of its immediate neighbors, itself included, were A-pixels and/or a-pixels in frame k–1.

The thinned set of above-threshold pixel locations, $\{a\text{-sites}\}_k$ k, is also fed through a line 45 to a key element of the present invention, a fax-based encoder 44. The fax-based encoder 44 calculates a compressed representation of the $\{a\text{-sites}\}_k$, which is denoted $C_k$, and is fed on an output 46 either for transmission or for storage. The set $\{a\text{-sites}\}_k$ identifies only the locations of the above-threshold pixels each by a single digital value, e.g. 1. Therefore, facsimile-based encoding, which discriminates only between black and white, and not gray-scales or magnitudes, is particularly suited for compressing $\{a\text{-sites}\}_k$. In most images sent by facsimile, the cardinality of the set of black pixels is usually much smaller than the cardinality of the set of white pixels. The video compressor 10 capitalizes on the analogous fact that the cardinality of $\{a\text{-sites}\}_k$ usually is much smaller than that of the remainder of the sites in the raster scan. Accordingly, by associating $\{a\text{-sites}\}_k$ with the black pixels on a fax image, and the remainder of the sites with the white pixels on a fax image, the fax-based encoder 44 can achieve a highly efficient representation of $\{a\text{-sites}\}_k$ by using an appropriately modified version of any of the three internationally standardized fax encoding techniques—Group 3, Group 4 or JBIG, as described below.

Group 3 fax encoding treats each line of a fax image independently of all other lines. Starting from the left end of the line, a Group 3 fax encoder parses the line into a run of white pixels of a specified length (length zero if the first pixel is black), followed by a run of black pixels of some specific length, followed by another white run, then another black run, and so forth. The Group 3 fax encoder then alternates between one modified Huffman code matched to the statistics of runs of white pixels and another match to the statistics of runs of black pixels in order to compress losslessly, the length of the successive runs in the parsing. In the present invention, the Group 3 algorithm is modified because the statistics of the lengths of runs of A-pixels and of non-A-pixels differ from those for black and white runs in typical fax documents. This leads to different Huffman codes. Moreover, close to half the runs of A-pixels are of length one, even in the embodiment of FIG. 2 in which direct subtraction is employed. (In embodiments of the present invention that employ motion compensation, an even higher percentage of the runs A-pixels are length one.) Accordingly, in some embodiments of the present invention, only the runs of non-A-pixel lengths are Huffman coded, with situations in which two A-pixels abut in a line handled by considering them to be separated by a run of non-A-pixels of length zero. As in Group 3 fax, an escape code is used when a run length equals or exceeds 64 (64 is the default value; a different positive integer could be used instead). The run length L is then encoded by sending the Huffman word for "escape", followed by Huffman words for the integer M and the integer 0<B<63 for which L=64M+B. Also, a special end-of-line (EOL) character is used to signal the end of the line, which helps maintain synchronism between the compressor and the decompressor. If an EOL is received before the whole line has been filled, the line is completed with B-sites (the analog of white pixels). This also permits some data rate to be saved; whenever a line ends in a long string of B-pixels, the EOL character is simply sent instead of actually coding the run length.

Group 4 fax encoding encodes each line of a fax image relative to the line immediately above it, referred to as the reference line. Like a Group 3 fax encoder, a Group 4 fax encoder parses each line into a run of white pixels, followed by a run of black pixels, followed by another white run, then another black run, and so forth. Instead of encoding these run lengths absolutely as in Group 3, the Group 4 algorithm codes them differentially relative to the end points of runs on the reference line using the so-called READ (Relative Element Address Designate) algorithm. If the run being encoded ends horizontally within three or fewer pixels of where a recursively updated run on the reference line ends, one of seven Huffman code words is sent to indicate how much longer the current run is than the reference run, namely, $-3, -2, -1, 0, 1, 2$ or $3$. If the current run is more than three longer than the reference run, a Huffman code signaling the pass mode is sent, whereupon the reference run is updated to the next run of the same color on the reference line and coding continues relative to that run's end point. If the current run is more than three shorter than the reference run, a Huffman code signaling the horizontal mode is sent, whereupon the length of the current run is coded as in Group 3 fax coding.

The JBIG fax standard is a more advanced compression algorithm based on arithmetic coding. It requires considerably more computation than Group 3 or Group 4, but achieves somewhat better compression for certain sorts of fax images, especially half-toned images. The JBIG standard is well known to anyone of skill in the art, so it is not described in detail here. In order to apply the JBIG algorithm to describe $\{a\text{-sites}\}_k$ in the video compressor 10, the present invention employs some modifications. Specifically, the 10 pixels that constitute the so-called "context" were selected for JBIG based on an extensive study of representative fax documents. (There is a mode in which only 9 are selected and the 10th is determined adaptively as the image is being processed.) A similar study of sets of A-pixels from frames of representative videos and/or movies yields a slightly different set of pixels for the context.

Returning now to the quantizer 40, the set of approximations $\{\hat{D}; a\text{-sites}\}_k$ to the intensities in the difference frame at the a-sites in the $k^{th}$ frame is fed on an output 48 to a lossless encoder 50 and an adder 52. The lossless encoder 50 produces a losslessly compressed representation of $\{\hat{D}; a\text{-sites}\}_k$, denoted by $L_k$, which is transmitted on an output 54 along with $C_k$ from the fax-based encoder 44. To produce the losslessly compressed representation, the lossless encoder 50 typically implements a Huffman code matched to the long-run statistics of $\hat{D}$'s as determined from analysis of many video clips.

The adder 52 is disposed in a feedback loop of the compressor 10, and sends a signal through an output 56 to the recursive frame store 26. In response to this signal, the recursive frame store 26 sends back to the adder 52 through an output 58, the intensity values in the previous decompressed frame $\hat{F}_{k-1}$ at each of the pixel sites in $\{a\text{-sites}\}_k$. The adder 52 adds the $\hat{D}_k$ and the $\hat{F}_{k-1}$ values at each pixel site in $\{a\text{-sites}\}_k$, thereby producing the sum $S_k=\hat{D}_k+\hat{F}_{k-1}$ at $\{a\text{-sites}\}_k$, which is conveyed through the output 56 back to the recursive frame store 26. This recursion updates the contents of the frame store 26 from $\hat{F}_{k-1}$ to $\hat{F}_k$ by inserting the values $S_k$ at $\{a\text{-sites}\}_k$. An interpolation scheme, described subsequently, is preferably employed that makes adjustments in the intensities in $\hat{F}_k$. When the $k+1^{st}$ frame is received from the source 12, the updated compressed frame $\hat{F}_k$ will be read out to the subtractor 24 on the output 28 in the same manner that $\hat{F}_{k-1}$ was earlier read out to the subtractor 24 for comparison with the $k^{th}$ input frame $F_k$.

2. THRESHOLD ADJUSTMENT

The threshold adjust logic 34 provides the present invention with flow control. Without the threshold adjust logic 34, the number of A-sites can vary significantly from frame to frame. This may occasion one or more of the following undesirable results: (1) the need for buffering in the compressor, (2) the need for buffering in the decompressor, and (3) increased latency (i.e., end-to-end delay) through the compressor, the transmission or storage channel, and the decompressor. Whether each of these effects occurs depends on the content of the video, the speeds of the processors in the compressor and decompressor, and either the transmission speed of the channel linking them, or the time it takes them to access shared memory into which the compressor can write and from which the decompressor can read. However, the use of a fixed threshold also provides the highly desirable result that the quality of the decompressed video remains nearly constant over a broad range of activity level in the video or movie that emanates from the source 12.

In one variation of the invention, the threshold adjust logic 34 calculates a different threshold for each frame. The motivation for this usually is to achieve a degree of flow control by keeping the number of pixels that are designated to be A-sites from varying significantly from frame to frame. One way to do this is to keep histogram counts of the number $n_0$ of intensity difference magnitudes in the frame that are zero, the number $n_1$ that are 1, the number $n_2$ that are 2, and so on through sum $n_m$ where m usually is in the vicinity of twice the average, or nominal, threshold. If in a given application approximately J above-threshold pixels per frame are desired, the threshold adjust logic 34 simply determines the smallest m such that the sum of $n_0, n_1 \ldots n_m$ is greater than or equal to RC−J, where R and C are the numbers of rows and columns, respectively, in the component (Y,U or V, or R, G or B) currently being encoded, and sets the threshold for the current frame at this value of m. This flow control method has the advantage that it tightly governs the number of A-sites in each frame. A disadvantage is that the differences in histogram counts must be calculated for the entire frame before any site can be declared an A-site, and this increases the end-to-end latency.

Another flow control method overcomes these disadvantages by using an estimated threshold for the current frame that is calculated from the number of A-sites in the previous frame. Specifically, if the number of A-sites in the previous frame was below J, then the threshold is lowered by one provided it is not already at the lowest permissible value which is usually fixed at about half the nominal threshold value. Should the number of A-sites in the current frame using this estimated threshold reach the maximum permissible value J before the whole frame has been scanned, then only the first J above-threshold sites in the current frame are designated as A-sites. This rarely is serious in a head-and-shoulders video because the latter, or lower, part of the scan contains information that tends to be less crucial. The threshold is then raised by one, provided it is not already at the maximum permissible value, and then the compressor proceeds to the next frame. This flow control method permits A/B-site designations to be done on the fly. Also, its adaptive threshold estimates are easy to compute and it may allow a larger value of J to be used than does the previous method because it sometimes designates fewer than J A-sites. In a variant of this second method, the threshold adjustment for the current frame can be calculated from the total number of bits sent to describe the previous frame instead of from the number of A-sites in the previous frame. It should be noted that the decompressor does not need to be told which flow control method, if any, is in use; it needs only to be told for each frame which pixel locations are A-sites and which are not.

Another way to trade bit rate off against quality, known as decimation, is to leave out half the pixels during one frame (i.e., declare them to be B-sites a priori) and then the other half of the pixels during the next frame. This could be done by leaving out every other diagonal during frame 1 and then leaving out the other diagonals instead during frame 2. This might be repeated during frames 3 and 4, or perhaps rows could be decimated during frames 3 and 4, columns during frames 5 and 6, and so on. Pseudorandom decimation patterns also could be employed with the advantage that the artifacts introduced would be less perceptible. Decimation cuts the bit rate and the computational effort in half while retaining full resolution, though some degradation in the ability to follow rapid motion results. Decimation by factors other than two is possible, of course.

The threshold adjust logic 34 can also vary the threshold from pixel-to-pixel in each frame in a manner that depends on the intensity value at that pixel location in $\hat{F}_{k-1}$ (and on other nearby, previously-processed pixel intensities in the present and previous frame) as conveyed to the A:B thresholder 32 from the output 28 of the recursive frame store 26 through an optional line 59. Psychophysical experiments have revealed that the human eye is most sensitive to changes in intensity at mid-range values of the gray scale, and is less sensitive at either extreme. Accordingly, the threshold may be set higher where the intensity at the pixel in question in $\hat{F}_{k-1}$ is either large or small as opposed to where it is intermediate in intensity. These perceptual variations in threshold difference intensity may be different for U and V than for Y; they also may differ over R, G and B. Capitalizing on these traits of human perception can lead to appreciable improvements in the tradeoff of bit rate and picture quality at a minimum increase in computational effort.

3. RATE-SCALABILITY

A rate scalable transmission mode can also be employed if desired. Rate-scalability is a desirable property of data compression schemes, and is concerned with situations in which individuals with varying degrees of resources for communication and computation at their disposal wish to access the same information stream. Suppose, for example, that three individuals wish to communicate with one another, but that the bit rates with which each individual's equipment can receive and process data differs from each other. If all three individuals are interested in the video sequence being compressed by the present invention, then it is necessary to provide compressed information in the form of three substreams, each with a different data rate.

One way to provide such rate scalability in the above scenario is to use three different thresholds in the threshold adjust logic 34. This leads to three different numbers of A-sites being generated by the A:B thresholder 32. The compressor 10 first calculates a fax-based video representation using the highest threshold and the approximation to the current frame computed by the individual having the lowest bit rate capability. This results in the A-sites for use in transmitting data to said individual. The compressor 10 then calculates another fax-based video representation for the second threshold using the intermediate capability user's approximation to the current frame, which generates a set of A-sites that partially overlaps those that were generated using the first threshold. The thinner 42 can eliminate all A-sites in the intersection of these two sets when forming the a-sites for the intermediate capability user. This process is then repeated again for the lowest threshold which generates another set of A-sites. The result of this process is three "thinned" faxes for each frame, only the first of which is sent to the individual with the lowest bit rate capability, the first two of which are sent to the individual with the second highest bit rate capability, and all three of which are sent to the individual with the highest bit rate capability.

The A-sites in each of these "thinned" faxes are separated by runs of B-sites that, on average, are longer than the runs in the one fax which would have been sent if rate scalability were not being employed. Accordingly, it is desirable to use a different run-length compression code for these thinned faxes. Therefore, the decision to switch to a rate-scalable mode should be made only if merited by the tradeoffs among the compressed data rates and distortions.

Another means for providing rate-scalability which can either be used with, or instead of, the threshold adjustment rate scalability described above, is by causing the quantizer 40 to progressively quantize the above-threshold differences. In other words, a coarse representation of these differences could be sent to the individual with the lowest bit rate capability, while progressively more refined representations could be sent to the individuals with the higher and higher bit rate capabilities. It would be necessary, however, for the encoder 50 to calculate and store each individual's decoded version in its feedback loop.

There is a less compressive but more robust modification of the system 10 in which the input intensities $\hat{F}_k$ (or $\hat{I}_k$ in deinterlaced cases) are fed to the quantizer 40 directly from the A/D converter 16 through an optional A/D output line 60, and are quantized at each pixel location in $\{a\text{-sites}\}_k$. In this mode, standard progressive quantization schemes can be used for purposes of rate scalability. Also, there is robustness to channel errors because a pixel is refreshed absolutely (to within the quantization error) at each time k that it belongs to $\{a\text{-sites}\}_k$. In this mode of operation, the adder 52 is not needed because the output of the quantizer 40 directly updates the contents of the recursive frame store 26 with {F̂; a-sites}$_k$ through an optional line 61. (The lines 60 and 61 are illustrated as dashed lines in FIG. 2 to denote them as being optional.)

C. COMPRESSOR WITH INTERLACER

Figure 3:
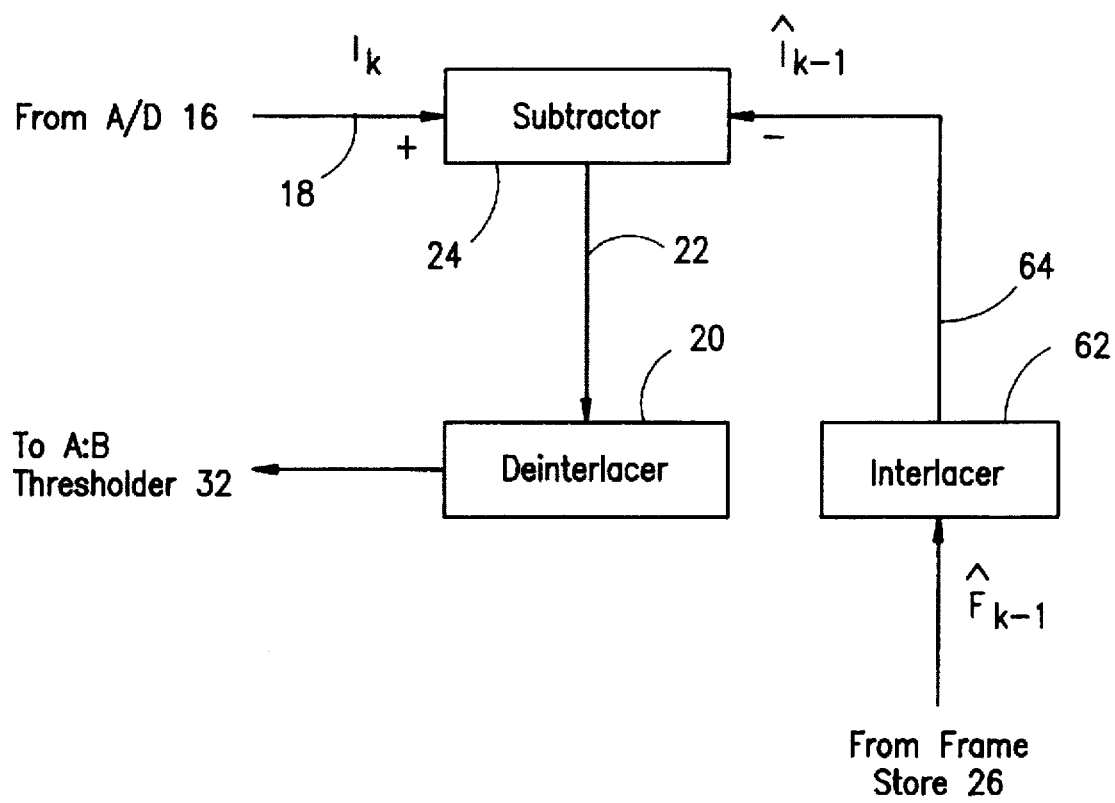
FIG. 3 is a block diagram of a modification to the compressor of FIG. 2 which is constructed in accordance with a second preferred embodiment of the present invention.

FIG. 3 illustrates a modification of the compressor 10 of FIG. 2 in which the relative positions in the compressor 10 of the deinterlacer 20 and subtractor 24 are interchanged so that direct subtraction is performed before the frames are deinterlaced. This requires that an interlacer 62 be placed between the output 28 of the recursive frame store 26 and the minus input of the subtractor 24 so that the subtractor 24 receives interlaced frames on both of its inputs from the output 18 of the A/D converter 16, and an output 64 of the interlacer 62. This variation of the present invention has the advantage that subtraction can begin as soon as the first pixel of the first field of the interlaced version $I_k$ of the $k^{th}$ frame is received, instead of having to wait until after the first field has been fully received and deinterlacing of the first and second fields has begun. This reduces latency by half a frame interval, which can be important in certain applications. However, some A/V boards that come with desktop computers render the frames to the CPU already interlaced (and perhaps with other video format transformations already performed). Accordingly, whether the technique of FIG. 2 or modification of FIG. 3 would be the more preferred depends upon the application at hand. Although the operation performed by the interlacer 62 is a trivial one, it nonetheless must be performed at the high pixel scan rate, and therefore contributes non-negligibly to the computations that must be performed.

D. COMPRESSOR WITH TEMPORAL INNER LOOP

Figure 4:
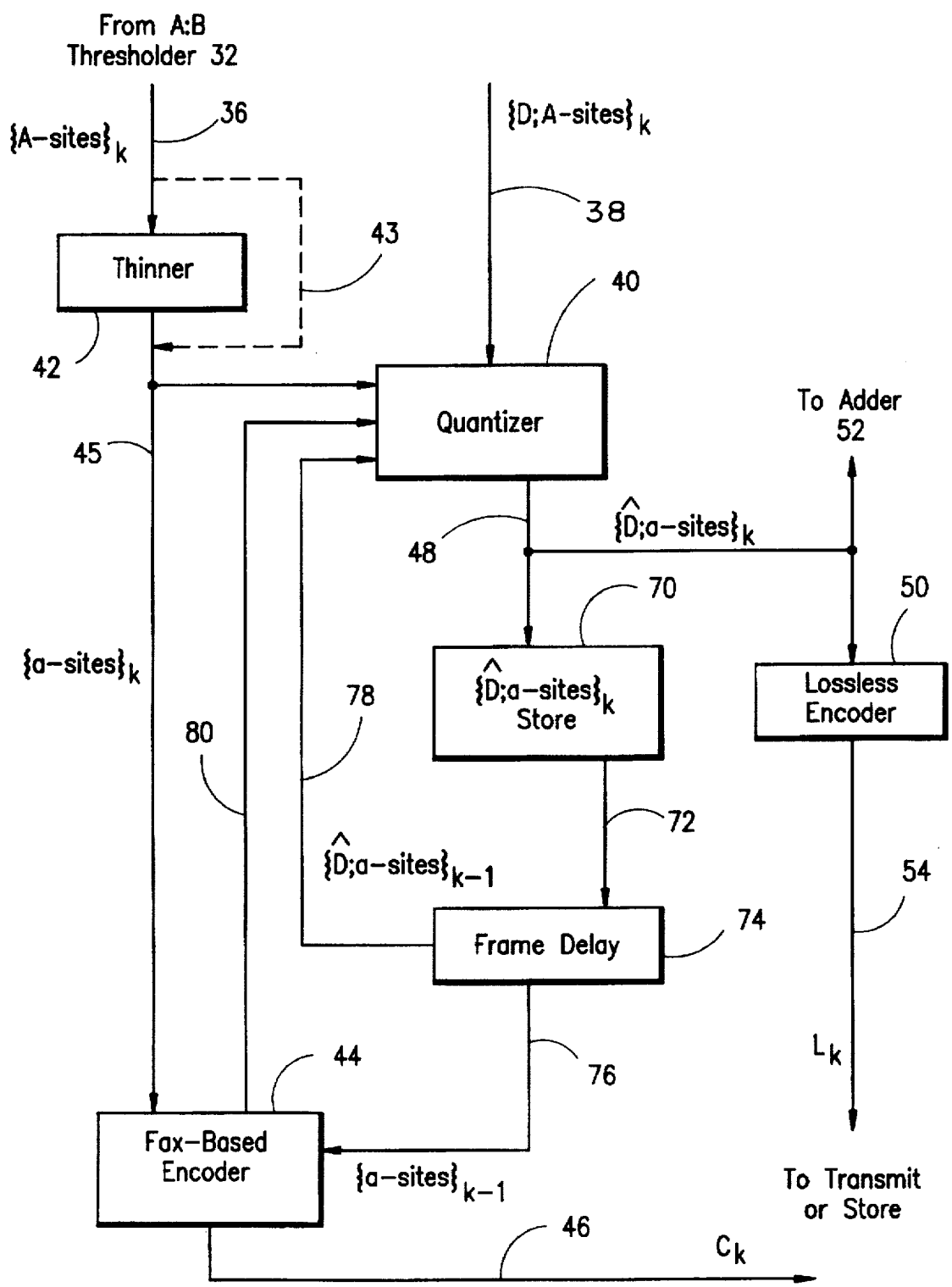
FIG. 4 is a modification to the compressor of FIG. 2 which is constructed in accordance with a third preferred embodiment of the present invention.

The modification of the compressor 10 illustrated in FIG. 4 couples a temporal inner loop with direct subtraction. It differs from the embodiment of FIG. 2 only in that the D̂-values at the a-sites are additionally fed from the output 48 of the quantizer 40 into a store 70. An output 72 of the store 70 then feeds these values to a frame delay 74 which has a first output 76 that feeds the locations of the previous frame's a-sites to the fax-based encoder 44, and a second output 78 which feeds the D̂ values of frame k−1 back to the quantizer 40. Accordingly, the fax-based encoder 44 knows the a-sites in the previous frame of the video sequence when it encodes the a-sites of the current frame. Since this information has also been transferred earlier to a decompressor (to be discussed in greater detail below in conjunction with FIGS. 6–8) in a losslessly encoded form $L_{k-1}$, the fax-based encoder 44 can capitalize on it in order to represent the a-sites in the current frame more efficiently, and more effectively with assurance that the decompression system's reconstruction of the video sequence will not drift away from that of the compressor 10.

In particular, knowledge of {a-sites}$_{k-1}$ allows the Group 4 version of the fax-based encoder 44 to use one or more lines in the previous decompressed frame as reference lines for the line being encoded in the present frame. This permits hybrid versions of the Group 4 algorithm. For example, the present line might be compressed via modified Group 4 by first using the preceding line in the present frame (spatial compression) and then using the same line in the previous frame (temporal compression). One bit could then be sent at the beginning of the coded representation of the line (that is, after the EOL symbol for the previous line) to signal whether the spatial or the temporal reference line is being used, followed by the Group 4 compression with respect to the specified reference line. Since objects sometimes translate vertically from one frame to the next, it can help to use lines in the previous frame located a line or two above and below the line currently being encoded. For example, in one implementation of the temporal-mode Group 4 fax-based encoder 44, the following points are employed as the possible relative address designates in the modified READ scheme: (1) points displaced horizontally within ±-2 on the same line in the previous frame; (2) points within ±-1 on the lines immediately above and below in the previous frame; and (3) points at zero displacement in the previous frame on lines two above and below the current line. This results in 5+2.3+2.1=13 default elements to try before having to resort to the pass mode or the horizontal mode. By always breaking ties between these possibilities in an optimal way, the distribution of these 13 possibilities is made maximally skewed, thereby enhancing the efficiency of the Huffman coding so that it is still effective, even though there are a larger number of possibilities than the seven default values in 0, ±1, ±3) used in spatial Group 4.

There are also other advantages that accrue from incorporating a temporal inner loop as in FIG. 4. One is that, whenever the temporal Group 4 fax-based encoder 44 is forced to enter the horizontal mode because the run on the current line is too short compared to any of the reference points in the constellation, it is an indication that the high-intensity pixel at the end of the current run is likely to be part of a feature in the current frame that was not present in the previous frame, as opposed to something that was present nearby in the previous frame and merely translated somewhat horizontally and/or vertically (or rotated slowly) between the previous and present frames. Experimentation has shown that distinguishing those a-pixels that temporal Group 4 must encode by recourse to the horizontal mode as innovative pixels gives sensitivity to features in the video or movie that are non-rigid, such as moxing eyes and mouths. Since the decompressor is informed via the fax-based code of which a-pixels are innovative in this sense, an additional output 80 can be provided from the fax-based encoder 44 which is connected to the quantizer 40. This enables the quantizer 40 to receive information from the fax-based encoder 44 about which pixels are innovative and to quantize the D-values at those a-sites more finely than it does at the other a-sites. The decompressor knows when this finer code is invoked without having to be sent any additional information because it receives $C_k$ via the output 46 of the fax-based encoder 44, and $C_k$ contains this information and more.

A still further advantage provided by incorporating a temporal inner loop is that it then becomes possible for the quantizer 40 to implement a vector quantization scheme that capitalizes on possible correlations from one frame to the next between both the locations of the high-intensity pixels and the approximate intensities thereof. This accounts for why the {D̂; a-sites}$_{k-1}$ is allowed to be fed back on the output 78 to the quantizer 40.

When the fax-based encoder 44 of FIG. 4 executes a modified JBIG algorithm, the pixels in the context can be chosen spatio-temporally, rather than only spatially as in FIGS. 2 and 3. That is, some of the pixels can be ones coded earlier than the target pixel in the present frame, and others can be from anywhere in the previous frame. Experimentation reveals that a hybrid spatio-temporal context compresses better than either a purely spatial or a purely temporal one.

E. MOTION COMPENSATED COMPRESSOR

Figure 5:
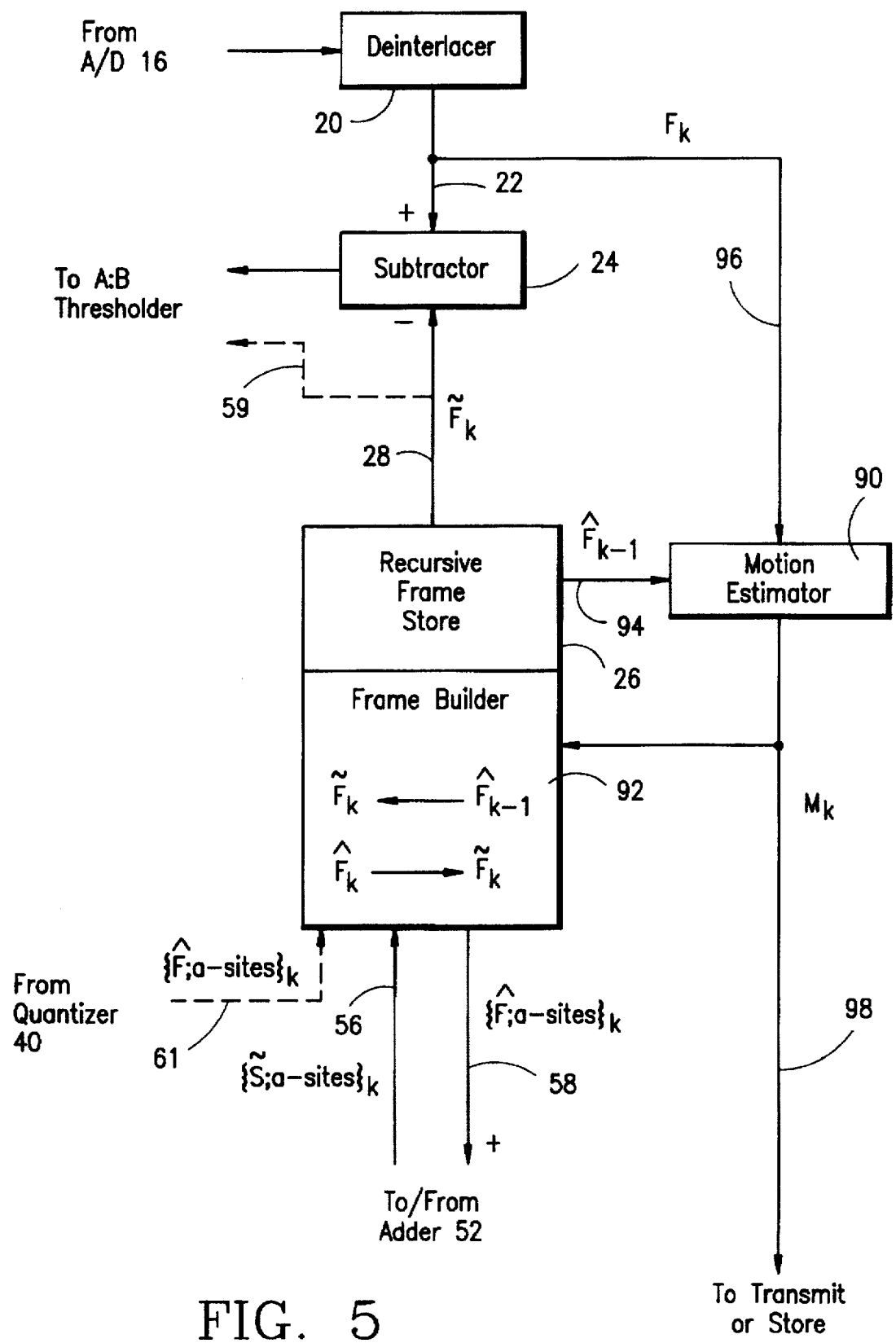
FIG. 5 is a block diagram of a modification to the compressor of FIG. 2 which employs motion compensation, and is constructed in accordance with a fourth preferred embodiment of the present invention.

Turning now to FIG. 5, another embodiment of the compressor 10 is illustrated which employs motion compensation instead of direct subtraction. Only the elements of this embodiment which differ from those of the FIG. 1 embodiment are illustrated in FIG. 5. In particular, this embodiment incorporates a motion estimator 90, and the recursive frame store 26 is modified by the inclusion therein of a frame builder 92. The motion estimator 90 performs block-based matching of the $k^{th}$ input frame $F_k$ received from the deinterlacer 14 using the $k-1^{st}$ decompressed frame $\hat{F}_{k-1}$ as the reference. Techniques for performing motion estimation with possibly fractional-pel accuracy via block-based matching are well known to those skilled in the art of video compression. Such motion estimation is computationally demanding; both signals entering the motion estimator are high-rate, as indicated by the thick-nature of the line representing an additional output 94 from the recursive frame store 26, and an additional output 96 from the deinterlacer 14. In addition, the operations that have to be performed on them are computationally intensive, even if the search for the best matching block is performed only hierarchically rather than exhaustively.

The result of this motion estimation is the set of motion vectors $M_k$ for the $k^{th}$ frame which is fed on an output 98 from the motion estimator 90 both to the frame builder 92, and to the transmission or storage medium for immediate or eventual access by the decompressors. The motion vectors $M_k$ constitute a recipe for building a complete frame, herein referred to as $\hat{F}_k$, by translating the blocks of $\hat{F}_{k-1}$ they specify to standard, mutually exclusive block positions that collectively exhaust the frame size. This is indicated as a high-rate operation in FIG. 5 by virtue of the thick line in the frame builder 92 representing $\hat{F}_{k-1}$ being recursively converted into $\hat{F}_k$. However, it is actually intermediate between high-rate and low-rate in practice because, although every pixel is involved, blocks of pixels translate as units.

The recursive frame store 26 sends $\hat{F}_k$ instead of $\hat{F}_{k-1}$ as in the embodiment of FIG. 1, to the negative input of the subtractor 24. Everything else proceeds exactly as in the embodiment of FIG. 1, except that it is $\hat{F}_k$, rather than $\hat{F}_{k-1}$ whose values at {A-sites}$_k$ are fed to the adder 52 on the output 58. As a result, the adder 52 feeds {$\hat{S}=\hat{D}+\hat{F}$; a-sites}$_k$ back to the recursive-frame store 26 and frame builder 92 on the adder output 56. This is used, possibly in conjunction with the aforementioned interpolation at certain pixels not in {a-sites}$_k$ to update $\hat{F}_k$ rather than $\hat{F}_{k-1}$ recursively to $\hat{F}_k$ in the frame store 26. This is a low rate operation as indicated by the thin line arrow from $\hat{F}_k$ to $\hat{F}_k$.

There are advantages that accrue from performing motion compensation which can outweigh the computational disadvantage in some applications. One is that the compressed data rate is reduced because there tend to be fewer pixels above threshold in motion-compensated embodiments as opposed to direct subtraction embodiments for the same picture quality. Also, there is greater flexibility to effect rate scaling by means of frame rate reduction because motion estimation may successfully compensate fairly long range motions which would tend to saturate direct subtraction systems. Direct subtraction systems can operate successfully down to 15 fps, and perhaps 10 fps, but tend to perform uncompetitively for still lower frame rates. As a general rule, direct subtraction is preferred in applications that require low latency using compressors of limited computational ability, while motion-compensated embodiments are preferred when bit rate is at a premium more so than the computational intensity of the compressor.

It should be understood that all of the modifications and variations of the compressor 10 illustrated in FIGS. 2–5 can be combined with one another in any desired manner. For example, the motion compensated embodiment of FIG. 5 clan be combined with the temporal inner loop embodiment of FIG. 4. In particular, the spatio-temporal JBIG version of the fax-based encoder 44 discussed in conjunction with FIG. 4 is particularly well-suited for use in a motion compensated compressor with a temporal inner loop. The reason is that its computational complexity is no longer a daunting consideration because the motion estimation/compensation operations performed as part of this embodiment are equally if not more burdensome computationally than those required to implement JBIG. Since it tends to give slightly higher compression ratios for the images in question, JBIG may emerge as the prime choice for the fax-based encoder 44 for this embodiment.

F. DECOMPRESSORS

Figure 6:
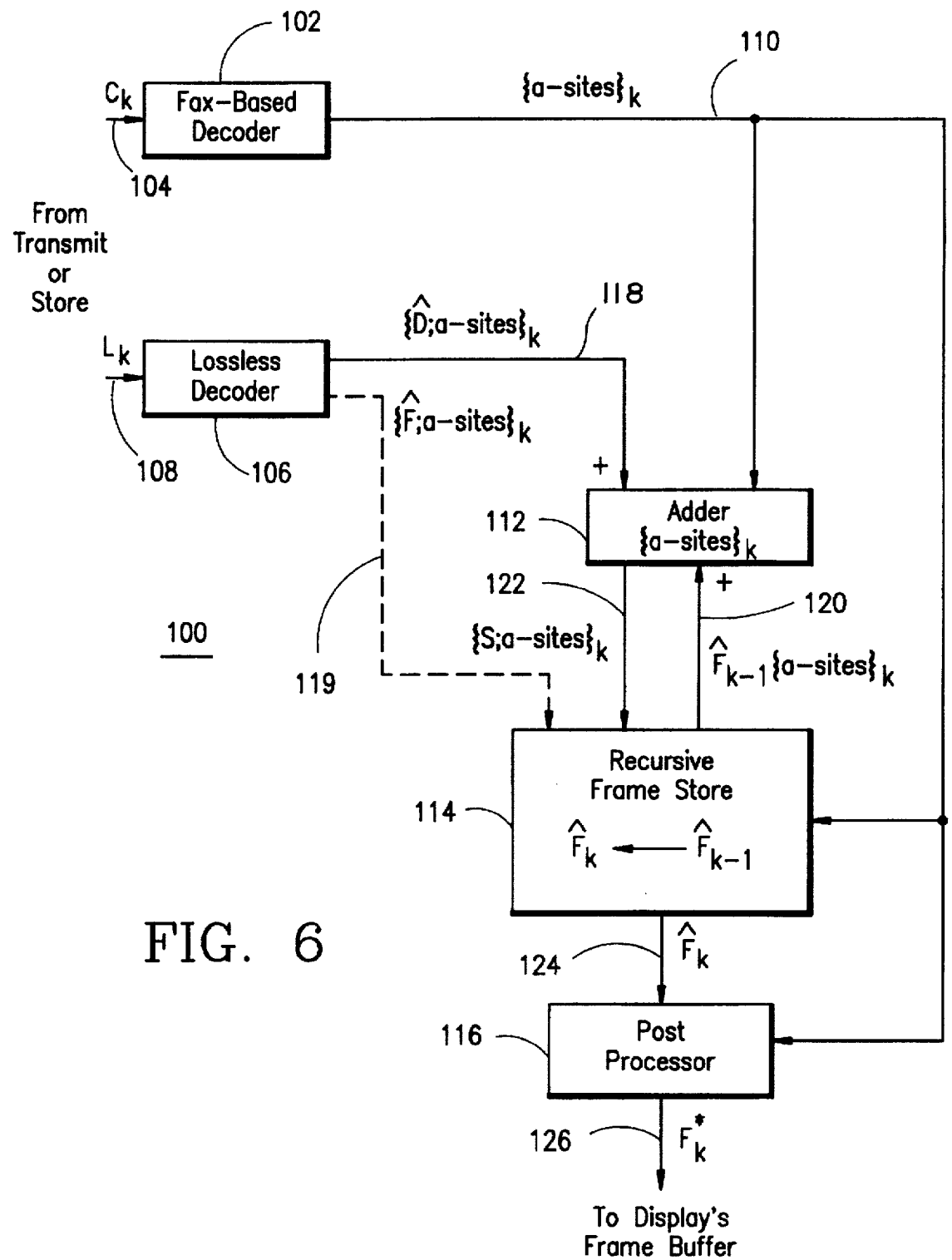
FIG. 6 is a bock diagram of a video decompressor for use with the video compressor of FIG. 2.
Figure 7:
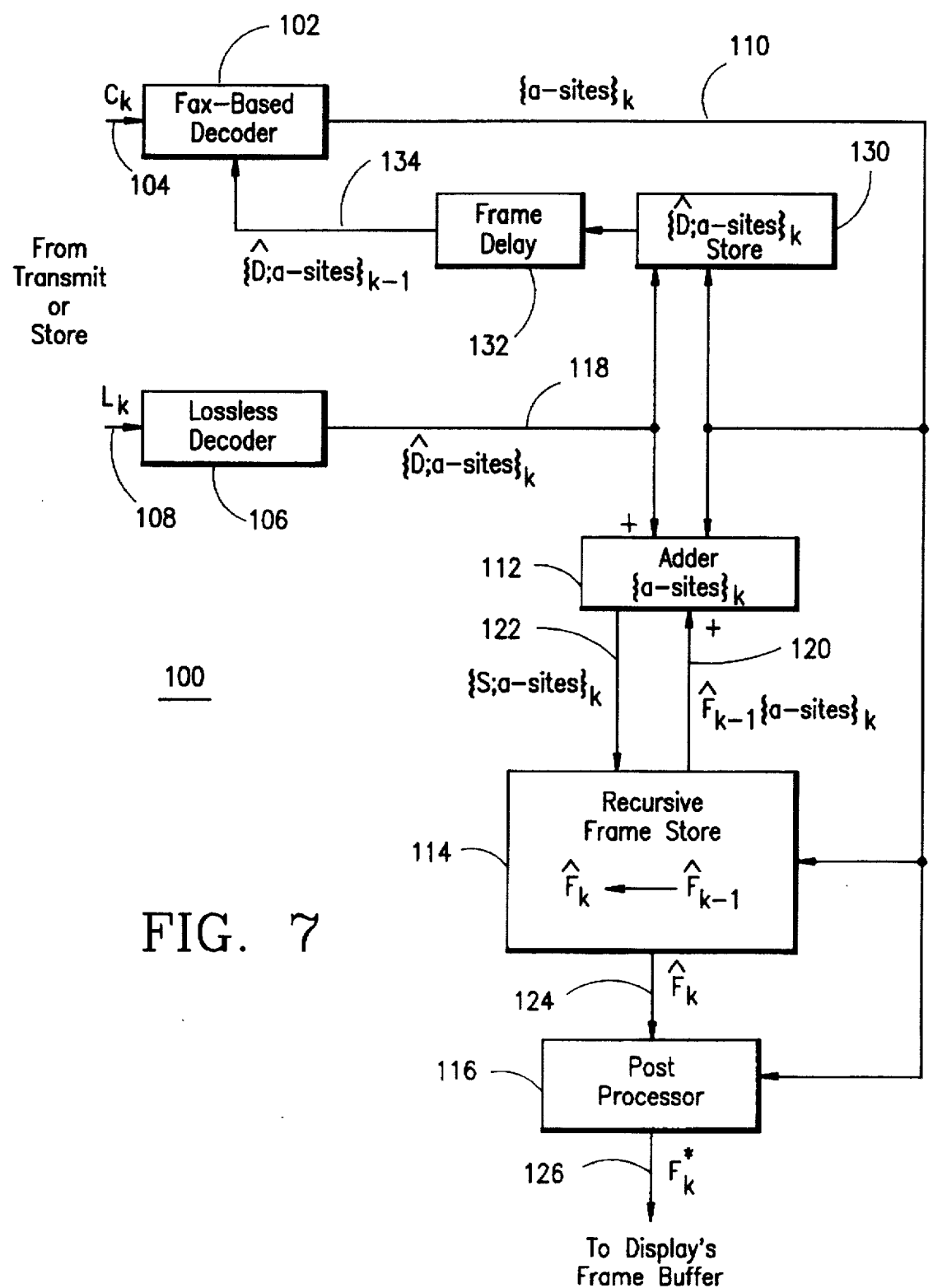
FIG. 7 is a block diagram of a video decompressor for use with the modified compressor of FIG. 4.
Figure 8:
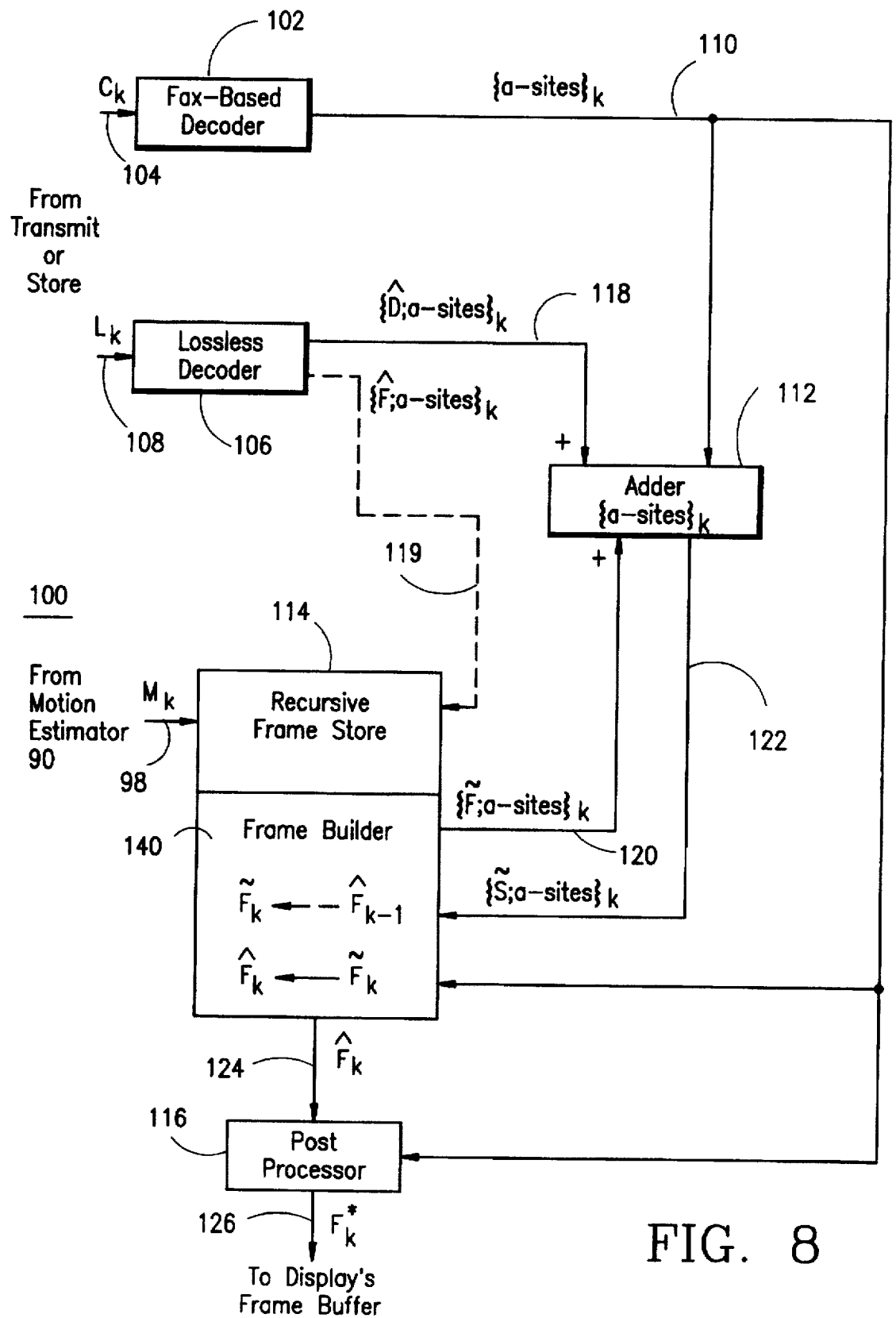
FIG. 8 is a block diagram of a video decompressor for use with the modified compressor of FIG. 5.

The remaining figures, FIGS. 6–8, illustrate corresponding preferred embodiments of a decompressor which is employed for reconstructing the decompressed frame data from the compressed frame data that is generated by the various compressor embodiments of FIGS. 2–5. With reference first to FIG. 6, a decompressor 100 is illustrated for use with the direct subtraction embodiments of the present invention, such as that illustrated in FIG. 1. The decompressor 100 includes a fax-based decoder 102 which receives on an input 104, the $C_k$ values from the fax-based encoder 44, and a lossless decoder 106 which receives on an input 108, the $L_k$ values from the lossless encoder 50. The fax-based decoder 102 and lossless decoder 106 are simply the inverses of the respective fax-based encoder 44 and lossless encoder 50 of the embodiment of FIG. 1, and serve to decompress the $C_k$ and $L_k$ data to restore the {a-sites}$_k$ {$\hat{D}$; a-sites}$_k$ ({$\hat{F}$; a-sites}$_k$ if the modification of the compressor using the lines 60 and 61 is employed) data, respectively.

The {a-sites}$_k$ pixel location data is fed from an output 110 of the fax-based decoder 102 to an adder 112, a recursive frame store 114, and a post processor 116. The {$\hat{D}$; a-sites}$_k$ pixel intensity data are fed from the lossless decoder 106 through an output 118 also to the adder 112. If the lossless decoder 106 generates {$\hat{F}$; a-sites}$_k$, this is supplied directly through an output 119 to the recursive frame store 114, and the adder 112 is not employed. The recursive frame store 114 supplies the values of {$\hat{F}$; a-sites}$_k$ through an output 120 to the adder 112 which sums these values with the difference frame data to obtain {$\hat{S}$; a-sites}$_k$, which is transmitted back to the recursive frame store 114 through an adder output 122. The $k^{th}$ decompressed frame $\hat{F}_k$ is then transmitted from the recursive frame store 114 through an output 124 to the post processor 116, and finally through an output 126 to a display's frame buffer.

The post-processor 116 comprises a means for displaying a version $F_k^*$ of the $k^{th}$ frame that is in some respects more psychophysically pleasing than the decompressed frame $\hat{F}_k$ produced by the recursive frame store 114. Artifacts tend to appear in $\hat{F}_k$ near the boundaries between regions that have a high density of a-pixels, and regions that do not, especially in instantiations of the invention that use strict bit rate control through frame-by-frame adaption of the threshold. By feeding {a-sites}$_k$ from the fax-based decoder 102 to the post processor 116, the locations of such boundaries become known there, whereupon filters can be used to smooth out these edge effects at the possible expense of some loss in sharp definition of edges in these portions of the scene. In many other instances, various other conventional forms of preprocessing, such as companding or spatial frequency filtering, are employed, and the post-processor 116 provides a means for restoring the original signal.

Just as the compressor 10 of FIG. 2 can be modified to employ a temporal inner loop, motion compensation or both, the decompressor 100 can also be easily modified in this manner simply by incorporating the same additional elements that are employed in the variations of the compressor 10 illustrated in FIGS. 4 and 5. In particular, the decompressor 100 can be modified as illustrated in FIG. 7 to use a temporal inner loop with direct subtraction. This is accomplished by interposing a store 130 and a frame delay 132 in the decompressor 100 which stores the frame information outputted from the fax-based decoder 102 and the lossless decoder 106, and supplies this through an output 134 back to the fax-based decoder 102 to permit comparison of the previous frame information to the current frame information by the fax-based decoder 102.

The decompressor 100 can also be modified as illustrated in FIG. 8 to work with the modification of the compressor 10 illustrated in FIG. 5 which employs motion compensation. This is accomplished by incorporating a frame builder 140 in the recursive frame store 26 which is identical to the frame builder 92 employed in the compressor 10. As in the embodiment of the decompressor 100 illustrated in FIG. 6, if the lossless decoder 106 generates $\{\hat{F}; a\text{-sites}\}_k$ instead of $\{\hat{D}; a\text{-sites}\}_k$, the adder 112 is not employed, and the output of the lossless decoder 106 is supplied directly to the frame store 114 and frame builder 140 through the output line 119. In this case, the frame builder 140 also need not generate $\hat{F}_k$ from $\hat{F}_k$. As before, it will also be understood that all of the modifications illustrated in FIGS. 7 and 8 could be combined if desired.

It should be noted that all of the operations in the decompressor 100 are low-rate except for the post-processing. Moreover, post-processing usually consists of relatively elementary operations that are not computationally intensive and, indeed, are often performed in the analog domain. Hence, it is a key feature of the present invention that the decompressor 100 is extraordinarily simple to implement. It can be easily realized in software-only form for full-frame size, full-color, full-frame-rate video on desktop computers of modest capabilities. This makes broadcast dissemination of corporate quality video to all personnel who share a high speed LAN an immediate reality without the need for the receivers to do anything but install a program. No video board is needed. The same holds true for local and wide area ATM networks which can guarantee low latency, broadband throughput. However, packet networks of lesser capability, such as the Internet will be able to support only a more modest version of fax-based video because high data rate cannot be guaranteed. (See, however, the ensuing discussion of intraframe-only mode which is well suited to the Internet.)

G. INTRAFRAMES

Up to this point, all of the embodiments of the present invention have relied upon comparisons of previous frame data with that of current frame data as an essential feature. This of course poses a problem during start up or when a scene cut occurs, for example, because there is either no previous frame to be compared, or the previous frame is of a completely different scene. To prevent this from becoming a problem, the present invention employs a special scheme for handling the first frames of a video sequence. These special stand alone frames are referred to as intraframes, in contrast to all other frames which are referred to as interframes.

Sending intraframes uncompressed is not viable because of latency considerations. A Q-NTSC 4:2:2 frame, for example, has 16 bits of information at each of 320×240= 76,800 pixel sites, for a total of 1,288,800 bits. If such a sequence is compressed for transmission at approximately 1 megabit/sec, it would take more than a full second to transmit an intraframe, after which the system would have to play catchup for some time at an unacceptable delay for interactive applications. Accordingly, intraframes must be compressed.

Preferably, the intraframes are compressed and decompressed by means of the same pixel-based operations in the spatial domain that the preferred embodiments of the present invention employ to compress and decompress the intraframes. Thus, a fax-based representation of the intraframe is calculated. Specifically, first the Y-component is decomposed into (1) a bi-level pattern having either a 0 or a 1 at each pixel site, and (2) quantized data specifying an approximate intensity at each pixel site by the technique described below. This is then repeated for the U-component and the V-component. Of course, if RGB representations are employed, this two step process is done in succession for each of the R, G and B components.

Let $C_y$ and $R_y$ denote, respectively, the number of columns and number or rows in the Y-component. Let $y_{i,j}$ denote the intensity value of the Y-component at the pixel site located in the $i^{th}$ row and $j^{th}$ column of the intraframe. Steps 0 through 5 below show how to compute the associated bi-level, or fax, pattern $\{f_{i,j}\}$ and the approximate intensity field $\{\hat{y}_{i,j}\}$ of the intraframe that will be communicated in compressed form to the decoder, decompressed and displayed. Throughout the compression of the Y-component of the intraframe, $T_y$ is a suitably chosen fixed threshold and $Q_y(y)$ is a suitably chosen fixed quantization function that equals 0 if $|y|<T_y$.

Step 0. Set $\hat{y}_{1,1}=Q_y(y_{1,1})$. If $\hat{y}_{1,1}=0$, then $f_{1,1}=0$; otherwise, $f_{1,1}=1$. Set $i=j=1$.

Step 1. Compute $m_{i,j+1}=|y_{i,j+1}-\hat{y}_{i,j}|$. If $m_{i,j+1}<T_y$, set $f_{i,j+1}=0$ and $\hat{y}_{i,j+1}=\hat{y}_{i,j}$. If $m_{i,j+1} \geq T_y$, set $f_{i,j+1}=1$ and $\hat{y}_{i,j+1}=\hat{y}_{i,j}+Q_y(y_{i,j+1}-\hat{y}_{i,j})$.

Step 2. $j\leftarrow j+1$. If $j=C_y$, then $j\leftarrow 1$ and go to Step 3. Otherwise, return to Step 1.

Step 3. $i\leftarrow i+1$. If $i>R_y$, End.

Step 4. Compute $m_{i,j}=|y_{i,j}-\hat{y}_{i-1,j}|$. If $m_{i,j}<T_y$, set $f_{i,j}=0$ and $\hat{y}_{i,j}=\hat{y}_{i-1,j}$. If $m_{i,j}\geq T_y$, set $f_{i,j}=1$ and $\hat{y}_{i,j}=\hat{y}_{i-1,j}+Q_y(y_{i,j}-\hat{y}_{i-1,j})$.

Step 5. $j\leftarrow j+1$. If $j>C_y$, $j>1$ and go to Step 3. If $j\leq C_y$, go to Step 4.

A verbal description of the above algorithm is that the intensity of the pixel in the upper left corner of the frame is quantized first, said quantized value is used as the reference for the intensity of the second pixel in the first row in a subtraction and dead-zone quantizing procedure like that used for interframes, the resulting approximation of the second pixel is used as the reference for the third pixel in the first row, and so on. Once the first row is finished, each of the approximations to its pixel intensities is used as the reference for the intensity of the second-row pixel immediately below it. The approximations to the intensities of the second-row pixels that result then serve as the references for the third row, and so on through all R rows. After the Y-component has been approximated, similar calculations are done for the U-component using a possibly different quantizer $Q_U$ and a possibly different threshold $T_U$; finally the V-component is similarly treated with quantizer $Q_V$ and threshold $T_V$. The analogous treatment for RGB representations is obvious. Note also that intraframe compression could be performed with rows and columns and/or with left and right interchanged.

The diagram below shows the intraframe pixel intensity dependencies. The approximate intensity at the pixel site at the head of each arrow in this diagram serves as the reference for the intensity at the pixel site at that arrow's tail.

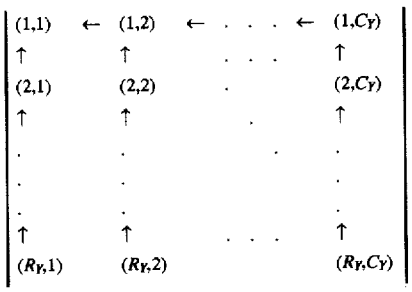

For an intraframe there is no previously-transmitted temporal reference frame, so the compression of $\{f_{i,j}\}$ must be performed by a spatial-only fax technique; Group 3, spatial-only Group 4, or spatial-only JBIG are the viable choices. The preference leans toward spatial-only Group 4 because of the use of vertical referencing in all but the first line of the intraframe.

Sometimes two successive pixels on the same line, say (i,j−1) and (i,j), both have intensity difference magnitudes that are above threshold so that $f_{i,j-1}=f_{i,j}=1$. Then there is the option at (i,j) to invoke quantization not as usual of $Y_{i,j}-\hat{y}_{i-1,j}$ but instead of $y_{i,j}-\hat{y}_{i,j-1}$. Experience has shown that $y_{i,j}-\hat{y}_{i,j-1}$ tends to have a smaller variance than does $y_{i,j}-\hat{y}_{i-1,j}$ in such situations, so this yields improved compression and hence is the preferred embodiment. Of course, the decoder in this preferred embodiment knows this convention and constructs $\hat{y}_{i,j}$ by adding the quantized amplitude difference it receives for site (i,j) to $\hat{y}_{i,j-1}$ rather than to $\hat{y}_{i-1,j}$. Although this has been described in the context of intraframes, the preferred embodiments of the present invention quantize $y_{i,j}-\hat{y}_{i,j-1}$ in the case of horizontally contiguous a-sites in interframes, too.

In applications that call for nearly fixed transmitted bit rate, there will be a prescribed bit budget for intraframes and a possibly different bit budget for interframes. In the preferred method for fax-based intraframe compression in such tightly bit-budgeted applications, the fixed thresholds $T_Y$, $T_U$ and $T_V$ each are replaced by a non-uniform quantizer and histogram calculator; the pixels (i,j) at which $f_{i,j}$ is set equal to 1 then are determined by starting from the highest-intensity bin in the histogram and working toward the lowest-intensity bin until the bit budget for the intraframe component in question is exhausted.

For the initial frame and for frames devoted partially or totally to "housekeeping", it is clear that the intraframe mode will be invoked. By contrast, in low latency applications scene cuts must be sensed in real time and the intraframe mode invoked on-the-fly. This requires incorporation of an adaptive algorithm and thus is termed "adaptive intraframing". A simple adaptive scheme for invoking the intraframe mode is to count the number of pixels above threshold. If this number jumps to three or more times its average value, that is a strong indication that the current frame is the first one after a scene changes. Alternatively, since there usually is little movement in the corners of a given scene, dramatic increases in the intensity of above-threshold pixels in mxn rectangles in the upper corners and/or rxs rectangles in the lower corners are indicative of a scene cut. For situations in which frequent scene cuts are expected, the compressor of the present invention can be put in a mode of scanning the four corners first to monitor for scene cuts. Whenever a scene cut is thereby detected, the intraframe mode is invoked and the decoder so informed by a pattern of flag bits reserved especially for this purpose. Adaptive scene cut monitoring need be performed only on the luminance component in YUV representations, and only on one of the primary colors (probably G) in RGB representations.

The present invention can also be operated in a mode known as the intraframe-only mode, in which every frame is an intraframe. This not only further reduces the computational burden, but also has the decided advantages that errors do not propagate, and that rate-scaling may be readily accomplished via reduction of the frame rate to less capable receivers (on top of the usual schemes for progressively lowering the threshold and refining the quantizer output for the more capable users). Of course, the intraframe only mode incurs a penalty in terms of quality at any given bit rate relative to the embodiments with interframes because the dependencies among successive input frames are not being capitalized upon. Nonetheless, intraframe-only is the preferred mode for such applications as broadcasting and multicasting because it is so easy to rate scale. It is also well suited to transmission over links with rapidly time varying capacity such as those which characterize Internet access during periods of high congestion. The intraframe-only mode of fax-based video compression is an attractive alternative to motion JPEG which is widely used for such applications at present.

H. INTERPOLATION

In the preferred embodiments of the present invention one of two interpolation algorithms disclosed below is incorporated into the computation of the interframes. The interpolation algorithms are described in the context of FIG. 2, but they are also intended for use in the embodiments of the compressor shown in FIGS. 3, 4 and 5. It is also preferable to incorporate interpolation into intraframe compression, but in the intraframe context it is necessary for the spatial filter mentioned in the ensuing descriptions of the interpolation schemes to be scan-pattern causal in order to permit the decompressor to implement precisely the same interpolation as the compressor.

In the first interpolation scheme the set of approximations $\{\hat{D}; \text{a-sites}\}_k$ to the intensities in the difference frame at the a-sites in the $k^{th}$ frame are not fed to the adder 52 on the output 48 as in FIG. 2. Rather, a different set of approximations $\{\hat{D}; \text{a-sites}\}_k$ computed from them is sent to the adder instead. The recipe for computing $\{\hat{D}; \text{a-sites}\}_k$ follows. $\{\hat{D}\}_k$ is fed to a spatial filter that usually is nonlinear in that it combines some logic operations with linear filtering operations. The output of this filter is an interpolated set of approximations $\{\bar{D}\}_k$ to the intensities in the difference frame in the $k^{th}$ frame. Next, logic checks the value of $|\hat{D}-\bar{D}|$ at each site in the $k^{th}$ frame to see whether or not it is above a prescribed value. If it is not, then D at that site is defined to equal $\hat{D}$ at that site; if it is above the prescribed value, then $\bar{D}$ at that site is assigned a value that lies somewhere between $\hat{D}$ at that site and $\bar{D}$ at that site, e.g., their average. This completes the description of the first interpolation scheme.

In the second interpolation scheme the recursion that updates the contents of frame store 26 from $\hat{F}_{k-1}$ to $\hat{F}_k$ begins by inserting $S_k$ at the $\{\text{a-sites}\}_k$ as previously disclosed in the discussion of FIG. 2, but it does not end there. Rather the result of this operation is fed to a spatial filter that usually is nonlinear in that it combines some logic operations with linear filtering operations. The output of this filter is an interpolated set of approximations $\{\acute{F}\}_k$ to the intensities in the $k^{th}$ input frame. Next, logic checks the entries in the array of values $|\{\hat{F}\}_{k-1}-\{\acute{F}\}_k|$ to see which of them is above a prescribed value. For each site at which the prescribed value is not exceeded, the entry in $\hat{F}_k$ at that site is defined to equal the entry in $\acute{F}_k$ at that site. At each site at which the prescribed value is exceeded, $\{\hat{F}\}_k$ is assigned the value of $\{\hat{F}\}_{k-1}+\{\tilde{D}\}_k$ at that site, where $\tilde{D}_k$ lies somewhere between the entry at that site in $\hat{D}_k$ and the entry at that site in $\hat{F}_{k-1}-\acute{F}_k$, e.g., their average. This completes the description of the second interpolation scheme.

The interpolation described in the preceding paragraph not only reduces the degree of discrepancy between the original frames and their displayed counterparts but also improves the compression ratio achieved in interframe coding. This is because including interpolation in the computation of the displayed frames leads, on average, to fewer above-threshold intensity differences in the next frame. Indeed, experiments with head-and-shoulders videos have shown that the above-described interpolation schemes decrease the number of above-threshold pixels by approximately 25%.

I. HARDWARE AND SOFTWARE IMPLEMENTATIONS

It is well within the state-of-the-art to build an enhanced A/V board that includes the subtractor, the recursive frame store, and the thresholding units. This board either may be mounted on the PCI bus or Nubus within the desktop computer or may be located external to the computer, communicating with its CPU through a SCSI port or ATM port. Indeed, among the embodiments of the present invention are ones that do exactly this. The subtractor and the threshold units are standard, cheap digital circuitry. The recursive frame store, although standard, is not cheap at present. For full NTSC, for example, it would have to contain several MBytes of video RAM and probably would cost more than $100 in 1995. If required to perform the interpolations cited above, it would also have to either interface with the host's ALU or contain additional special-purpose computational circuitry.

Another embodiment of considerable interest is one that eschews such an enhanced A/V board by having the host desktop computer perform the functions of the subtractor and the thresholding units via software programs and use part of its own RAM or disk memory for the recursive frame store. This software-only implementation is limited principally by the speed with which the task of the subtractor can be realized in integer arithmetic by the CPU of the host computer. Today's PowerMacs and Pentium PCs can do integer subtractions fast enough that Q-NTSC (240 rows and 320 columns) can be handled at 30 fps, and full NTSC is almost within reach. Programming the subtractions in machine language should provide additional efficiencies. For example, it is not really necessary to perform a full subtraction at every pixel in the raster. One embodiment of the present invention instead compares only, say, the five most significant bits of each pixel of $F_k$ with those of $\hat{F}_{k-1}$ to determine whether or not the magnitude of their difference exceeds a certain pre-threshold. (Said magnitude is $2^d$ gray levels if the words being compared agree in the $d^{th}$ most significant bit position and disagree in exactly one bit position more significant than the $d^{th}$.) Accordingly, machine language code can be written that rapidly determines whether or not the magnitude of the subtraction will exceed the pre-threshold without actually performing the whole subtraction. For proper setting of the pre-threshold, more than 90% of the difference magnitudes usually will be found to be below pre-threshold, whereupon complete subtraction need be performed only at the remaining at most 10%. An embodiment with this implementation programmed in machine language and arranged to ensure that no calls to disk ever occur—only calls to RAM and to cache—can perform the combined functions of subtraction and thresholding fast enough to keep pace with full NTSC.

When implementing the present invention in software-only in a high-level language such as C or C++, it is crucial to pay deference to the byte-based as opposed to bit-based nature of the desktop computer's instruction set. Failure to do so results in unacceptably slow software-only encoding. In this connection particular attention must be paid to the Huffman coding operations in the fax-based encoder 26 and the lossless coder 30. Huffman coders are trivial to realize in hardware because they are inherently bit-based, with frequent reliance on integral shifts of bit streams. In software however, serious inefficiencies result if one actually programs the bit-shifts because it requires many byte-based operations by a general purpose computer to realize a binary bit-shift. There is more involved here than simply replacing the Huffman encoding calculation with a look-up table. It is necessary to be looking several Huffman code words ahead at all times and covering all contingencies in an intelligent fashion. Appendix A is a listing of a satisfactorily efficient C++ program for a software-only implementation of the fax-based video compressor of the present invention, using an appropriately modified version of the Group 3 fax standard.

J. SUMMARY

In summary, the present invention provides a novel image data compression and decompression method and system which is particularly suited for compressing sequences of video image frames, and eliminates the need for costly video boards by replacing computationally intensive two dimensional transform compression methods with a facsimile-based method, and, in the case of the direct subtraction embodiment, eliminating the heavy computational load afforded by motion estimation/compensation. In spite of the reduced computational burden imposed by the simpler facsimile-based encoding techniques, the invention still provides a high data compression ratio to facilitate transmission. In addition, the embodiments of the present invention and their variations afford an attractive solution to rate scalability concerns by providing various means by which the transmission bit rate can be easily adjusted.

One of the key strengths of the present invention relative to the state-of-the-art in desktop video compression is that it can deal with full-frame-rate (30 fps) video in large frame sizes (at least Q-NTSC and sometimes full NTSC). For a 4:1:1 (Y,U,V) NTSC signal, for example, there are 460,800 pixel sites to scan each frame and 13,824,000 pixel sites to scan per second if one handles the entire 30 fps called for in the NTSC standard. However, experimentation with embodiments of the present invention has established that the number of a-sites per frame averages about 2% of the total number of pixel sites in the scan when A:B thresholding is done so as to obtain decompressed video of high quality (almost indistinguishable from that which emanated from the source) in head-and-shoulders scenes typical of those encountered in video telephony, video conferencing and distance learning. The result is that, although the uncompressed signals are defined at every pixel site in the raster scan, all the compressed signals are comprised of roughly only 13,824,000/50=276,480 components per second for full 4:1:1 NTSC. The operation that the blocks of the compressor in FIG. 2 must perform on these signals, as described above, are sufficiently simple that today's home and office desktop computers can perform them upwards of 300,000 times per second and still have ample time left over for other multi-processing and bookkeeping tasks. It is to be stressed in this connection that the preferred embodiment of the direct subtraction version of the present invention involves no motion compensation, no two-dimensional orthogonal transformations, and no block-based processing of any sort, unlike most video compression schemes currently used in practice.

Although the invention has been disclosed in terms of a number of preferred embodiments and modifications thereon, it will be understood that numerous additional modifications and variations could be made thereto without departing from the scope of the invention as defined in the following claims.

APPENDIX A

```
//
// Copyright (c) 1995 The Simile Group of Cornell University.
// All rights reserved.
//
// Time: Dec. 1995
//
// Written by Toby Berger, Yi-Jen Chiu, Mikio Kawahara, Ying-Ming
Tsai.
// All are at the School of Electrical Engineering of Cornell
University.
//
// This file contains the main program of the Video/G3 interframe
// encoding algorithm.

// In this version, we use the byte-offset look-up table scheme
// to encode the video stream.

#include "encoder.hpp"

YUV_Encoder::YUV_Encoder(unsigned char initialThreshold, int
qstep)
{
    _currentThreshold = initialThreshold;
    _runCurrentEncodeBits = 0;
    _runCurrentEncodeBytes = 0;
    _maxCodeLength = 0;
    _quantization_step = qstep;
    initialIndex();
}

YUV_Encoder::~YUV_Encoder()
{
    delete _runY;
    delete _runYLengthCodeTable;

} void YUV_Encoder::initialIndex()
{
    _index = 0;    // inital index
} int YUV_Encoder::readHuffmanTable()
{
    FILE *fp;
    char tableName[FILENAME_LENGTH];
    int readNotDone = CODE_TABLES;
    int currentProcessTable;
    int currentProcessType;
    int number_Codes;
```

```
    char inStr[MAX_CODE_LENGTH];
    char codeString[CODE_ROW][MAX_CODE_LENGTH]; // Code Book while ( readNotDone ){
        if ( readNotDone == RUNY ) {
            strcpy(tableName,"rrunY.dat");// Read the run length
code table
            currentProcessType = RUN;
            currentProcessTable = RUNY;
    }
        if ( readNotDone == LEVY ) {
            strcpy(tableName,"rlevY.dat");// Read the pixel
intensity code table
            currentProcessType = LEV;
            currentProcessTable = LEVY;
    }
        cout << "Loading Huffman Table..." << tableName << endl;

if ( (fp = fopen(tableName,"r")) == NULL ){
            cout << "Sorry, Cannot find " << tableName << " file!"
<< endl;
            break;
        }
        else { // loading table into memory
            number_Codes = 0;
            while ( (fgets(inStr,MAX_CODE_LENGTH,fp) ) != (char
*)NULL ){
                inStr[strlen(inStr)-1] = '\0';   // Skip new
line symbol
                strcpy(codeString[number_Codes],inStr); //
save code book
setupCodeTable(number_Codes,inStr,currentProcessTable);
                number_Codes++;                  // fill up Code
table
        }
        fclose(fp);

cout << "Total different codes=" << number_Codes << "
codes" << endl;

// Adjust Code Table
        if ( currentProcessType == RUN ) {
            char processString[MAX_CODE_LENGTH];
            int index_codeString;
            strcpy(processString,codeString[number_Codes-1]);
// end of line code setupCodeTable(CODE_ROW,processString,currentProcessTable);
            for (int i = number_Codes-2; i< CODE_ROW; i++) { strcpy(processString,codeString[number_Codes-2]);
```

```
                    for (int j= 0; j< i/(number_Codes-2) - 1; j++)
strcat(processString,codeString[number_Codes-2]);
                    index_codeString = i % (number_Codes - 2);

strcat(processString,codeString[index_codeString]);

setupCodeTable(i,processString,currentProcessTable);
            }
        }
        switch ( currentProcessTable ){
          case RUNY:
setupLookUpTable(_runYLengthCodeTable,_runY,currentProcessType);
                    break;
          case LEVY:
setupLookUpTable(_levYCodeTableP,_levYPlus,currentProcessType);

setupLookUpTable(_levYCodeTableN,_levYNeg,currentProcessType);
                    break;
          default:
                    cout << "No table is adjusted!" <<
endl;

} // end of setup lookup table
      }
      readNotDone--;
    }
    if ( readNotDone > 0 ) return FALSE;
    else {
        cout << "All table read successfully!" << endl;
        return TRUE;
    }
}

//
// Byte-Offset Look-Up Table Set Up
// void YUV_Encoder::setupCodeTable(int i, char *content, int tableType){
    char lcode[MAX_CODE_LENGTH];
    switch ( tableType ){
        case RUNY:
                _runYLengthCodeTable[i].codeLength =
strlen(content);
                if ( _runYLengthCodeTable[i].codeLength >
_maxCodeLength )
                        _maxCodeLength =
_runYLengthCodeTable[i].codeLength;
                if ( ( _runYLengthCodeTable[i].codeLength % BYTE
) != 0 &&
                        _runYLengthCodeTable[i].codeLength > 0)
```

```
                           _runYLengthCodeTable[i].codeBytes =
                               _runYLengthCodeTable[i].codeLength/BYTE +
1;
                  else _runYLengthCodeTable[i].codeBytes =
                               _runYLengthCodeTable[i].codeLength/BYTE;
                   _runYLengthCodeTable[i].code =
strToBits(content,_runYLengthCodeTable[i].codeBytes);
                   break;
       case LEVY:
                   strcpy(lcode,content);
                   _levYCodeTableP[i].codeLength = strlen(content)
+ 1;  // add SIGN bit
                   if ( _levYCodeTableP[i].codeLength >
_maxCodeLength )
                        _maxCodeLength =
_levYCodeTableP[i].codeLength;
                   if ( ( _levYCodeTableP[i].codeLength % BYTE ) !=
0 &&
                        _levYCodeTableP[i].codeLength > 0)
                        _levYCodeTableP[i].codeBytes =
_levYCodeTableP[i].codeLength/BYTE + 1;
                   else _levYCodeTableP[i].codeBytes =
_levYCodeTableP[i].codeLength/BYTE;
                   strcat(lcode,"0");  // add 0 bit
                   _levYCodeTableP[i].code =
strToBits(lcode,_levYCodeTableP[i].codeBytes);
                   // copy to Negative Table
                   _levYCodeTableN[i].codeLength =
_levYCodeTableP[i].codeLength;
                   _levYCodeTableN[i].codeBytes =
_levYCodeTableP[i].codeBytes;
                   strcpy(lcode,content);  // restore
                   strcat(lcode,"1");
                   _levYCodeTableN[i].code =
strToBits(lcode,_levYCodeTableN[i].codeBytes);;
                   break;
       default:
                   cout << "Wrong table name specification!" <<
endl;
     }
} unsigned char* YUV_Encoder::strToBits(char *c, int column)
{
    char *sptr = c;
    unsigned char *buffer = new unsigned char[column];
    int currentByte=0;
    for (int i=0; i< strlen(c); i++, sptr++) {
        if ( (i >= BYTE) && (i - BYTE) % BYTE == 0 ) currentByte++;

if ( *sptr == '1' )
```

F<sub>58</sub>

```
            buffer[currentByte] = BIT_MASK1 | buffer[currentByte] <<
1;
        else buffer[currentByte] <<= 1;
    }
    if ( strlen(c) % BYTE != 0 ) // adjust
        buffer[currentByte] <<= BYTE- ( strlen(c) % BYTE );
    return buffer;
} void YUV_Encoder::setupLookUpTable(codeTable *ctable,lookUpTable
*ltable, int type)
{
    unsigned char *buffer;
    unsigned char maskBuffer = BIT_MASK_CLEAR;
    int tableRow;

if ( type == RUN ) tableRow = CODE_ROW;
    else tableRow = LEVEL-1;
    for (int i=0; i<= tableRow; i++){
        for (int j=0; j< BYTE; j++){
            if ( ctable[i].codeLength == 1 ) { // special case:
code length == 1
                ltable[i].codeBytes[j] = 1;
                buffer = new unsigned char[ctable[i].codeBytes];
                buffer = ctable[i].code;
                buffer[0] >>= j; // adjust
                ltable[i].code[j] = buffer;
            }
            else { // code length != 1
                if ( ((ctable[i].codeLength % BYTE) + j <= BYTE)
&&
                     ((ctable[i].codeLength % BYTE) != 0 ) ) { ltable[i].codeBytes[j] = ctable[i].codeBytes;
                    buffer = new unsigned
char[ctable[i].codeBytes];
                    for ( int k=0; k< ctable[i].codeBytes; k++){
                        buffer[k] = ctable[i].code[k];
                        buffer[k] >>= j;
                        if ( ctable[i].codeBytes > 1 && k > 0){
                            maskBuffer = ctable[i].code[k-1] <<
(BYTE - j);
                            buffer[k] |= maskBuffer;
                        }
                    }
                    ltable[i].code[j] = buffer;
                }
                else {
                    ltable[i].codeBytes[j] =
ctable[i].codeBytes+1;
                    buffer = new unsigned
char[ctable[i].codeBytes+1];
```

```
                        for (int k=0; k< ctable[i].codeBytes+1;
k++){
                            if ( k == ctable[i].codeBytes )
                                buffer[k] = BIT_MASK_CLEAR;
                            else {
                                buffer[k] = ctable[i].code[k];
                                buffer[k] >>= j;
                    }
                            if ( k > 0 ) {
                                maskBuffer = ctable[i].code[k-1] <<
(BYTE - j);
                                buffer[k] |= maskBuffer;
                    }
                        } // end for each code byte
                        ltable[i].code[j] = buffer;
                    }
                }
            } // end for j
        } // end for i
}
void YUV_Encoder::updateThreshold(unsigned char newThreshold)
{
    _currentThreshold = newThreshold;
} void YUV_Encoder::Group3(char *fname)
{
  FILE *outfp;
  char filename[FILENAME_LENGTH];
  strcpy(filename,fname);

register int offsetRun = 0, offsetLev = 0, level_difference;
  register int quantization, offsetThreshold = _currentThreshold
+ 1;
  register int OrRun = TRUE,OrLev = TRUE;
  unsigned char dataStreamRun[MAX_DATA_STREAM];
  unsigned char dataStreamLev[MAX_DATA_STREAM];
  int total_pixels;

_index = 0;
  _runCurrentEncodeBytes = 0;      // Initial and  reset
  _runCurrentEncodeBits  = 0;
  _levCurrentEncodeBytes = 0;
  _levCurrentEncodeBits  = 0;

total_pixels = 0;
  offsetRun = 0;
  offsetLev = 0;

for (int l=0; l< MAX_DATA_STREAM; l++){
      dataStreamRun[l] = BIT_MASK_CLEAR;
```

```
        dataStreamLev[1] = BIT_MASK_CLEAR;
    } for (int i= 0; i< _frameHeight; i++){
        for (int j = 0; j< _frameWidth; j++){ level_difference = _currentFrame[i][j] -
_previousFrame[i][j];
            if ( ABS(level_difference) > _currentThreshold ){// check
if Zero Out
                total_pixels++;

// Run Length Encoding
            for (int k=0; k<_runY[j-_index].codeBytes[offsetRun];
k++){ dataStreamRun[_runCurrentEncodeBytes+k] |=
                        _runY[j-_index].code[offsetRun][k];
            } offsetRun += _runYLengthCodeTable[j
-_index].codeLength;
                while ( offsetRun >= BYTE ){
                    offsetRun -= BYTE;
                    ++_runCurrentEncodeBytes;
                }

_runCurrentEncodeBits += _runYLengthCodeTable[j
-_index].codeLength;

// Level Encoding if ( level_difference > 0 ){
                    quantization = (level_difference -
offsetThreshold)/_quantization_step;

for (k=0;
k<_levYPlus[quantization].codeBytes[offsetLev]; k++){ dataStreamLev[_levCurrentEncodeBytes+k] |=

_levYPlus[quantization].code[offsetLev][k];

}
                offsetLev +=
_levYCodeTableP[quantization].codeLength;
                while ( offsetLev >= BYTE ){
                    offsetLev -= BYTE;
                    ++_levCurrentEncodeBytes;
                }
```

```
                _previousFrame[i][j] += quantization *
_quantization_step + offsetThreshold;
                _levCurrentEncodeBits +=
_levYCodeTableP[quantization].codeLength;

}
        else{
                quantization = -1*(offsetThreshold +
level_difference)/_quantization_step;

for (k=0;
k<_levYNeg[quantization].codeBytes[offsetLev]; k++){ dataStreamLev[_levCurrentEncodeBytes+k] |=

_levYNeg[quantization].code[offsetLev][k];

}
            offsetLev +=
_levYCodeTableN[quantization].codeLength;
                while ( offsetLev >= BYTE ){
                    offsetLev -= BYTE;
                    ++_levCurrentEncodeBytes;
                }

_previousFrame[i][j] -= (quantization *
_quantization_step + offsetThreshold);
                _levCurrentEncodeBits +=
_levYCodeTableN[quantization].codeLength;

}
        _index = j + 1; // keep lastest index value
    } // end for encoding
  } // end for scan Video frame ROW
  // fill up end of line code
  for (int k=0; k<_runY[CODE_ROW].codeBytes[offsetRun]; k++){ dataStreamRun[_runCurrentEncodeBytes+k] |=
_runY[CODE_ROW].code[offsetRun][k];

}
  offsetRun += _runYLengthCodeTable[CODE_ROW].codeLength;
  while ( offsetRun >= BYTE ){
        offsetRun -= BYTE;
        ++_runCurrentEncodeBytes;
  }

_runCurrentEncodeBits +=
_runYLengthCodeTable[CODE_ROW].codeLength;
    _index = 0; // initial Index
```

*F62*

```
} // end for scan Video frame COLUMN

// following is for debuging cout << "Total Pixels:" << total_pixels << endl;

strcpy(filename,fname);
 strcat(filename,".run");
 outfp = fopen(filename,"w");
 if (_runCurrentEncodeBits%BYTE==0){
    fprintf(outfp,"%d %d %d",
_maxCodeLength,_runCurrentEncodeBytes,_runCurrentEncodeBits);
    fwrite(dataStreamRun,sizeof(unsigned char),
_runCurrentEncodeBytes, outfp);
 }
 else{
    fprintf(outfp,"%d %d %d",
_maxCodeLength,_runCurrentEncodeBytes+1,_runCurrentEncodeBits);
    fwrite(dataStreamRun,sizeof(unsigned char),
_runCurrentEncodeBytes+1, outfp);
 }
 fclose(outfp);
 strcpy(filename,fname);
 strcat(filename,".lev");
 outfp = fopen(filename,"w");
 if (_levCurrentEncodeBits%BYTE==0){
    fprintf(outfp,"%d %d %d",
_maxCodeLength,_levCurrentEncodeBytes,_levCurrentEncodeBits);
    fwrite(dataStreamLev,sizeof(unsigned char),
_levCurrentEncodeBytes, outfp);
 }
 else{
    fprintf(outfp,"%d %d %d",
_maxCodeLength,_levCurrentEncodeBytes+1,_levCurrentEncodeBits);
    fwrite(dataStreamLev,sizeof(unsigned char),
_levCurrentEncodeBytes+1, outfp);
 }
 fclose(outfp);

FILE *fp;
 unsigned char c;
 int currentByte = 0;
 strcpy(filename,fname);
 strcat(filename,".encR");
 fp = fopen(filename,"w");
 c = dataStreamRun[currentByte];
 for (i=0; i< _runCurrentEncodeBits; i++){
    if ( i >= BYTE && i % BYTE == 0 )
       c = dataStreamRun[++currentByte]; // point to next byte
    if ( ( c & 0x80 ) == 0x80 ) fprintf(fp,"%d",1); // cout << "1";
    else fprintf(fp,"%d",0); // cout << "0";
```

```
      c <<= 1;
   }
   fclose(fp);

strcpy(filename,fname);
   strcat(filename,".encL");
   fp = fopen(filename,"w");
   currentByte = 0;
   c = dataStreamLev[currentByte];
   for (i=0; i< _levCurrentEncodeBits; i++){
       if ( i >= BYTE && i % BYTE == 0 )
           c = dataStreamLev[++currentByte]; // point to next byte
       if ( ( c & 0x80 ) == 0x80 ) fprintf(fp,"%d",1); // cout <<
"1";
       else fprintf(fp,"%d",0); // cout << "0";
       c <<= 1;
   }
   fclose(fp);
} void YUV_Encoder::displayCodeTable()
{
   unsigned char c;
   int currentByte;

for (int i=0; i <= CODE_ROW; i++){
       currentByte = 0;
       cout << _runYLengthCodeTable[i].codeLength << " ";
       cout << _runYLengthCodeTable[i].codeBytes  << " ";
       c = _runYLengthCodeTable[i].code[currentByte];
       for (int k=0; k< _runYLengthCodeTable[i].codeLength; k++){
           if ( k>=BYTE && k % BYTE  == 0 )
               c = _runYLengthCodeTable[i].code[++currentByte];
           if ( ( c & 0x80 ) == 0x80 ) cout << "1";
           else cout << "0";
           c <<= 1;
       }
       cout << endl;
   } for (i= 0; i < LEVEL; i++){
       currentByte = 0;
       cout << _levYCodeTableP[i].codeLength << " ";
       cout << _levYCodeTableP[i].codeBytes  << " ";
       c = _levYCodeTableP[i].code[currentByte];
       for (int k=0; k< _levYCodeTableP[i].codeLength; k++){
           if ( k>=BYTE && k % BYTE  == 0 )
               c = _levYCodeTableP[i].code[++currentByte];
           if ( ( c & 0x80 ) == 0x80 ) cout << "1";
           else cout << "0";
           c <<= 1;
```

```
        }
        cout << endl;
    }
} void YUV_Encoder::displayLookUpTable()
{
    lookUpTable *table = _levYNeg;
    unsigned char c;
    for (int i=0; i< LEVEL; i++) {
        for (int j=0; j<BYTE; j++) {
            for ( int k=0; k< table[i].codeBytes[j]; k++){
                c = table[i].code[j][k];
                for ( int l=0; l< BYTE; l++){
                    if ( ( c & BIT_MASK128 ) == BIT_MASK128 ) cout << "1";
                    else cout << "0";
                    c <<= 1;
                } // end for print each bit
            } // end for print each code byte
            cout << " ";
        } // end for each different bit location code
        cout << endl;
    } // end for each code table row
} int YUV_Encoder::initFrame(char *fname1)
{
    FILE *infp1;
    if ( (infp1 = fopen(fname1,"r") ) == NULL ){
        cout << "Cannot find Initial Intra Video frame file!" << endl;
        return FALSE;
    }
    else {
        fread(_previousFrame,sizeof(unsigned char),_frameWidth*_frameHeight,infp1);
        fclose(infp1);
        return TRUE;
    }
} int YUV_Encoder::readFrame(char *fname2)
{
    FILE *infp2;
    if ( (infp2 = fopen(fname2,"r") ) == NULL ){
        cout << "Cannot find " << fname2 << " video frame file!" << endl;
        return FALSE;
    }
    else {
        fread(_currentFrame,sizeof(unsigned
```

```
char),_frameWidth*_frameHeight,infp2);
        fclose(infp2);
        return TRUE;
    }
} void YUV_Encoder::setUpFrameSize(int width, int height)
{
    _frameWidth = width;
    _frameHeight = height;
} main(int argc, char *argv[])
{
  char frameName[FILENAME_LENGTH];
  if ( argc < 5 ) cout << "Usage: encoder frame_name signal_type
frame_number threshold quantization" << endl;
  else{
      YUV_Encoder encoder( atoi(argv[4]), atoi(argv[5]) );
      if ( strcmp("Y",argv[2]) == 0 )   // match
          encoder.setUpFrameSize(FRAMEY_WIDTH,FRAMEY_HEIGHT);
      if ( strcmp("U",argv[2]) == 0 )
          encoder.setUpFrameSize(FRAMEU_WIDTH,FRAMEU_HEIGHT);
      if ( strcmp("V",argv[2]) == 0 )
          encoder.setUpFrameSize(FRAMEV_WIDTH,FRAMEV_HEIGHT);
      encoder.readHuffmanTable();
      strcpy(frameName,argv[1]);
      strcat(frameName,"0.Y");
      encoder.initFrame(frameName);
      char filename[FILENAME_LENGTH];
      char fileExtname[FILENAME_LENGTH];
      int frame = 0;
      while ( frame < atoi(argv[3]) ){
          strcpy(filename,argv[1]);
          sprintf(fileExtname,"%d",++frame);
          strcat(filename,fileExtname);
          strcat(filename,".Y");
          cout << filename << " frame reading...." << endl;
          if ( encoder.readFrame(filename) == FALSE ) break;
          encoder.Group3(filename);
      }

// encoder.displayCodeTable();
      // encoder.displayLookUpTable();
      // encoder.displayEncodeStream();
   }
}
```

```
//
// Copyright (c) 1995 The Simile Group of Cornell University.
// All rights reserved.
//
// Time: Dec. 1995
//
// Written by Toby Berger, Yi-Jen Chiu, Mikio Kawahara, Ying-Ming
Tsai.
// All are at the School of Electrical Engineering of Cornell
University.
//
// This file contains the header file of the encoder_patent.C.

// In this version, we use the byte-offset look-up table scheme
// to encode the video stream.

#include <iostream.h>
#include <stdio.h>
#include <string.h>
include <stdlib.h> define FRAMEY_WIDTH      352
define FRAMEY_HEIGHT     288
#define FRAMEU_WIDTH      176
#define FRAMEU_HEIGHT     144
#define FRAMEV_WIDTH      176
#define FRAMEV_HEIGHT     144
#define TRUE                1
#define FALSE               0
#define FILENAME_LENGTH    20
#define CODE_COLUMN         2
#define CODE_ROW          352
#define YUV_LEVEL         120
#define LEVEL             120
#define MAX_CODE_LENGTH   128
#define BYTE                8
#define BIT_MASK_CLEAR   0x00
#define BIT_MASK1        0x01
#define BIT_MASK128      0x80
#define CODE_TABLES         2
#define RUNY                2
#define LEVY                1
#define RUN                 0
#define LEV                 1
#define MAX_DATA_STREAM 102400    // 100K bytes
#define ABS(x)   ((x) < 0 ? (-1*(x)) : (x))

typedef struct
{
   int codeLength;
   int codeBytes;
```

```
    unsigned char *code;
}codeTable;

typedef struct
{
    int codeBytes[BYTE];
    unsigned char *code[BYTE];
}lookUpTable;

class YUV_Encoder
{
    public:
        YUV_Encoder(unsigned char initialThreshold, int qstep);
// Encoder Initial
        ~YUV_Encoder();
        void Group3(char *filename);
        // int writeToFile(char *filename);
        void updateThreshold(unsigned char newThreshold);
        int readHuffmanTable();
        // void displayEncodeStream(char *filename);
        void displayCodeTable();
        void displayLookUpTable();
        int  initFrame(char *filename); // simulation
        int  readFrame(char *filename);
        unsigned char
_previousFrame[FRAMEY_HEIGHT][FRAMEY_WIDTH];
        unsigned char
_currentFrame[FRAMEY_HEIGHT][FRAMEY_WIDTH];
        void setUpFrameSize(int width, int height);
    private:
        void initialIndex();
        void setupCodeTable(int i, char *content, int
tableType);
        void setupLookUpTable(codeTable *ctable,lookUpTable
*ltable,int type);
        unsigned char *strToBits(char *c, int column);
        int _frameWidth;
        int _frameHeight;
        int _currentThreshold;
        int _index;
        int _runCurrentEncodeBits;
        int _runCurrentEncodeBytes;
        int _levCurrentEncodeBits;
        int _levCurrentEncodeBytes;
        int _quantization_step;
        int _maxCodeLength;
        codeTable   _runYLengthCodeTable[CODE_ROW+1];
        codeTable   _levYCodeTableP[YUV_LEVEL];
        codeTable   _levYCodeTableN[YUV_LEVEL];
        lookUpTable _runY[CODE_ROW+1];
        lookUpTable _levYPlus[YUV_LEVEL];
        lookUpTable _levYNeg[YUV_LEVEL];
```

};

```
//
// Copyright (c) 1995 The Simile Group of Cornell University.
// All rights reserved.
//
// Time: Dec. 1995
//
// Written by Toby Berger, Yi-Jen Chiu, Mikio Kawahara, Ying-Ming Tsai.
// All are at the School of Electrical Engineering of Cornell University.
//
// This file contains the codetable of the run length.

10
001
0000
11101
00010
111100
110011
110001
1110011
010010
1111011
010000
1110000
1111110
000110
1111100
0100011
1100100
0001110
0101100
0100111
0100010
0100110
0101010
11111111
1110001
11110100
0101111
0101000
1100001
```

```
0101001
01011100
01011010
11000000
11001011
11001010
01011011
00011110
111111100
111101011
01010111
111110111
110000010
111001001
010111010
111001010
111101010
110000011
1110010110
1110010111
00011111
1111111011
111110110
1111101011
0101011010
1111101010
0101110111
0101011011
0101110110
1110010000
1111111010
010101100
1110010001
111110100
011
1101
```

```
//
// Copyright (c) 1995 The Simile Group of Cornell University.
// All rights reserved.
//
// Time: Dec. 1995
//
// Written by Toby Berger, Yi-Jen Chiu, Mikio Kawahara, Ying-Ming
Tsai.
// All are at the School of Electrical Engineering of Cornell
University.
//
// This file contains the codetable of the pixel intensity(For the
```

```
// byte-tree look_up table decoding). It needs to be adjusted for the
// different zeroout threshold and quantization step.
//

0
10
110
1110
11110
111110
1111110
11111110
111111110
1111111110
11111111110
111111111110
1111111111110
11111111111110
111111111111110
1111111111111110
11111111111111110
111111111111111110
1111111111111111110
11111111111111111110
111111111111111111110
1111111111111111111110
11111111111111111111110
111111111111111111111110
1111111111111111111111110
11111111111111111111111110
111111111111111111111111110
1111111111111111111111111110
11111111111111111111111111110
111111111111111111111111111110
1111111111111111111111111111110
11111111111111111111111111111110
111111111111111111111111111111110
1111111111111111111111111111111110
11111111111111111111111111111111110
111111111111111111111111111111111110
1111111111111111111111111111111111110
11111111111111111111111111111111111111
```

```
//
// Copyright (c) 1995 The Simile Group of Cornell University.
// All rights reserved.
//
// Time: Dec. 1995
//
// Written by Toby Berger, Yi-Jen Chiu, Mikio Kawahara, Ying-Ming
Tsai.
// All are at the School of Electrical Engineering of Cornell
University.
//
// This file contains header file of the decoder_patent.C.
// include "../Huffman/Huffman.h"

define DEBUG 0 define BI_LEVEL 0
define BI_LEVEL_2 0
#define INTENSITY 0
define INTENSITY_2 0 define G3_CODE_NUM 66      // The number of codes in G3 is 66
define INTENSITY_LEVEL 255
                            // 0 - 255, the level of the intensity typedef struct
{
   int codeLength;
   int codeBytes;
   unsigned char *code;
}codeTable;

struct tagYUV_Header
{
    INT frameFrag;
    INT threshold;
    INT quantizationStep;
};
typedef struct tagYUV_Header YUV_Header, *P_YUV_Header;

class YUV_Decorder
{
public:
    YUV_Decorder(CHAR *biLevelHuffmanFileName,
                CHAR *intensityHuffmanFileName,
                CHAR *baseFileName, CHAR *fileType,
                INT frameWidth, INT frameHeight,
                INT quantizetionStep, INT threshold,
                INT startFrame);
    ~YUV_Decorder();
```

```
        VOID mainDecodeProcess(CHAR *baseFileName, CHAR *fileType,
                        INT startFrame,
                        INT endFrame);
        VOID decodeOneFrame(CHAR *baseFileName, CHAR *fileType,
                    INT frameNumber);
        VOID displayNonZeroPixelValue()     ;

private:
        VOID decodeFrame(CHAR *biLevelFileName);
        VOID decodeIntensity(CHAR *intensityFileName);
        CHAR*   pGetFileName(CHAR *baseFileName, CHAR *fileType,
                        INT fileNumber);

INT pFrameWidth;    // Width of the image.
        INT pFrameHeight;   // Height of the image.
        INT    pFrameSize;              // size   of   the   image,
pFrameWidth*pFrameHeight
        INT pQuantizationStep; // Quantization Step
        INT pThreshold;     // Threshold
        INT pNumberOfCodesIntensity;  // the  number  of  codes  of
intensity map // Huffman stuffs
        HUFFMAN* pHuffmanTreeForIntensity;
        HUFFMAN* pHuffmanTreeForBiLevel;
        LOOKUP** pLookupTablesForBiLevel;
        LOOKUP** pLookupTablesForIntensity;

// Buffers
        UCHAR*  pBiLevelImageBuffer;    // Buffer for Bi-Level.

UCHAR*    pPreviousFrameBuffer;// Buffer  for  the  previous
frame.
        INT*    pDiffrenceFrameBuffer;   // Buffer for the diffrence
frame.

INT   pNumberOfNonZeroPixels;

};

//
// Copyright (c) 1995 The Simile Group of Cornell University.
// All rights reserved.
//
// Time: Dec. 1995
//
// Written by Toby Berger, Yi-Jen Chiu, Mikio Kawahara, Ying-Ming
Tsai.
```

```
// All are at the School of Electrical Engineering of Cornell
University.
//
// This file contains the main program of the Video/G3 interframe
// decoding algorithm.
// include "decoder.hpp"

//
// In this version, we use the byte-tree look-up table to decode the
// encoded video stream.
//

CHAR*   YUV_Decorder::pGetFileName(CHAR    *baseFileName,    CHAR
*fileType,
                  INT fileNumber)
{
    STATIC CHAR  cTmpFileName[32];
    CHAR  cTmpCharBuffer[8];

strcpy(cTmpFileName, baseFileName);
    sprintf(cTmpCharBuffer, "%d", fileNumber);
    strcat(cTmpFileName, cTmpCharBuffer);
    strcat(cTmpFileName, ".");
    strcat(cTmpFileName, fileType);

return cTmpFileName;
}

YUV_Decorder::~YUV_Decorder()
{
    delete []pLookupTablesForBiLevel;
    delete []pLookupTablesForIntensity;
    delete []pPreviousFrameBuffer;
    delete []pDiffrenceFrameBuffer;
}

YUV_Decorder::YUV_Decorder(CHAR *biLevelHuffmanFileName,
             CHAR *intensityHuffmanFileName,
             CHAR *baseFileName, CHAR *fileType,
             INT frameWidth, INT frameHeight,
             INT quantizetionStep, INT threshold,
             INT startFrame)
{
    FILE *cFp;

pFrameWidth  = frameWidth;
    pFrameHeight = frameHeight;
    pFrameSize = pFrameWidth*pFrameHeight;
```

```
    pQuantizationStep = quantizetionStep;
    pThreshold = threshold;

pNumberOfCodesIntensity =
       (INT)(ceil((DOUBLE)(INTENSITY_LEVEL - pThreshold)/
           (DOUBLE)(pQuantizationStep)))*2;

pHuffmanTreeForBiLevel =
         new    HUFFMAN(biLevelHuffmanFileName,    G3_CODE_NUM,
G3_CODE_NUM);

pHuffmanTreeForIntensity =
         new    HUFFMAN(intensityHuffmanFileName,
pNumberOfCodesIntensity,
             pNumberOfCodesIntensity,    pThreshold,
pQuantizationStep);

//
    // After we get the lookup tables, Huffman tree is no longer
needed.
    // So, eventually, in class Huffman, we should delete the
buffer
    // for huffman tree to save the memory.
    //
    pLookupTablesForBiLevel =
       pHuffmanTreeForBiLevel->constructLookupTables();

pHuffmanTreeForBiLevel->deleteHuffmanTreeBuffer();

pLookupTablesForIntensity =
       pHuffmanTreeForIntensity->constructLookupTables();

pHuffmanTreeForIntensity->deleteHuffmanTreeBuffer();

pPreviousFrameBuffer  = new UCHAR[ pFrameWidth*pFrameHeight ];

pDiffrenceFrameBuffer = new INT[ pFrameWidth*pFrameHeight ];

// read the first frame
    cFp = fopen(pGetFileName(baseFileName, fileType, startFrame),
"rb");
    assert( cFp );
    fread(pPreviousFrameBuffer, sizeof(UCHAR), pFrameSize, cFp);
    fclose( cFp );
}

VOID   YUV_Decorder::mainDecodeProcess(CHAR   *baseFileName,   CHAR
*fileType,
                        INT startFrame,
                        INT endFrame)
```

```
{
    INT i;

for (i=startFrame; i<=endFrame; i++) {
     decodeOneFrame(baseFileName, fileType, i);
    }
}
VOID    YUV_Decorder::decodeOneFrame(CHAR    *baseFileName,    CHAR
*fileType,
                    INT frameNumber)
{
    FILE *cFp;

#if DEBUG
    printf("\nFrame %d : \n", frameNumber);
endif switch ((INT)(*fileType)) {
    case 'Y':

decodeIntensity(pGetFileName(baseFileName,"Y.lev",frameNumber));
       decodeFrame(pGetFileName(baseFileName, "Y.run", frameNumber));
       break;
    case 'U':

decodeIntensity(pGetFileName(baseFileName,"U.lev",frameNumber));
       decodeFrame(pGetFileName(baseFileName, "U.run", frameNumber));
       break;
    case 'V':

decodeIntensity(pGetFileName(baseFileName,"V.lev",frameNumber));
       decodeFrame(pGetFileName(baseFileName, "V.run", frameNumber));
       break;
    default:
     fprintf(stderr, "Sorry, fileType is wrong.\n");
     break;
    } if INTENSITY
    displayNonZeroPixelValue();
#endif

// write to file
    cFp    =    fopen(pGetFileName("outs/test_missa",    fileType,
frameNumber),"wb");
    assert( cFp );
    fwrite(pPreviousFrameBuffer, sizeof(UCHAR), pFrameSize, cFp);
    fclose( cFp );
}
//
```

```
// decode the intensity map.
//

VOID YUV_Decoder::decodeIntensity(CHAR *intensityFileName)
{
    FILE   *cIntensityFp;
    LOOKUP *cTmpLookupForIntensity;
    UCHAR  *cTmpBufferForIntensity;
    INT    cNumberOfMarkup = 0;
    INT    cCurrentDataSizeBit;
    INT    cCurrentDataSizeByte;
    INT    cTmpCounter = 0;
    INT    i, j;

cIntensityFp = fopen(intensityFileName,"rb");
    assert( cIntensityFp );

// read the header fscanf(cIntensityFp, "%d", &cCurrentDataSizeByte); // damy
    fscanf(cIntensityFp, "%d", &cCurrentDataSizeByte);
    fscanf(cIntensityFp, "%d", &cCurrentDataSizeBit);

cTmpBufferForIntensity = new UCHAR[cCurrentDataSizeByte+1];

fread(cTmpBufferForIntensity,   1,      cCurrentDataSizeByte,
cIntensityFp);

#if INTENSITY_2
    BIT_BUFFER    cTmpBitBuffer(cTmpBufferForIntensity,
cCurrentDataSizeBit);
    cTmpBitBuffer.displayBuffer();
endif cTmpLookupForIntensity =
      &(pLookupTablesForIntensity
      [ pNumberOfCodesIntensity-2 ]
      [ cTmpBufferForIntensity[0] ]);

for (i=0; i<cCurrentDataSizeByte; i++) {
     for (j=0; j<cTmpLookupForIntensity->wordNum; j++) { pDiffrenceFrameBuffer[cTmpCounter] =
          cTmpLookupForIntensity->wordValue[j];
        cTmpCounter++;
     } cTmpLookupForIntensity =
      &(pLookupTablesForIntensity
        [   (cTmpLookupForIntensity->nextNode)    -
pNumberOfCodesIntensity ]
```

```
            [ cTmpBufferForIntensity[i+1] ]);
    } pNumberOfNonZeroPixels = cTmpCounter;

delete []cTmpBufferForIntensity;

fclose( cIntensityFp );

}

VOID YUV_Decorder::displayNonZeroPixelValue()
{
    INT i;

printf("NonZeroPixelValue: %d pixels", pNumberOfNonZeroPixels);

for (i=0; i<pNumberOfNonZeroPixels; i++) {
      if (!(i%10)) {
          printf("\n %5d: ",i);
      }
      printf("%5d ", pDiffrenceFrameBuffer[i]);
    }
}

VOID YUV_Decorder::decodeFrame(CHAR *biLevelFileName)
{
    INT i,j;

FILE   *cBiLevelFp;
    UCHAR  *cTmpBufferForBiLevel;
    LOOKUP *cTmpLookupForBiLevel;
    INT    cEncodedPixelNumber =0;
    INT    cEncodedPixelNumberInLine = 0;
    INT    cEncodedLineNumber =0;
    INT    cNumberOfMarkup = 0;
    INT    cCurrentDataSizeBit;
    INT    cCurrentDataSizeByte;
    INT    cNumberOfNonZeroPixels = 0;

cBiLevelFp = fopen(biLevelFileName,"rb");
    assert( cBiLevelFp );

fscanf(cBiLevelFp, "%d", &cCurrentDataSizeByte); // damy
    fscanf(cBiLevelFp, "%d", &cCurrentDataSizeByte);
    fscanf(cBiLevelFp, "%d", &cCurrentDataSizeBit);

cTmpBufferForBiLevel = new UCHAR[cCurrentDataSizeByte];

fread(cTmpBufferForBiLevel,   1,    cCurrentDataSizeByte, cBiLevelFp);
```

```
#if BI_LEVEL_2
    BIT_BUFFER   cTmpBitBuffer(cTmpBufferForBiLevel,
cCurrentDataSizeBit);
    cTmpBitBuffer.displayBuffer();
endif cTmpLookupForBiLevel =
        &(pLookupTablesForBiLevel[   G3_CODE_NUM-2   ][
cTmpBufferForBiLevel[0] ]);

#if BI_LEVEL
    printf("%5d:", cEncodedLineNumber);
#endif
    i = 0;
    while (1) {
     j = 0;
     while ( j < cTmpLookupForBiLevel->wordNum ) {
        if (cTmpLookupForBiLevel->wordValue[j] == 65) { // End Of
Line
          cEncodedPixelNumber += pFrameWidth;
          assert(cEncodedPixelNumberInLine <= pFrameWidth);
          cEncodedLineNumber ++;
          cEncodedPixelNumberInLine = 0;
#if BI_LEVEL
          if ( cEncodedLineNumber == pFrameHeight) {
            printf("%3d ", cTmpLookupForBiLevel->wordValue[j]);
            break;
          }
#endif
        } else {
         if (cTmpLookupForBiLevel->wordValue[j]== 64) { //Markup
Code
          cNumberOfMarkup++;
         } else { // Terminate Code
          // if (cNumberOfMarkup) {
           // if cNumberOfMarkup is more than one
           cEncodedPixelNumberInLine +=
             64*cNumberOfMarkup +
               cTmpLookupForBiLevel->wordValue[j] + 1;
           cNumberOfMarkup = 0;
          } else {
           cEncodedPixelNumberInLine +=
             cTmpLookupForBiLevel->wordValue[j] + 1;
          }
          //
          // update the pPrevioutFrameBuffer
          //
          pPreviousFrameBuffer[cEncodedLineNumber*pFrameWidth+
                  cEncodedPixelNumberInLine-1] +=
             pDiffrenceFrameBuffer[cNumberOfNonZeroPixels++];
```

```
                    }
                }
#if BI_LEVEL
            printf("%3d ", cTmpLookupForBiLevel->wordValue[j]);

if (cTmpLookupForBiLevel->wordValue[j] == 65 ) {
                  printf("\n");
                  printf("%5d:", cEncodedLineNumber);
                }
#endif
            j++;
        } if ( cEncodedLineNumber == pFrameHeight) {
            break;
        } else {
            i++;
            cTmpLookupForBiLevel =
                &(pLookupTablesForBiLevel
                [ (cTmpLookupForBiLevel->nextNode) - G3_CODE_NUM ]
                [ cTmpBufferForBiLevel[i] ]);
        }
    }
#if BI_LEVEL
    printf("\n");
    printf("cEncodedPixelNumber : %d\n", cEncodedPixelNumber);
    printf("cEncodedLineNumber : %d\n", cEncodedLineNumber);
      printf("c N u m b e r O f N o n Z e r o P i x e l s    :    % d \ n ",
cNumberOfNonZeroPixels);
endif delete []cTmpBufferForBiLevel;

fclose( cBiLevelFp );
} main()
{
    INT i, number_frame=9;

//
    //  Input the run length and level intensity code books,
filename
    // prefix, frame type, frame width, frame length, quantization
    // step, zeroout threshold, start frame number.
    //

YUV_Decoder testY("rrunY.dat", "rlevY_ex.dat",
              "../encoder1/missa", "Y", 352, 288, 6, 11, 0);

for (i=1; i<=number_frame; i++) {// Number of test frames
```

```
        testY.decodeOneFrame("../encoder1/missa", "Y", i);
    }
}

//
// Copyright (c) 1995 The Simile Group of Cornell University.
// All rights reserved.
//
// Time: Dec. 1995
//
// Written by Toby Berger, Yi-Jen Chiu, Mikio Kawahara, Ying-Ming Tsai.
// All are at the School of Electrical Engineering of Cornell University.
//
// This files contain the source files of the Huffman coding (For the
// byte-tree look-up table decoding)
// ifndef HUFFMAN_C
define HUFFMAN_C include "Huffman.h"

HUFFMAN::~HUFFMAN()
{
    // nothing special.
}

INT HUFFMAN::getValueFromIndex(INT index)
{
    if (index%2) {
     return(-1*((index/2)*pQuantizationStep+pThreshold+1));
    } else {
     return((index/2)*pQuantizationStep+pThreshold+1);
    }
}

HUFFMAN::HUFFMAN(CHAR *fileName, INT numLeaf, INT maxCodeLength)
{
    INT i;

assert( numLeaf > 1);
```

```
    pNumberOfLeaves = numLeaf;
    pNumberOfNodes  = numLeaf + (numLeaf-1);

pNumberOfBits =   (INT)ceil(log2((DOUBLE)numLeaf + 1.0));

pHuffmanTree = new NODE[pNumberOfNodes];

for (i=0; i<pNumberOfLeaves; i++) {
     pHuffmanTree[i].nodeValue = i;
    } pHeapTree = new INT[pNumberOfLeaves+1];
    pHuffmanTreeBuffer = new BIT_BUFFER(0);

readHuffmanTableFromFile(fileName, maxCodeLength);

constructInitialHeapTreeWithCodeLength();

constructHuffmanTreeWithCodeTable();

delete []pHeapTree;
}
HUFFMAN::HUFFMAN(CHAR *fileName, INT numLeaf, INT maxCodeLength,
          INT threshold, INT quantizationStep)
{
    INT i;

assert( numLeaf > 1);
    pNumberOfLeaves = numLeaf;
    pNumberOfNodes  = numLeaf + (numLeaf-1);

pNumberOfBits =   (INT)ceil(log2((DOUBLE)numLeaf + 1.0));

pThreshold = threshold;
    pQuantizationStep = quantizationStep;

pHuffmanTree = new NODE[pNumberOfNodes];

for (i=0; i<pNumberOfLeaves; i++) {
     pHuffmanTree[i].nodeValue = getValueFromIndex(i);
    } pHeapTree = new INT[pNumberOfLeaves+1];

pHuffmanTreeBuffer = new BIT_BUFFER(0);

readHuffmanTableFromFileIntensity(fileName, maxCodeLength);

constructInitialHeapTreeWithCodeLength();

constructHuffmanTreeWithCodeTable();
```

```
    delete []pHeapTree;
}

VOID HUFFMAN::deleteHuffmanTreeBuffer()
{
    delete []pHuffmanTree;
}

VOID   HUFFMAN::readHuffmanTableFromFile(CHAR    *fileName,   INT
maxCodeLength)
{
    FILE *cFp;
    INT i, j;
    CHAR *cTmpChar;

cFp = fopen(fileName, "r");
    assert( cFp );

cTmpChar = new CHAR[maxCodeLength];
    for (i=0; i<pNumberOfLeaves; i++) {
     fscanf(cFp, "%s", cTmpChar);
     pHuffmanTree[i].codeLength = strlen(cTmpChar)+1;

pHuffmanTree[i].codeValue =
                              n         e          w
UCHAR[(INT)ceil((double)pHuffmanTree[i].codeLength/8.0)];

BIT_BUFFER cTmpBuffer(pHuffmanTree[i].codeValue,
                 pHuffmanTree[i].codeLength);

for (j=0; j<pHuffmanTree[i].codeLength; j++) {
        switch ((int)cTmpChar[j]) {
        case '0':
         cTmpBuffer.writeBit(0);
         break;
        case '1':
         cTmpBuffer.writeBit(1);
         break;
        default:
         cerr << "ERROR: the value of the code is incorrect\n";
         exit(1);
        }
    }
   } fclose( cFp );
}

VOID HUFFMAN::readHuffmanTableFromFileIntensity(CHAR *fileName,
                  INT maxCodeLength)
{
```

```
    FILE *cFp;
    INT i, j;
    CHAR *cTmpChar;
    BIT_BUFFER *cTmpBuffer, *cTmpBuffer2;

cFp = fopen(fileName, "r");
    assert( cFp );

cTmpChar = new CHAR[maxCodeLength];
    i = 0;
    while (i<(pNumberOfLeaves-1)) { fscanf(cFp, "%s", cTmpChar);

pHuffmanTree[i].codeLength = strlen(cTmpChar)+1;
      pHuffmanTree[i+1].codeLength = pHuffmanTree[i].codeLength;

pHuffmanTree[i].codeValue =
                          new
UCHAR[(INT)ceil((double)(pHuffmanTree[i].codeLength)/8.0)];
      pHuffmanTree[i+1].codeValue =
                          new
UCHAR[(INT)ceil((double)(pHuffmanTree[i+1].codeLength)/8.0)];

cTmpBuffer = new BIT_BUFFER(pHuffmanTree[i].codeValue,
                      pHuffmanTree[i].codeLength);
      cTmpBuffer2 = new BIT_BUFFER(pHuffmanTree[i+1].codeValue,
                      pHuffmanTree[i+1].codeLength);

for (j=0; j<pHuffmanTree[i].codeLength -1; j++) {
          switch ((int)cTmpChar[j]) {
          case '0':
           cTmpBuffer->writeBit(0);
           cTmpBuffer2->writeBit(0);
           break;
          case '1':
           cTmpBuffer->writeBit(1);
           cTmpBuffer2->writeBit(1);
           break;
          default:
           cerr << "ERROR: the value of the code is incorrect\n";
           exit(1);
          }
      }
      cTmpBuffer->writeBit(0);
      cTmpBuffer2->writeBit(1);

delete []cTmpBuffer;
      delete []cTmpBuffer2;
      i += 2;

}
```

```
    fclose( cFp );
}

VOID HUFFMAN::displayHeapTreeWithCodeLength(INT numHeapNodes)
{
    INT i;
    BIT_BUFFER *cTmpBitBuffer;

cout << "Heap Tree : " << endl;
    for (i=1; i < numHeapNodes+1; i++) {
     printf("%3d : %3d : %3d : ", i, pHeapTree[i],
            pHuffmanTree[ pHeapTree[i] ].codeLength);
     cTmpBitBuffer = new BIT_BUFFER
        (pHuffmanTree[ pHeapTree[i] ].codeValue,
         pHuffmanTree[ pHeapTree[i] ].codeLength);
     cTmpBitBuffer->displayBuffer();
     delete cTmpBitBuffer;
    }
}

VOID HUFFMAN::displayHuffmanTree()
{
    INT i;

cout << "Huffman Tree: " << endl;
    cout << "Node : Parent : child0 : child1 : nodeVal : frequency"
<<endl;
    for (i=0; i < pNumberOfNodes; i++) { printf("%4d : %6d : %6d : %6d : %7d : %d\n", i,
            pHuffmanTree[i].parent,
            pHuffmanTree[i].childZero, pHuffmanTree[i].childOne,
            pHuffmanTree[i].nodeValue,
            pHuffmanTree[i].frequency);
    }
}

VOID HUFFMAN::downHeapWithCodeLength(INT numHeapNodes, INT i)
{
    INT j, currentHeap;

currentHeap = pHeapTree[i];

while ( (j = 2 * i) <= numHeapNodes ) { if ( j < numHeapNodes &&
          pHuffmanTree[ pHeapTree[j]   ].codeLength <
          pHuffmanTree[ pHeapTree[j+1] ].codeLength ) {
          j++;
     }
```

```
        if ( pHuffmanTree[ currentHeap ].codeLength
            >= pHuffmanTree[ pHeapTree[j] ].codeLength ) {
            break;
        } pHeapTree[ i ] = pHeapTree[ j ];
        i = j;
    }
    pHeapTree[ i ] = currentHeap;
}

VOID HUFFMAN::constructInitialHeapTreeWithCodeLength()
{
    INT i;

for ( i = 0; i < pNumberOfLeaves; i++ ) {
     pHeapTree[i+1] = i;
    } for ( i = pNumberOfLeaves/2; i >= 1; i-- ) {
     downHeapWithCodeLength(pNumberOfLeaves, i);
    }
}

VOID HUFFMAN::constructHuffmanTreeWithCodeTable()
{
    INT     cAlphabet;
    INT     cNumHuffmanNodes;
    INT     cNumHeapNodes;
    INT     cMax1, cMax2;
    BIT_BUFFER *cTmpBuffer;
    INT     i;
    INT     cFlag;

cAlphabet = pHeapTree[1];

cNumHuffmanNodes = pNumberOfLeaves;
    cNumHeapNodes = pNumberOfLeaves;

while ( cNumHeapNodes > 1 ) {
     cMax1 = pHeapTree[1];
     pHeapTree[1] = pHeapTree[ cNumHeapNodes-- ];
     downHeapWithCodeLength(cNumHeapNodes, 1);

cMax2 = pHeapTree[1];

assert(pHuffmanTree[cMax1].codeLength ==
            pHuffmanTree[cMax2].codeLength);

if ( (pHuffmanTree[cMax2].codeLength ==
            pHuffmanTree[pHeapTree[2]].codeLength ) ||
          (pHuffmanTree[cMax2].codeLength ==
```

```
            pHuffmanTree[pHeapTree[3]].codeLength ) ) { i=0;
        cFlag = 1;
        cTmpBuffer    =    new    BIT_BUFFER(pHuffmanTree[    cMax1
].codeValue,
                        pHuffmanTree[ cMax1 ].codeLength);
        while ( cFlag ) {
          i++;
          if ( pHuffmanTree[ pHeapTree[i] ].codeLength ==
              pHuffmanTree[ cMax1 ].codeLength ) {
              if ( cTmpBuffer->compareBuffer
                (pHuffmanTree[pHeapTree[i]].codeValue,
                 pHuffmanTree[ cMax1 ].codeLength-1) ) {
                cFlag = 0;
              }
            }
        } assert(pHuffmanTree[ cMax1 ].codeLength =
            pHuffmanTree[ pHeapTree[i] ].codeLength);

cMax2 = pHeapTree[i];
        pHeapTree[i] = pHeapTree[1];
    } delete cTmpBuffer;
    cAlphabet = cNumHuffmanNodes++;

pHuffmanTree[ cAlphabet ].codeLength =
      pHuffmanTree[cMax1].codeLength-1;

pHuffmanTree[ cAlphabet ].codeValue =
       new  UCHAR[ pHuffmanTree[ cAlphabet ].codeLength ];

cTmpBuffer    =    new    BIT_BUFFER(pHuffmanTree[    cAlphabet
].codeValue,
                        pHuffmanTree[ cAlphabet ].codeLength);
      cTmpBuffer->copyValueFromBuffer(pHuffmanTree[    cMax1
].codeValue,
                        pHuffmanTree[ cAlphabet ].codeLength);

pHeapTree[1] = cAlphabet;
    downHeapWithCodeLength(cNumHeapNodes, 1);

pHuffmanTree[ cMax1 ].parent = cAlphabet;
    pHuffmanTree[ cMax2 ].parent = cAlphabet;

BIT_BUFFER cTmpBuffer2(pHuffmanTree[cMax1].codeValue,
                pHuffmanTree[cMax1].codeLength);
```

```
        if (cTmpBuffer2.getValue(pHuffmanTree[cMax1].codeLength-1)) {
            pHuffmanTree[ cAlphabet ].childOne  = cMax1;
            pHuffmanTree[ cAlphabet ].childZero = cMax2;
        } else {
            pHuffmanTree[ cAlphabet ].childZero = cMax1;
            pHuffmanTree[ cAlphabet ].childOne  = cMax2;
        }
      }
    }
}

VOID HUFFMAN::makeHuffmanTable(INT parentNode)
{
    INT cCodeLength;
    INT cCurrentNode;

if ( parentNode < pNumberOfLeaves ) { return;
    } cCodeLength = pHuffmanTree[ parentNode ].codeLength + 1;

cCurrentNode = pHuffmanTree[ parentNode ].childOne;
    pHuffmanTree[ cCurrentNode ].codeLength = cCodeLength;
    pHuffmanTree[ cCurrentNode ].codeValue = new UCHAR[ cCodeLength
];
    BIT_BUFFER cChildOneBuffer
        (pHuffmanTree[ cCurrentNode ].codeValue , cCodeLength);

cChildOneBuffer.copyValueFromBuffer
        (pHuffmanTree[ parentNode ].codeValue,
         pHuffmanTree[ parentNode ].codeLength);

cChildOneBuffer.writeBit(1);

makeHuffmanTable(cCurrentNode);

cCurrentNode = pHuffmanTree[ parentNode ].childZero;
    pHuffmanTree[ cCurrentNode ].codeLength = cCodeLength;
    pHuffmanTree[ cCurrentNode ].codeValue = new UCHAR[ cCodeLength
];
    BIT_BUFFER cChildZeroBuffer
        (pHuffmanTree[ cCurrentNode ].codeValue , cCodeLength);

cChildZeroBuffer.copyValueFromBuffer
        (pHuffmanTree[ parentNode ].codeValue,
         pHuffmanTree[ parentNode ].codeLength);

cChildZeroBuffer.writeBit(0);
    makeHuffmanTable(cCurrentNode);

}
```

```
VOID HUFFMAN::displayLookupTables()
{
    INT i,j, k;

printf("LookupTables : \n");
    printf(" index : nextNode : wordNum : wordValue\n");
    for (i=0 ; i< (pNumberOfLeaves-1) ; i++) {
     printf("Table %3d (%d)\n", i + pNumberOfLeaves, i);
     for (j=0; j < LOOKUP_ENTRIES_NUM; j++) {
         printf("%6d : %8d : %7d : ", j,
             pLookupTables[i][j].nextNode,
             pLookupTables[i][j].wordNum);
         for (k=0; k<pLookupTables[i][j].wordNum; k++) {
          printf("%4d ", pLookupTables[i][j].wordValue[k]);
         }
         printf("\n");
     }
     printf("\n");
    }
}

LOOKUP** HUFFMAN::constructLookupTables()
{
    INT i,j;
    UCHAR cMask;
    INT cNode;
    INT cTmpWordNum;
    INT cTmpWordValue[8];
    INT cCurrentNode;

pLookupTables = new P_LOOKUP[pNumberOfLeaves-1];
    for (i=0; i<pNumberOfLeaves; i++) {
     pLookupTables[i] = new LOOKUP[LOOKUP_ENTRIES_NUM];
    } for (i=0 ; i< (pNumberOfLeaves-1) ; i++) {
     for (cNode=0; cNode < LOOKUP_ENTRIES_NUM; cNode++) {
         cCurrentNode = pNumberOfLeaves + i;
         cTmpWordNum = 0;
         cMask = 0x80;

while( cMask != 0 ) {
          if ( (UCHAR)cNode & cMask ) {
              cCurrentNode = pHuffmanTree[cCurrentNode].childOne;
          } else {
              cCurrentNode = pHuffmanTree[cCurrentNode].childZero;
          } if ( cCurrentNode < pNumberOfLeaves ) {
              cTmpWordValue[cTmpWordNum] = cCurrentNode;
```

```
            cCurrentNode = pNumberOfNodes -1;
            cTmpWordNum++;
        }
        cMask >>= 1;
    }
    pLookupTables[i][cNode].nextNode = cCurrentNode;
    if (cTmpWordNum > 0) {
        pLookupTables[i][cNode].wordNum = cTmpWordNum;
        pLookupTables[i][cNode].wordValue = new INT[cTmpWordNum];
        for (j = 0; j < cTmpWordNum; j++) {
            pLookupTables[i][cNode].wordValue[j] =
                pHuffmanTree[cTmpWordValue[j]].nodeValue;
        }
    }
        }
    }
    return pLookupTables;
} endif // HUFFMAN_C

//
// Copyright (c) 1995 The Simile Group of Cornell University.
// All rights reserved.
//
// Time: Dec. 1995
//
// Written by Toby Berger, Yi-Jen Chiu, Mikio Kawahara, Ying-Ming Tsai.
// All are at the School of Electrical Engineering of Cornell University.
//
// This files contain the source files of the Huffman coding (For the
// byte-tree look-up table decoding)
// ifndef HUFFMAN_C
define HUFFMAN_C include "Huffman.h"

HUFFMAN::~HUFFMAN()
{
    // nothing special.
}
```

```
INT HUFFMAN::getValueFromIndex(INT index)
{
    if (index%2) {
     return(-1*((index/2)*pQuantizationStep+pThreshold+1));
    } else {
     return((index/2)*pQuantizationStep+pThreshold+1);
    }
}

HUFFMAN::HUFFMAN(CHAR *fileName, INT numLeaf, INT maxCodeLength)
{
    INT i;

assert( numLeaf > 1);
    pNumberOfLeaves = numLeaf;
    pNumberOfNodes  = numLeaf + (numLeaf-1);

pNumberOfBits =   (INT)ceil(log2((DOUBLE)numLeaf + 1.0));

pHuffmanTree = new NODE[pNumberOfNodes];

for (i=0; i<pNumberOfLeaves; i++) {
     pHuffmanTree[i].nodeValue = i;
    } pHeapTree = new INT[pNumberOfLeaves+1];
    pHuffmanTreeBuffer = new BIT_BUFFER(0);

readHuffmanTableFromFile(fileName, maxCodeLength);

constructInitialHeapTreeWithCodeLength();

constructHuffmanTreeWithCodeTable();

delete []pHeapTree;
}

HUFFMAN::HUFFMAN(CHAR *fileName, INT numLeaf, INT maxCodeLength,
         INT threshold, INT quantizationStep)
{
    INT i;

assert( numLeaf > 1);
    pNumberOfLeaves = numLeaf;
    pNumberOfNodes  = numLeaf + (numLeaf-1);

pNumberOfBits =   (INT)ceil(log2((DOUBLE)numLeaf + 1.0));

pThreshold = threshold;
    pQuantizationStep = quantizationStep;
```

```
    pHuffmanTree = new NODE[pNumberOfNodes];

for (i=0; i<pNumberOfLeaves; i++) {
     pHuffmanTree[i].nodeValue = getValueFromIndex(i);
    } pHeapTree = new INT[pNumberOfLeaves+1];

pHuffmanTreeBuffer = new BIT_BUFFER(0);

readHuffmanTableFromFileIntensity(fileName, maxCodeLength);

constructInitialHeapTreeWithCodeLength();

constructHuffmanTreeWithCodeTable();

delete []pHeapTree;
}
VOID HUFFMAN::deleteHuffmanTreeBuffer()
{
    delete []pHuffmanTree;
}
VOID    HUFFMAN::readHuffmanTableFromFile(CHAR    *fileName,    INT
maxCodeLength)
{
    FILE *cFp;
    INT i, j;
    CHAR *cTmpChar;

cFp = fopen(fileName, "r");
    assert( cFp );

cTmpChar = new CHAR[maxCodeLength];
    for (i=0; i<pNumberOfLeaves; i++) {
     fscanf(cFp, "%s", cTmpChar);
     pHuffmanTree[i].codeLength = strlen(cTmpChar)+1;

pHuffmanTree[i].codeValue =                new
UCHAR[(INT)ceil((double)pHuffmanTree[i].codeLength/8.0)];

BIT_BUFFER cTmpBuffer(pHuffmanTree[i].codeValue,
                    pHuffmanTree[i].codeLength);

for (j=0; j<pHuffmanTree[i].codeLength; j++) {
            switch ((int)cTmpChar[j]) {
            case '0':
             cTmpBuffer.writeBit(0);
             break;
```

```
            case '1':
             cTmpBuffer.writeBit(1);
             break;
            default:
             cerr << "ERROR: the value of the code is incorrect\n";
             exit(1);
            }
        }
    } fclose( cFp );
}

VOID HUFFMAN::readHuffmanTableFromFileIntensity(CHAR *fileName,
                                 INT maxCodeLength)
{
    FILE *cFp;
    INT i, j;
    CHAR *cTmpChar;
    BIT_BUFFER *cTmpBuffer, *cTmpBuffer2;

cFp = fopen(fileName, "r");
    assert( cFp );

cTmpChar = new CHAR[maxCodeLength];
    i = 0;
    while (i<(pNumberOfLeaves-1)) { fscanf(cFp, "%s", cTmpChar);

pHuffmanTree[i].codeLength = strlen(cTmpChar)+1;
      pHuffmanTree[i+1].codeLength = pHuffmanTree[i].codeLength;

pHuffmanTree[i].codeValue =
                       n              e               w
UCHAR[(INT)ceil((double)(pHuffmanTree[i].codeLength)/8.0)];
      pHuffmanTree[i+1].codeValue =
                       n              e               w
UCHAR[(INT)ceil((double)(pHuffmanTree[i+1].codeLength)/8.0)];

cTmpBuffer = new BIT_BUFFER(pHuffmanTree[i].codeValue,
                       pHuffmanTree[i].codeLength);
      cTmpBuffer2 = new BIT_BUFFER(pHuffmanTree[i+1].codeValue,
                        pHuffmanTree[i+1].codeLength);

for (j=0; j<pHuffmanTree[i].codeLength -1; j++) {
          switch ((int)cTmpChar[j]) {
          case '0':
           cTmpBuffer->writeBit(0);
           cTmpBuffer2->writeBit(0);
           break;
          case '1':
```

```
            cTmpBuffer->writeBit(1);
            cTmpBuffer2->writeBit(1);
            break;
          default:
            cerr << "ERROR: the value of the code is incorrect\n";
            exit(1);
            }
      }
      cTmpBuffer->writeBit(0);
      cTmpBuffer2->writeBit(1);

delete []cTmpBuffer;
      delete []cTmpBuffer2;
      i += 2;

}
    fclose( cFp );
}

VOID HUFFMAN::displayHeapTreeWithCodeLength(INT numHeapNodes)
{
    INT i;
    BIT_BUFFER *cTmpBitBuffer;

cout << "Heap Tree : " << endl;
    for (i=1; i < numHeapNodes+1; i++) {
     printf("%3d : %3d : %3d : ", i, pHeapTree[i],
            pHuffmanTree[ pHeapTree[i] ].codeLength);
     cTmpBitBuffer = new BIT_BUFFER
            (pHuffmanTree[ pHeapTree[i] ].codeValue,
             pHuffmanTree[ pHeapTree[i] ].codeLength);
     cTmpBitBuffer->displayBuffer();
     delete cTmpBitBuffer;
    }
}

VOID HUFFMAN::displayHuffmanTree()
{
    INT i;

cout << "Huffman Tree: " << endl;
    cout << "Node : Parent : child0 : child1 : nodeVal : frequency"
<<endl;
    for (i=0; i < pNumberOfNodes; i++) { printf("%4d : %6d : %6d : %6d : %7d : %d\n", i,
            pHuffmanTree[i].parent,
            pHuffmanTree[i].childZero, pHuffmanTree[i].childOne,
            pHuffmanTree[i].nodeValue,
            pHuffmanTree[i].frequency);
    }
}
```

```
VOID HUFFMAN::downHeapWithCodeLength(INT numHeapNodes, INT i)
{
    INT j, currentHeap;

currentHeap = pHeapTree[i];

while ( (j = 2 * i) <= numHeapNodes ) {
      if ( j < numHeapNodes &&
           pHuffmanTree[ pHeapTree[j]   ].codeLength <
           pHuffmanTree[ pHeapTree[j+1] ].codeLength ) {
           j++;
      } if ( pHuffmanTree[ currentHeap ].codeLength
           >= pHuffmanTree[ pHeapTree[j] ].codeLength ) {
           break;
      } pHeapTree[ i ] = pHeapTree[ j ];
      i = j;
    }
    pHeapTree[ i ] = currentHeap;
}

VOID HUFFMAN::constructInitialHeapTreeWithCodeLength()
{
    INT i;

for ( i = 0; i < pNumberOfLeaves; i++ ) {
     pHeapTree[i+1] = i;
    } for ( i =   pNumberOfLeaves/2; i >= 1; i-- ) {
     downHeapWithCodeLength(pNumberOfLeaves, i);
    }
}

VOID HUFFMAN::constructHuffmanTreeWithCodeTable()
{
    INT    cAlphabet;
    INT    cNumHuffmanNodes;
    INT    cNumHeapNodes;
    INT    cMax1, cMax2;
    BIT_BUFFER *cTmpBuffer;
    INT    i;
    INT    cFlag;

cAlphabet = pHeapTree[1];

cNumHuffmanNodes = pNumberOfLeaves;
```

```
    cNumHeapNodes = pNumberOfLeaves;

while ( cNumHeapNodes > 1 ) {
   cMax1 = pHeapTree[1];
   pHeapTree[1] = pHeapTree[ cNumHeapNodes-- ];
   downHeapWithCodeLength(cNumHeapNodes, 1);

cMax2 = pHeapTree[1];

assert(pHuffmanTree[cMax1].codeLength ==
          pHuffmanTree[cMax2].codeLength);

if ( (pHuffmanTree[cMax2].codeLength ==
         pHuffmanTree[pHeapTree[2]].codeLength ) ||
        (pHuffmanTree[cMax2].codeLength ==
         pHuffmanTree[pHeapTree[3]].codeLength ) ) { i=0;
        cFlag = 1;
        cTmpBuffer   =   new   BIT_BUFFER(pHuffmanTree[   cMax1
].codeValue,
                         pHuffmanTree[ cMax1 ].codeLength);
        while ( cFlag ) {
         i++;
         if ( pHuffmanTree[ pHeapTree[i] ].codeLength ==
             pHuffmanTree[ cMax1 ].codeLength ) {
             if ( cTmpBuffer->compareBuffer
              (pHuffmanTree[pHeapTree[i]].codeValue,
               pHuffmanTree[ cMax1 ].codeLength-1) ) {
              cFlag = 0;
             }
         }
        } assert(pHuffmanTree[ cMax1 ].codeLength =
           pHuffmanTree[ pHeapTree[i] ].codeLength);

cMax2 = pHeapTree[i];
        pHeapTree[i] = pHeapTree[1];
   } delete cTmpBuffer;
   cAlphabet = cNumHuffmanNodes++;

pHuffmanTree[ cAlphabet ].codeLength =
     pHuffmanTree[cMax1].codeLength-1;

pHuffmanTree[ cAlphabet ].codeValue =
     new  UCHAR[ pHuffmanTree[ cAlphabet ].codeLength ];

cTmpBuffer   =   new   BIT_BUFFER(pHuffmanTree[   cAlphabet
].codeValue,
```

96

```
                              pHuffmanTree[ cAlphabet ].codeLength);
    cTmpBuffer->copyValueFromBuffer(pHuffmanTree[    cMax1
].codeValue,
                 pHuffmanTree[ cAlphabet ].codeLength);

pHeapTree[1] = cAlphabet;
    downHeapWithCodeLength(cNumHeapNodes, 1);

pHuffmanTree[ cMax1 ].parent = cAlphabet;
    pHuffmanTree[ cMax2 ].parent = cAlphabet;

BIT_BUFFER cTmpBuffer2(pHuffmanTree[cMax1].codeValue,
                pHuffmanTree[cMax1].codeLength);

if (cTmpBuffer2.getValue(pHuffmanTree[cMax1].codeLength-1)) {
        pHuffmanTree[ cAlphabet ].childOne  = cMax1;
        pHuffmanTree[ cAlphabet ].childZero = cMax2;
    } else {
        pHuffmanTree[ cAlphabet ].childZero = cMax1;
        pHuffmanTree[ cAlphabet ].childOne  = cMax2;
    }
   }
}

VOID HUFFMAN::makeHuffmanTable(INT parentNode)
{
    INT cCodeLength;
    INT cCurrentNode;

if ( parentNode < pNumberOfLeaves ) { return;
    } cCodeLength = pHuffmanTree[ parentNode ].codeLength + 1;

cCurrentNode = pHuffmanTree[ parentNode ].childOne;
    pHuffmanTree[ cCurrentNode ].codeLength = cCodeLength;
    pHuffmanTree[ cCurrentNode ].codeValue = new UCHAR[ cCodeLength
];
    BIT_BUFFER cChildOneBuffer
        (pHuffmanTree[ cCurrentNode ].codeValue , cCodeLength);

cChildOneBuffer.copyValueFromBuffer
        (pHuffmanTree[ parentNode ].codeValue,
         pHuffmanTree[ parentNode ].codeLength);

cChildOneBuffer.writeBit(1);

makeHuffmanTable(cCurrentNode);
```

```
        cCurrentNode = pHuffmanTree[ parentNode ].childZero;
        pHuffmanTree[ cCurrentNode ].codeLength = cCodeLength;
        pHuffmanTree[ cCurrentNode ].codeValue = new UCHAR[ cCodeLength
];
        BIT_BUFFER cChildZeroBuffer
           (pHuffmanTree[ cCurrentNode ].codeValue , cCodeLength);

cChildZeroBuffer.copyValueFromBuffer
           (pHuffmanTree[ parentNode ].codeValue,
            pHuffmanTree[ parentNode ].codeLength);

cChildZeroBuffer.writeBit(0);
        makeHuffmanTable(cCurrentNode);

}

VOID HUFFMAN::displayLookupTables()
{
    INT i,j, k;

printf("LookupTables : \n");
    printf(" index : nextNode : wordNum : wordValue\n");
    for (i=0 ; i< (pNumberOfLeaves-1) ; i++) {
     printf("Table %3d (%d)\n", i + pNumberOfLeaves, i);
     for (j=0; j < LOOKUP_ENTRIES_NUM; j++) {
            printf("%6d : %8d : %7d : ", j,
                pLookupTables[i][j].nextNode,
                pLookupTables[i][j].wordNum);
            for (k=0; k<pLookupTables[i][j].wordNum; k++) {
             printf("%4d ", pLookupTables[i][j].wordValue[k]);
            }
            printf("\n");
     }
     printf("\n");
    }

}

LOOKUP** HUFFMAN::constructLookupTables()
{
    INT i,j;
    UCHAR cMask;
    INT cNode;
    INT cTmpWordNum;
    INT cTmpWordValue[8];
    INT cCurrentNode;

pLookupTables = new P_LOOKUP[pNumberOfLeaves-1];
    for (i=0; i<pNumberOfLeaves; i++) {
     pLookupTables[i] = new LOOKUP[LOOKUP_ENTRIES_NUM];
    }
```

```
    for (i=0 ; i< (pNumberOfLeaves-1) ; i++) {
      for (cNode=0; cNode < LOOKUP_ENTRIES_NUM; cNode++) {
        cCurrentNode = pNumberOfLeaves + i;
        cTmpWordNum = 0;
        cMask = 0x80;

while( cMask != 0 ) {
          if ( (UCHAR)cNode & cMask ) {
             cCurrentNode = pHuffmanTree[cCurrentNode].childOne;
          } else {
             cCurrentNode = pHuffmanTree[cCurrentNode].childZero;
          } if ( cCurrentNode < pNumberOfLeaves ) {
             cTmpWordValue[cTmpWordNum] = cCurrentNode;
             cCurrentNode = pNumberOfNodes -1;
             cTmpWordNum++;
          }
          cMask >>= 1;
        }
        pLookupTables[i][cNode].nextNode = cCurrentNode;
        if (cTmpWordNum > 0) {
          pLookupTables[i][cNode].wordNum = cTmpWordNum;
          pLookupTables[i][cNode].wordValue = new INT[cTmpWordNum];
          for (j = 0; j < cTmpWordNum; j++) {
             pLookupTables[i][cNode].wordValue[j] =
               pHuffmanTree[cTmpWordValue[j]].nodeValue;
          }
        }
      }
    }
    return pLookupTables;
} endif // HUFFMAN_C
```

```
//
// Copyright (c) 1995 The Simile Group of Cornell University.
// All rights reserved.
//
// Time: Dec. 1995
//
// Written by Toby Berger, Yi-Jen Chiu, Mikio Kawahara, Ying-Ming
Tsai.
// All are at the School of Electrical Engineering of Cornell
University.
//
```

```
// This files contain the source files of the Huffman coding (For the
// byte-tree look-up table decoding)
// ifndef HUFFMAN_C
define HUFFMAN_C include "Huffman.h"

HUFFMAN::~HUFFMAN()
{
    // nothing special.
}

INT HUFFMAN::getValueFromIndex(INT index)
{
    if (index%2) {
     return(-1*((index/2)*pQuantizationStep+pThreshold+1));
    } else {
     return((index/2)*pQuantizationStep+pThreshold+1);
    }
}

HUFFMAN::HUFFMAN(CHAR *fileName, INT numLeaf, INT maxCodeLength)
{
    INT i;

assert( numLeaf > 1);
    pNumberOfLeaves = numLeaf;
    pNumberOfNodes  = numLeaf + (numLeaf-1);

pNumberOfBits =   (INT)ceil(log2((DOUBLE)numLeaf + 1.0));

pHuffmanTree = new NODE[pNumberOfNodes];

for (i=0; i<pNumberOfLeaves; i++) {
     pHuffmanTree[i].nodeValue = i;
    } pHeapTree = new INT[pNumberOfLeaves+1];
    pHuffmanTreeBuffer = new BIT_BUFFER(0);

readHuffmanTableFromFile(fileName, maxCodeLength);

constructInitialHeapTreeWithCodeLength();

constructHuffmanTreeWithCodeTable();

delete []pHeapTree;
```

```
}

HUFFMAN::HUFFMAN(CHAR *fileName, INT numLeaf, INT maxCodeLength,
        INT threshold, INT quantizationStep)
{
    INT i;

assert( numLeaf > 1);
    pNumberOfLeaves = numLeaf;
    pNumberOfNodes  = numLeaf + (numLeaf-1);

pNumberOfBits = (INT)ceil(log2((DOUBLE)numLeaf + 1.0));

pThreshold = threshold;
    pQuantizationStep = quantizationStep;

pHuffmanTree = new NODE[pNumberOfNodes];

for (i=0; i<pNumberOfLeaves; i++) {
     pHuffmanTree[i].nodeValue = getValueFromIndex(i);
    } pHeapTree = new INT[pNumberOfLeaves+1];

pHuffmanTreeBuffer = new BIT_BUFFER(0);

readHuffmanTableFromFileIntensity(fileName, maxCodeLength);

constructInitialHeapTreeWithCodeLength();

constructHuffmanTreeWithCodeTable();

delete []pHeapTree;
}

VOID HUFFMAN::deleteHuffmanTreeBuffer()
{
    delete []pHuffmanTree;
}

VOID   HUFFMAN::readHuffmanTableFromFile(CHAR    *fileName,    INT
maxCodeLength)
{
    FILE *cFp;
    INT i, j;
    CHAR *cTmpChar;

cFp = fopen(fileName, "r");
    assert( cFp );

cTmpChar = new CHAR[maxCodeLength];
    for (i=0; i<pNumberOfLeaves; i++) {
```

```
    fscanf(cFp, "%s", cTmpChar);
    pHuffmanTree[i].codeLength = strlen(cTmpChar)+1;

pHuffmanTree[i].codeValue =
                            n                e                    w
UCHAR[(INT)ceil((double)pHuffmanTree[i].codeLength/8.0)];

BIT_BUFFER cTmpBuffer(pHuffmanTree[i].codeValue,
                          pHuffmanTree[i].codeLength);

for (j=0; j<pHuffmanTree[i].codeLength; j++) {
        switch ((int)cTmpChar[j]) {
        case '0':
         cTmpBuffer.writeBit(0);
         break;
        case '1':
         cTmpBuffer.writeBit(1);
         break;
        default:
         cerr << "ERROR: the value of the code is incorrect\n";
         exit(1);
         }
    }
    } fclose( cFp );
}
VOID HUFFMAN::readHuffmanTableFromFileIntensity(CHAR *fileName,
                                INT maxCodeLength)
{
    FILE *cFp;
    INT i, j;
    CHAR *cTmpChar;
    BIT_BUFFER *cTmpBuffer, *cTmpBuffer2;

cFp = fopen(fileName, "r");
    assert( cFp );

cTmpChar = new CHAR[maxCodeLength];
    i = 0;
    while (i<(pNumberOfLeaves-1)) { fscanf(cFp, "%s", cTmpChar);

pHuffmanTree[i].codeLength = strlen(cTmpChar)+1;
     pHuffmanTree[i+1].codeLength = pHuffmanTree[i].codeLength;

pHuffmanTree[i].codeValue =
                             n                e                    w
UCHAR[(INT)ceil((double)(pHuffmanTree[i].codeLength)/8.0)];
```

```
        pHuffmanTree[i+1].codeValue =
                            n              e                w
UCHAR[(INT)ceil((double)(pHuffmanTree[i+1].codeLength)/8.0)];

cTmpBuffer = new BIT_BUFFER(pHuffmanTree[i].codeValue,
                    pHuffmanTree[i].codeLength);
    cTmpBuffer2 = new BIT_BUFFER(pHuffmanTree[i+1].codeValue,
                    pHuffmanTree[i+1].codeLength);

for (j=0; j<pHuffmanTree[i].codeLength -1; j++) {
        switch ((int)cTmpChar[j]) {
        case '0':
         cTmpBuffer->writeBit(0);
         cTmpBuffer2->writeBit(0);
         break;
        case '1':
         cTmpBuffer->writeBit(1);
         cTmpBuffer2->writeBit(1);
         break;
        default:
         cerr << "ERROR: the value of the code is incorrect\n";
         exit(1);
        }
    }
    cTmpBuffer->writeBit(0);
    cTmpBuffer2->writeBit(1);

delete []cTmpBuffer;
    delete []cTmpBuffer2;
    i += 2;

}
    fclose( cFp );
}

VOID HUFFMAN::displayHeapTreeWithCodeLength(INT numHeapNodes)
{
    INT i;
    BIT_BUFFER *cTmpBitBuffer;

cout << "Heap Tree : " << endl;
    for (i=1; i < numHeapNodes+1; i++) {
     printf("%3d : %3d : %3d : ", i, pHeapTree[i],
            pHuffmanTree[ pHeapTree[i] ].codeLength);
     cTmpBitBuffer = new BIT_BUFFER
        (pHuffmanTree[ pHeapTree[i] ].codeValue,
         pHuffmanTree[ pHeapTree[i] ].codeLength);
     cTmpBitBuffer->displayBuffer();
     delete cTmpBitBuffer;
    }
}
```

```
VOID HUFFMAN::displayHuffmanTree()
{
    INT i;

cout << "Huffman Tree: " << endl;
    cout << "Node : Parent : child0 : child1 : nodeVal : frequency"
<<endl;
    for (i=0; i < pNumberOfNodes; i++) { printf("%4d : %6d : %6d : %6d : %7d : %d\n", i,
            pHuffmanTree[i].parent,
            pHuffmanTree[i].childZero, pHuffmanTree[i].childOne,
            pHuffmanTree[i].nodeValue,
            pHuffmanTree[i].frequency);
    }
}

VOID HUFFMAN::downHeapWithCodeLength(INT numHeapNodes, INT i)
{
    INT j, currentHeap;

currentHeap = pHeapTree[i];

while ( (j = 2 * i) <= numHeapNodes ) { if ( j < numHeapNodes &&
           pHuffmanTree[ pHeapTree[j]   ].codeLength <
           pHuffmanTree[ pHeapTree[j+1] ].codeLength ) {
           j++;
      } if ( pHuffmanTree[ currentHeap ].codeLength
           >= pHuffmanTree[ pHeapTree[j] ].codeLength ) {
           break;
      } pHeapTree[ i ] = pHeapTree[ j ];
      i = j;
    }
    pHeapTree[ i ] = currentHeap;
}

VOID HUFFMAN::constructInitialHeapTreeWithCodeLength()
{
    INT i;

for ( i = 0; i < pNumberOfLeaves; i++ ) {
     pHeapTree[i+1] = i;
    } for ( i = pNumberOfLeaves/2; i >= 1; i-- ) {
```

```
        downHeapWithCodeLength(pNumberOfLeaves, i);
    }
}

VOID HUFFMAN::constructHuffmanTreeWithCodeTable()
{
    INT    cAlphabet;
    INT    cNumHuffmanNodes;
    INT    cNumHeapNodes;
    INT    cMax1, cMax2;
    BIT_BUFFER *cTmpBuffer;
    INT    i;
    INT    cFlag;

cAlphabet = pHeapTree[1];

cNumHuffmanNodes = pNumberOfLeaves;
    cNumHeapNodes = pNumberOfLeaves;

while ( cNumHeapNodes > 1 ) {
     cMax1 = pHeapTree[1];
     pHeapTree[1] = pHeapTree[ cNumHeapNodes-- ];
     downHeapWithCodeLength(cNumHeapNodes, 1);

cMax2 = pHeapTree[1];

assert(pHuffmanTree[cMax1].codeLength ==
            pHuffmanTree[cMax2].codeLength);

if ( (pHuffmanTree[cMax2].codeLength ==
            pHuffmanTree[pHeapTree[2]].codeLength ) ||
          (pHuffmanTree[cMax2].codeLength ==
            pHuffmanTree[pHeapTree[3]].codeLength ) ) { i=0;
        cFlag = 1;
        cTmpBuffer   =   new   BIT_BUFFER(pHuffmanTree[   cMax1
].codeValue,
                        pHuffmanTree[ cMax1 ].codeLength);
        while ( cFlag ) {
         i++;
         if ( pHuffmanTree[ pHeapTree[i] ].codeLength ==
              pHuffmanTree[ cMax1 ].codeLength ) {
            if ( cTmpBuffer->compareBuffer
              (pHuffmanTree[pHeapTree[i]].codeValue,
               pHuffmanTree[ cMax1 ].codeLength-1) ) {
              cFlag = 0;
            }
         }
        } assert(pHuffmanTree[ cMax1 ].codeLength =
```

```
                    pHuffmanTree[ pHeapTree[i] ].codeLength);

cMax2 = pHeapTree[i];
        pHeapTree[i] = pHeapTree[1];
    } delete cTmpBuffer;
    cAlphabet = cNumHuffmanNodes++;

pHuffmanTree[ cAlphabet ].codeLength =
        pHuffmanTree[cMax1].codeLength-1;

pHuffmanTree[ cAlphabet ].codeValue =
        new  UCHAR[ pHuffmanTree[ cAlphabet ].codeLength ];

cTmpBuffer  =   new   BIT_BUFFER(pHuffmanTree[   cAlphabet
].codeValue,
                    pHuffmanTree[ cAlphabet ].codeLength);
    cTmpBuffer->copyValueFromBuffer(pHuffmanTree[   cMax1
].codeValue,
                    pHuffmanTree[ cAlphabet ].codeLength);

pHeapTree[1] = cAlphabet;
    downHeapWithCodeLength(cNumHeapNodes, 1);

pHuffmanTree[ cMax1 ].parent = cAlphabet;
    pHuffmanTree[ cMax2 ].parent = cAlphabet;

BIT_BUFFER cTmpBuffer2(pHuffmanTree[cMax1].codeValue,
                    pHuffmanTree[cMax1].codeLength);

if (cTmpBuffer2.getValue(pHuffmanTree[cMax1].codeLength-1)) {
        pHuffmanTree[ cAlphabet ].childOne  = cMax1;
        pHuffmanTree[ cAlphabet ].childZero = cMax2;
    } else {
        pHuffmanTree[ cAlphabet ].childZero = cMax1;
        pHuffmanTree[ cAlphabet ].childOne  = cMax2;
    }
  }
}

VOID HUFFMAN::makeHuffmanTable(INT parentNode)
{
    INT cCodeLength;
    INT cCurrentNode;

if ( parentNode < pNumberOfLeaves ) { return;
    }
```

```
    cCodeLength = pHuffmanTree[ parentNode ].codeLength + 1;

cCurrentNode = pHuffmanTree[ parentNode ].childOne;
    pHuffmanTree[ cCurrentNode ].codeLength = cCodeLength;
    pHuffmanTree[ cCurrentNode ].codeValue = new UCHAR[ cCodeLength
];
    BIT_BUFFER cChildOneBuffer
        (pHuffmanTree[ cCurrentNode ].codeValue , cCodeLength);

cChildOneBuffer.copyValueFromBuffer
        (pHuffmanTree[ parentNode ].codeValue,
         pHuffmanTree[ parentNode ].codeLength);

cChildOneBuffer.writeBit(1);

makeHuffmanTable(cCurrentNode);

cCurrentNode = pHuffmanTree[ parentNode ].childZero;
    pHuffmanTree[ cCurrentNode ].codeLength = cCodeLength;
    pHuffmanTree[ cCurrentNode ].codeValue = new UCHAR[ cCodeLength
];
    BIT_BUFFER cChildZeroBuffer
        (pHuffmanTree[ cCurrentNode ].codeValue , cCodeLength);

cChildZeroBuffer.copyValueFromBuffer
        (pHuffmanTree[ parentNode ].codeValue,
         pHuffmanTree[ parentNode ].codeLength);

cChildZeroBuffer.writeBit(0);
    makeHuffmanTable(cCurrentNode);

}

VOID HUFFMAN::displayLookupTables()
{
    INT i,j, k;

printf("LookupTables : \n");
    printf(" index : nextNode : wordNum : wordValue\n");
    for (i=0 ; i< (pNumberOfLeaves-1) ; i++) {
     printf("Table %3d (%d)\n", i + pNumberOfLeaves, i);
     for (j=0; j < LOOKUP_ENTRIES_NUM; j++) {
        printf("%6d : %8d : %7d : ", j,
            pLookupTables[i][j].nextNode,
            pLookupTables[i][j].wordNum);
        for (k=0; k<pLookupTables[i][j].wordNum; k++) {
         printf("%4d ", pLookupTables[i][j].wordValue[k]);
        }
        printf("\n");
     }
     printf("\n");
    }
```

```
}

LOOKUP** HUFFMAN::constructLookupTables()
{
    INT i,j;
    UCHAR cMask;
    INT cNode;
    INT cTmpWordNum;
    INT cTmpWordValue[8];
    INT cCurrentNode;

pLookupTables = new P_LOOKUP[pNumberOfLeaves-1];
    for (i=0; i<pNumberOfLeaves; i++) {
     pLookupTables[i] = new LOOKUP[LOOKUP_ENTRIES_NUM];
    } for (i=0 ; i< (pNumberOfLeaves-1) ; i++) {
     for (cNode=0; cNode < LOOKUP_ENTRIES_NUM; cNode++) {
        cCurrentNode = pNumberOfLeaves + i;
        cTmpWordNum = 0;
        cMask = 0x80;

while( cMask != 0 ) {
         if ( (UCHAR)cNode & cMask ) {
            cCurrentNode = pHuffmanTree[cCurrentNode].childOne;
         } else {
            cCurrentNode = pHuffmanTree[cCurrentNode].childZero;
         } if ( cCurrentNode < pNumberOfLeaves ) {
            cTmpWordValue[cTmpWordNum] = cCurrentNode;
            cCurrentNode = pNumberOfNodes -1;
            cTmpWordNum++;
         }
         cMask >>= 1;
        }
        pLookupTables[i][cNode].nextNode = cCurrentNode;
        if (cTmpWordNum > 0) {
         pLookupTables[i][cNode].wordNum = cTmpWordNum;
         pLookupTables[i][cNode].wordValue = new INT[cTmpWordNum];
         for (j = 0; j < cTmpWordNum; j++) {
            pLookupTables[i][cNode].wordValue[j] =
              pHuffmanTree[cTmpWordValue[j]].nodeValue;
         }
        }
     }
    }
    return pLookupTables;
}
``` endif // HUFFMAN_C

```
//
// Copyright (c) 1995 The Simile Group of Cornell University.
// All rights reserved.
//
// Time: Dec. 1995
//
// Written by Toby Berger, Yi-Jen Chiu, Mikio Kawahara, Ying-Ming Tsai.
// All are at the School of Electrical Engineering of Cornell University.
//
// This file contains the source codes for the bit operations of the
// buffer(For the byte-tree look-up table decoding: Huffman part).
// include "bit_buffer.h"

BIT_BUFFER::BIT_BUFFER(CHAR *fileName)
{
    FILE *cFp;
    INT cFileSize = 0;
    INT cReadByte;

cFp = fopen(fileName, "r");
    assert(cFp);

fseek( cFp, 0L, 2 );

cFileSize = (INT)ftell(cFp);

rewind(cFp);

pBuffer = new UCHAR[cFileSize];
    cReadByte = fread(pBuffer, 1, cFileSize, cFp);
    assert(cReadByte = cFileSize);

fclose(cFp);

pCurrentBuffer = pBuffer;
    pMask = 0x80;    // [10000000]

pTotalByteLength = cFileSize;
    pTotalBitLength  = cFileSize*8;
    pTotalByteLeft = pTotalByteLength;
    pTotalBitLeft  = pTotalBitLength;
}
```

```
BIT_BUFFER::BIT_BUFFER(INT bitNum)
{
    assert(bitNum >= 0);

if (bitNum > 0) {
        pTotalBitLength = bitNum;
        pTotalByteLength = (INT)ceil((double)pTotalBitLength/8.0);
        pTotalBitLeft  = pTotalBitLength;
        pTotalByteLeft = pTotalByteLength;

pBuffer = new UCHAR[pTotalByteLength];
        pCurrentBuffer = pBuffer;

pMask = 0x80;
    } else {
        pTotalBitLength  = 0;
        pTotalByteLength = 0;
        pTotalBitLeft  = pBufferMallocUnit*8;
        pTotalByteLeft = pBufferMallocUnit;

pBuffer = new UCHAR[pBufferMallocUnit];
        pCurrentBuffer = pBuffer;

pMask = 0x80;
    }
}

BIT_BUFFER::BIT_BUFFER(UCHAR *outBuffer, INT bitNum)
{
    pBuffer = outBuffer;

pCurrentBuffer = pBuffer;
    pMask = 0x80;

pTotalBitLength  = bitNum;
    pTotalByteLength = (INT)ceil((double)pTotalBitLength/8.0);
    pTotalBitLeft  = pTotalBitLength;
    pTotalByteLeft = pTotalByteLength;
}

BIT_BUFFER::~BIT_BUFFER()
{
    // nothing special
}

VOID BIT_BUFFER::displayBuffer()
{
    INT i;
    BIT_BUFFER cTmpBuffer(pBuffer, pTotalBitLength);

printf("%1d", cTmpBuffer.readBit());
    for (i=1; i< pTotalBitLength; i++) {
```

```
        if (!(i%8))
          printf(" ");
        if (!(i%32))
          printf("\n");
        printf("%1d", cTmpBuffer.readBit());
      }
      printf("\n");
}

VOID BIT_BUFFER::rewindBuffer()
{
      pCurrentBuffer = pBuffer;
      pMask = 0x80;

pTotalBitLeft  = pTotalBitLength;
      pTotalByteLeft = pTotalByteLength;
}

VOID BIT_BUFFER::displayBit(INT bitValue)
{
      assert((bitValue == 0) || (bitValue == 1));

if (bitValue) {
       printf("1");
      } else {
       printf("0");
      }
}

VOID BIT_BUFFER::displayBits(ULCHAR bitValue, INT bitNum)
{
      ULCHAR cMask;

assert(bitNum > 0);
      cMask = 1L << ( bitNum - 1 );
      while ( cMask != 0 ) {
       if ( cMask & bitValue ) {
           printf("1");
       } else {
           printf("0");
       }
       cMask >>= 1;
      }
}

VOID BIT_BUFFER::writeBit(INT bitValue)
{
      assert((bitValue == 0) || (bitValue == 1));
      assert(pTotalBitLeft > 0);

if ( bitValue ) {
```

```
     *pCurrentBuffer |= pMask;
    } else {
     *pCurrentBuffer &= ~pMask;
    }
    pMask >>= 1;

if ( pMask == 0 ) {
     pCurrentBuffer++;
     pMask = 0x80;
     pTotalByteLeft--;
    }
    pTotalBitLeft--;
}

VOID BIT_BUFFER::writeBitMalloc(INT bitValue)
{
    assert((bitValue == 0) || (bitValue == 1));
    if ( pMask == 0x80 ) {
     pTotalByteLength++;
    }
    if (pTotalBitLeft < 1) {
     pTotalByteLeft += pBufferMallocUnit;
     pTotalBitLeft = pTotalByteLeft*8;
     pBuffer = (UCHAR *)realloc(pBuffer,
                    pTotalByteLength+pBufferMallocUnit);
     pCurrentBuffer = pBuffer + pTotalByteLength;
    } if ( bitValue ) {
     *pCurrentBuffer |= pMask;
    } else {
     *pCurrentBuffer &= ~pMask;
    }
    pMask >>= 1;

if ( pMask == 0 ) {
     pCurrentBuffer++;
     pMask = 0x80;
     pTotalByteLeft--;
    }
    pTotalBitLeft--;
    pTotalBitLength++;
}

VOID BIT_BUFFER::writeBits(ULCHAR bitValue, INT bitNum)
{
    ULCHAR cMask;

assert( (0< bitNum) && (bitNum < 33) );
    assert(pTotalBitLeft >= bitNum);
```

```
    cMask = 1L << ( bitNum - 1 );

while ( cMask != 0 ) {
     if ( cMask & bitValue ) {
         *pCurrentBuffer |= pMask;
     } else {
         *pCurrentBuffer &= ~pMask;
     }
     pMask >>= 1;

if ( pMask == 0 ) {
         pCurrentBuffer++;
         pMask = 0x80;
         pTotalByteLeft--;
     }
     cMask >>= 1;
     pTotalBitLeft--;
    }
}

VOID BIT_BUFFER::writeBitsMalloc(ULCHAR bitValue, INT bitNum)
{
    ULCHAR cMask;

assert( (0< bitNum) && (bitNum < 33) );
    if (pTotalBitLeft < bitNum) {
     pTotalByteLeft += pBufferMallocUnit;
     pTotalBitLeft = pTotalByteLeft*8;
     pBuffer = (UCHAR *)realloc(pBuffer,
                     pTotalByteLength+pBufferMallocUnit);
     pCurrentBuffer = pBuffer + pTotalByteLength;
    } cMask = 1L << ( bitNum - 1 );

while ( cMask != 0 ) {
     if ( pMask == 0x80 ) {
         pTotalByteLength++;
     }
     if ( cMask & bitValue ) {
         *pCurrentBuffer |= pMask;
     } else {
         *pCurrentBuffer &= ~pMask;
     }
     pMask >>= 1;

if ( pMask == 0 ) {
         pCurrentBuffer++;
         pMask = 0x80;
         pTotalByteLeft--;
     }
```

```
        cMask >>= 1;
        pTotalBitLeft--;
        pTotalBitLength++;
        }
}

INT BIT_BUFFER::readBit()
{
    INT cValue;

if (pTotalBitLeft < 1) return -1;

cValue = *pCurrentBuffer & pMask;

pMask >>= 1;

if ( pMask == 0 ) {
     pMask = 0x80;
     pCurrentBuffer++;
     pTotalByteLeft--;

}
    pTotalBitLeft--;
    return ( cValue ? 1 : 0 );
}

ULCHAR    BIT_BUFFER::readBits(INT bitNum)
{
    ULCHAR cMask;
    ULCHAR cReturnVal;

assert( (0< bitNum) && (bitNum < 33) );
    assert((pTotalBitLeft - bitNum) >= 0);

cMask = 1L << (bitNum - 1);
    cReturnVal = 0;
    while ( cMask != 0 ) {
     if ( *pCurrentBuffer & pMask ) {
         cReturnVal |= cMask;
     } cMask >>= 1;
     pMask >>= 1;

if ( pMask == 0 ) {
         pMask = 0x80;
         pCurrentBuffer++;
         pTotalByteLeft--;
     }
     pTotalBitLeft--;
    }
```

```
        return cReturnVal;
}

VOID  BIT_BUFFER::writeBufferToBuffer(UCHAR *outBuffer)
{
    INT i;

for(i = 0; i<pTotalByteLength; i++) {
     outBuffer[i] = pBuffer[i];
     }
}

VOID  BIT_BUFFER::resetBuffer()
{
    memset((CHAR *)pBuffer, 0, pTotalByteLength);

pCurrentBuffer = pBuffer;
    pMask = 0x80;

pTotalByteLeft = pTotalByteLength;
    pTotalBitLeft  = pTotalBitLength;

}

VOID BIT_BUFFER::copyValueFromBuffer(UCHAR *originalBuffer, INT
bitNum)
{
    INT i;

assert( pTotalBitLeft >= bitNum );

i = 0;
    while ( bitNum > 0 ) {
     if ( bitNum > 7 ) {
         writeBits(originalBuffer[i], 8);
     } else {
         writeBits(originalBuffer[i] >> (8-bitNum), bitNum);
     }
     i++;
     bitNum -= 8;
     }
}

INT BIT_BUFFER::compareBuffer(UCHAR *referenceBuffer, INT bitNum)
{
    INT i;
    UCHAR *cBackupCurrentBuffer;
    UCHAR cBackupMask;
    INT   cBackupTotalBitLeft;
    INT   cBackupTotalByteLeft;

assert( pTotalBitLeft >= bitNum );
```

```
    cBackupCurrentBuffer = pCurrentBuffer;
    cBackupMask = pMask;
    cBackupTotalBitLeft = pTotalBitLeft;
    cBackupTotalByteLeft = pTotalByteLeft;

rewindBuffer();

i = 0;
    while ( bitNum > 0 ) {
      if ( bitNum > 7 ) {
          if ((UCHAR)readBits(8) != referenceBuffer[i]) {
            pCurrentBuffer = cBackupCurrentBuffer;
            pMask = cBackupMask;
            pTotalBitLeft = cBackupTotalBitLeft;
            pTotalByteLeft = cBackupTotalByteLeft;
            return 0;
          }
      } else {
            if    ((UCHAR)readBits(bitNum)   !=(referenceBuffer[i]   >>
(8-bitNum))){
            pCurrentBuffer = cBackupCurrentBuffer;
            pMask = cBackupMask;
            pTotalBitLeft = cBackupTotalBitLeft;
            pTotalByteLeft = cBackupTotalByteLeft;
            return 0;
          }
      }
      i++;
      bitNum -= 8;
    } pCurrentBuffer = cBackupCurrentBuffer;
    pMask = cBackupMask;
    pTotalBitLeft = cBackupTotalBitLeft;
    pTotalByteLeft = cBackupTotalByteLeft;
    return 1;
}

INT BIT_BUFFER::getValue(INT bitNum)
{
    INT cTmpByte;
    INT cTmpMask = 0x80;
    INT cValue;

assert(bitNum >= 0);
    assert(bitNum < pTotalBitLength);

cTmpByte = bitNum/8;
    cTmpMask >>= (bitNum - cTmpByte*8);
    cValue = pBuffer[cTmpByte] & cTmpMask;

return ( cValue ? 1 : 0 );
```

}

```
//
// Copyright (c) 1995 The Simile Group of Cornell University.
// All rights reserved.
//
// Time: Dec. 1995
//
// Written by Toby Berger, Yi-Jen Chiu, Mikio Kawahara, Ying-Ming
Tsai.
// All are at the School of Electrical Engineering of Cornell
University.
//
// This file contains the header of the bit_buffer.C. (For the
// byte-tree look-up decoding: Huffman part).
// ifndef BIT_BUFFER_H
define BIT_BUFFER_H include "misc.h"

define BIT_READ_BUFFER   BIT_BUFFER
#define BIT_WRITE_BUFFER  BIT_BUFFER

CONST INT pBufferMallocUnit = 64;

class BIT_BUFFER {
public:
    BIT_BUFFER(CHAR *fileName);
    BIT_BUFFER(UCHAR *outBuffer, INT bitNum);

BIT_BUFFER(INT bitNum);

~BIT_BUFFER();
    VOID writeBit(INT bitValue);
    VOID writeBit(INT bitValue, INT bitNum);
    VOID writeBits(ULCHAR bitValue, INT bitNum);
    VOID writeBitMalloc(INT bitValue);
    VOID writeBitsMalloc(ULCHAR bitValue, INT bitNum);
    INT     readBit();
    ULCHAR  readBits(INT bitNum);
    VOID    rewindBuffer();
    VOID    copyValueFromBuffer(UCHAR *originalBuffer, INT
bitNum);
    INT     compareBuffer(UCHAR *referenceBuffer, INT bitNum);
    VOID    writeBufferToBuffer(UCHAR *outBuffer);
    VOID    resetBuffer();
    VOID    displayBuffer();
    VOID displayBit(INT bitValue);
```

```
        VOID    displayBits(ULCHAR bitValue, INT bitNum);
        INT     getValue(INT bitNum);

private:
        UCHAR       *pBuffer;
        UCHAR       *pCurrentBuffer;
        UCHAR        pMask;
        INT          pTotalBitLength;
        INT          pTotalByteLength;
        INT          pTotalBitLeft;
        INT          pTotalByteLeft;
};

#endif /* BIT_BUFFER_H */

//
// Copyright (c) 1995 The Simile Group of Cornell University.
// All rights reserved.
//
// Time: Dec. 1995
//
// Written by Toby Berger, Yi-Jen Chiu, Mikio Kawahara, Ying-Ming Tsai.
// All are at the School of Electrical Engineering of Cornell University.
//
//    This    file    contains    some    micellaneous    definition(For decoder_patent.C)
// ifndef MISC_H
define MISC_H include <CC/iostream.h>
include <assert.h>
#include <stdio.h>
#include <stdlib.h>
#include <string.h>
#include <math.h>
#include <memory.h>

/* type definitions */
#define STATIC               static
define CONST                const typedef void                 VOID;
typedef unsigned char        BYTE, *PBYTE;
typedef unsigned char        UCHAR;
```

```
typedef unsigned short int    WORD;
typedef unsigned long         ULCHAR;
typedef char                  CHAR;
typedef short int             SHORT;
typedef long int              LONG;
typedef int                   INT;
typedef float                 FLOAT;
typedef double                DOUBLE;

#endif /* MISC_H */
```

```
//
// Copyright (c) 1995 The Simile Group of Cornell University.
// All rights reserved.
//
// Time: Dec. 1995
//
// Written by Toby Berger, Yi-Jen Chiu, Mikio Kawahara, Ying-Ming
Tsai.
// All are at the School of Electrical Engineering of Cornell
University.
//
// This file contains the codetable of the pixel intensity(For the
// byte-tree look_up table decoding). It needs to be adjusted for
the
// different zeroout threshold and quantization step.
//

0
10
110
1110
11110
111110
1111110
11111110
111111110
1111111110
11111111110
111111111110
1111111111110
11111111111110
111111111111110
1111111111111110
11111111111111110
111111111111111110
1111111111111111110
```

```
1111111111111111110
1111111111111111110
1111111111111111110
11111111111111111110
11111111111111111110
111111111111111111110
1111111111111111111110
11111111111111111111110
111111111111111111111110
1111111111111111111111110
11111111111111111111111110
111111111111111111111111110
1111111111111111111111111110
11111111111111111111111111110
111111111111111111111111111110
1111111111111111111111111111110
11111111111111111111111111111110
111111111111111111111111111111110
1111111111111111111111111111111110
11111111111111111111111111111111110
111111111111111111111111111111111111
```

What is claimed is:

1. A method for compressing digital image data comprising the steps of:
   a) generating a plurality of pixel intensity data words, each of which corresponds to a pixel in a digital image having an intensity magnitude that is above or equal to a threshold value;
   b) forming a set of pixel locations, each of which corresponds to one of said pixel intensity data words;
   c) assigning a digital value to each pixel location in said set of pixel locations, said digital value being the same for all pixel locations in said set; and
   d) compressing said digital image by using a facsimile-based encoding technique to encode only said pixel locations which have been assigned said digital value.

2. The method of claim 1, further comprising the step of:
   e) compressing each of said pixel intensity data words corresponding to said set of pixel locations by lossless encoding of said pixel intensity data words.

3. The method of claim 2, further comprising the step of:
   f) quantizing the pixel intensity data words corresponding to said set of pixel locations prior to compressing said data words by separating said data words into a plurality of groups, each group containing pixel intensity data words having magnitudes within a corresponding preset range of values, and assigning a different, discrete intensity value for each group of data words.

4. The method of claim 1, further comprising the step of:
   e) thinning said set of pixel locations to form a reduced set of pixel locations by deleting a number of said pixel locations from said set based upon predetermined properties of said pixel locations.

5. The method of claim 1, wherein said step of compressing further comprises compressing the digital values for said set of pixel locations by encoding said values using an encoding technique that is based on an international facsimile standard selected from the group comprising Group 3, Group 4 and JBIG.

6. The method of claim 1, wherein said step of generating further comprises adjusting said threshold value to control the number of pixel locations in said set, and thereby controlling the amount of data generated during said step of compressing.

7. The method of claim 6, further comprising providing a sequence of digital images to be compressed, and wherein said step of generating further comprises employing a fixed threshold for each image in said sequence, but adjusting said threshold value from image to image to control the number of pixel locations in said set, and thereby control the amount of data generated during said step of compressing.

8. The method of claim 6, wherein said step of generating further comprises adjusting said threshold value from pixel to pixel in said image.

9. The method of claim 8, wherein:
   1) said step of generating further comprises providing a sequence of digital images to be compressed and forming a corresponding plurality of computed approximations of said digital images, each said approximation being formed from a plurality of pixel intensity data words; and
   2) calculating said threshold value at each pixel in each said image from the values of at least one of said pixel intensity data words at predetermined reference pixels in said computed approximation of at least one previous image in said sequence.

10. The method of claim 1, wherein said step of generating further comprises:
   1) providing a sequence of digital video image frames, each said image frame being formed from a plurality of pixel intensity data words;
   2) forming said digital image as a difference frame by subtracting the pixel intensity data words in a computed approximation of a previous frame in said sequence from the corresponding pixel intensity data words in said current frame in said sequence; and
   3) forming a computed approximation of the current frame in said sequence by adding any pixel intensity data words in said difference frame which are above or equal to said threshold value to the corresponding pixel intensity data words in said computed approximation of a previous frame in said sequence.

11. The method of claim 10, wherein said difference frame is further formed by:
   1) performing a motion estimation operation on said computed approximation of a previous frame to form a motion compensated digital image frame comprised of a plurality of pixel intensity data words, each of which approximates the intensity at the corresponding pixel location in said current frame; and
   2) forming said difference frame by subtracting said motion compensated digital image frame from said current frame.

12. The method of claim 10, further comprising the step of adjusting said threshold value based on a histogram of the differences generated during said subtraction, the threshold value employed during the previous frame, and the number of pixel locations in said set for the previous frame, to regulate the number of pixel locations in said first set on a frame-by-frame basis.

13. The method of claim 10, further comprising adjusting said threshold value from pixel to pixel within each frame of said sequence.

14. The method of claim 13, further comprising calculating the threshold value at each pixel in each frame from the values of at least one pixel intensity data word in at least one previous frame at predetermined reference pixels.

15. The method of claim 1, wherein said step of generating further comprises:
   1) providing a sequence of digital video image frames, each said image frame being formed from a plurality of pixel intensity data words; and
   2) forming a sequence of digital images from said sequence of digital video image frames.

16. The method of claim 15, wherein said step of forming a sequence of digital video images further comprises:
   i) forming each of a first plurality of said digital images as a difference frame by subtracting the pixel intensity data words in a computed approximation of a current frame in said sequence from the corresponding pixel intensity data words in said current frame in said sequence; and
   ii) forming at least one other of said digital images as an intraframe directly from a corresponding one of said digital video image frames.

17. The method of claim 15, wherein said step of forming said sequence of digital images further comprises forming each said image in said sequence as a difference frame, and for each said image in which the number of above threshold value pixel data words in a corresponding difference frame is above a predetermined number, replacing said difference frame with an intraframe representation of said image.

18. The method of claim 15, wherein said step of compressing further comprises compressing the digital values for said set of pixel locations by encoding said values using an encoding technique that is based on an international facsimile standard selected from the group comprising Group 3, Group 4 and JBIG.

19. The method of claim 1, wherein said step of generating further comprises:
1) providing an unfiltered digital image, said unfiltered image being comprised of a plurality of pixel intensity data words, each of which corresponds to intensity of a corresponding pixel location in said digital video image;
2) spatially filtering said unfiltered digital image to form a filtered digital image, said filtered digital image being comprised of a second plurality of pixel intensity data words, each of which corresponds to an intensity of a corresponding pixel location in said filtered digital image; and
3) forming said digital image by comparing the value of each pixel intensity data word in said unfiltered image to the value of each said corresponding pixel intensity data word in said filtered image to form a plurality of difference values, one for each pixel in said digital image, and for all pixels having a difference value magnitude below a predetermined value, assigning the corresponding pixel data word in said filtered image to each corresponding pixel, and for all pixels in said digital image having a difference value magnitude above said predetermined value, assigning a pixel intensity data word to each corresponding pixel having a value between the value of the corresponding pixel intensity data word in said filtered image and the value of the corresponding pixel data word in said unfiltered image.

20. The method of claim 10, wherein said step of forming said digital image further comprises:
i) generating a spatially filtered version of said difference frame;
ii) comparing said spatially filtered difference frame to said difference frame; and
iii) replacing each said pixel intensity data word in said difference frame with a corresponding pixel intensity data word in said spatially filtered difference frame if the value of said pixel intensity data word in said spatially filtered difference frame differs from the value of the corresponding pixel intensity data word in said difference frame by less than a predetermined amount.

21. The method of claim 20, further comprising replacing each pixel intensity data word in said difference frame in which the corresponding pixel intensity data word in said spatially filtered difference frame differs by more than said predetermined amount, by a pixel intensity data word having a value between the values of the corresponding pixel intensity data words in said difference frame and said spatially filtered difference frame.

22. The method of claim 10, wherein said step of compressing further comprises compressing said set of pixel locations with a facsimile-based encoding technique that uses reference pixels selected from at least one previously formed difference frame of said sequence.

23. The method of claim 22, wherein said facsimile-based encoding technique is based on an international facsimile standard selected from the group comprising Group 4 and JBIG.

24. The method of claim 1, wherein said step of generating further comprises:
1) providing a sequence of digital video image frames, each said image frame being formed from a plurality of pixel intensity data words;
2) generating a computed approximation of a current frame in said sequence, said computed approximation being formed of a plurality of pixel intensity data words;
3) generating a spatially filtered version of said computed approximation of said current frame, said spatially filtered version also being formed of a plurality of pixel intensity data words;
4) comparing said spatially filtered version to said computed approximation of said current frame; and
5) for each pixel intensity data word in said spatially filtered version which differs from the value of the corresponding pixel intensity data word in said computed approximation by less than a predetermined amount, replacing each said pixel intensity data word in said computed approximation with the corresponding pixel intensity data word in said spatially filtered version.

25. The method of claim 24, further comprising replacing each pixel intensity data word in said computed approximation in which the corresponding pixel intensity data word in said spatially filtered version differs by more than said predetermined amount, by a pixel intensity data word having a value between the values of the corresponding pixel intensity data words in said computed approximation and said spatially filtered version.

26. The method of claim 10, further comprising the steps of:
4) compressing each of said pixel intensity data words corresponding to said set of pixel locations by losslessly encoding said pixel intensity data words; and
5) losslessly decoding said compressed pixel intensity data words and forming a computed approximation of the current frame in said sequence by adding the at or above-threshold pixel intensity data words in a current difference frame to the corresponding pixel intensity data words in said computed approximation of a previous frame in said sequence.

27. A method for decompressing digital image data which has been compressed using a facsimile-based compressing technique comprising the steps of:
a) receiving digital image data to be decompressed, said data including:
1) a plurality of losslessly compressed pixel intensity data words, each of which corresponds to an intensity of a corresponding pixel location in a digital image having an intensity that is above or equal to a threshold value; and
2) a plurality of facsimile-based compressed single valued pixel location data words, each of which identifies the location in said image of a pixel corresponding to one of said pixel intensity data words;
b) losslessly decompressing said compressed pixel intensity data words;
c) decompressing said pixel location delta words using a facsimile-based decompression technique; and
d) combining said decompressed pixel intensity and location data words and information from a previously reconstructed image to reconstruct said digital image.

28. A system for compressing digital image data comprising:
a) means for generating at least one digital image, said image being formed of a plurality of pixel intensity data words which correspond to the intensities of each pixel in an image, b) thresholding means for comparing each pixel intensity data word in said image with a threshold value and forming a set of pixel locations corresponding to pixel intensity data words having magnitudes greater than or equal to said threshold value, each pixel location in said set being assigned the same digital value; and c) facsimile-based encoding means for compressing said digital image by encoding only said pixel locations which have been assigned said digital value.

29. The system of claim 28, further comprising:

d) lossless encoding means for compressing each of said pixel intensity data words having magnitudes greater than or equal to said threshold value.

30. The system of claim 29, further comprising:

e) quantizer means disposed between said thresholding means and said lossless encoder means for quantizing said pixel intensity data words having magnitudes greater than or equal to said threshold value by separating said data words into a plurality of groups, each group containing pixel intensity data words having magnitudes within a corresponding preset range of values, and assigning a different, discrete intensity value for each group of data words prior to being compressed by said lossless encoder means.

31. The system of claim 28, further comprising:

d) thinner means disposed between said thresholding means and said facsimile-based encoding means for thinning said set of pixel locations to form a reduced set of pixel locations by deleting a number of said pixel locations from said set based upon predetermined properties of said pixel locations.

32. The system of claim 28, wherein said facsimile-based encoding means employs an encoding technique that is based on an international facsimile standard selected from the group comprising Group 3, Group 4 and JBIG.

33. The system of claim 28, wherein said thresholding means further includes means for adjusting said threshold value to control the number of pixel locations in said set, and thereby control the amount of data generated by said facsimile-based encoding means.

34. The system of claim 33, wherein said means for adjusting said threshold value further includes means for adjusting said threshold value from image to image.

35. The system of claim 33, wherein said means for adjusting said threshold value further comprises means for adjusting said threshold value from pixel to pixel in said image.

36. The system of claim 28, wherein said means for generating at least one digital image further comprises:

1) means for receiving at least one digital video image to be compressed;

2) means for forming a computed approximation of said received digital video image; and 3) means for subtracting said computed approximation from said received digital video image to generate said digital image to be compressed.

37. The system of claim 36, wherein said means for generating a computed approximation of said received digital video image further comprises:

i) means for storing a previously received digital video image; and ii) means for performing a motion estimation operation on said previously received digital video image to form said computed approximation of said received digital video image.

38. The system of claim 28, further comprising:

d) means for storing said set of pixel locations to form a stored set of pixel locations; and e) frame delay means for supplying said stored set of pixel locations to said facsimile-based encoding means for enabling said facsimile-based encoding means to compress more efficiently a set of pixel locations corresponding to a later received digital image.

39. The system of claim 29, wherein said system further comprises:

e) facsimile-based decoding means for decompressing the compressed digital values for said set of pixel locations generated by said facsimile-based encoding means;

f) lossless decoder means for decompressing the compressed pixel intensity data words generated by said lossless encoding means; and g) means for combining said decompressed digital values for said set of pixel locations and said decompressed pixel intensity data words and reforming said at least one digital image.

40. A system for decompressing compressed digital image data comprising:

a) means for receiving digital image delta to be decompressed, said data including:

1) a plurality of losslessly compressed pixel intensity data words, each of which corresponds to an intensity of a corresponding pixel location in a digital image having an intensity that is above or equal to a threshold value; and 2) a plurality of facsimile based compressed single valued pixel location data words, each of which identifies the location in said image of a pixel corresponding to one of said pixel intensity data words;

b) facsimile-based decoding means for decompressing the compressed digital values for said set of pixel locations generated by said facsimile-based encoding means;

c) lossless decoder means for decompressing the compressed pixel intensity data words generated by said lossless encoding means; and d) means for combining said decompressed digital values for said set of pixel locations, said decompressed pixel intensity data words and information from a previously reconstructed image to reconstruct said at least one digital image.

41. The system of claim 40, wherein said means for combining further comprises:

1) a frame store for storing a previously decompressed digital image; and 2) an adder for combining information in said frame store with said decompressed digital values for said set of pixel locations and pixel intensity data words to reconstruct said at least one digital image.

42. The system of claim 40, wherein said facsimile-based decoding means further includes means for decompressing the compressed digital values for said set of pixel locations by employing pixel location and value information for at least one previously reconstructed image, and means for decompressing the compressed digital values for said set of pixel locations by employing said information for said previously reconstructed image.

43. The system of claim 40, wherein said means for combining further comprises means for combining said decompressed digital values for said set of pixel locations, said decompressed pixel intensity data words, information from a previously reconstructed image and motion estimation information to reconstruct said at least one digital image.

44. The method of claim 27, wherein said step of combining said decompressed pixel intensity and location data words, and information from a previously reconstructed image to reconstruct said digital image further comprises:

1) combining said decompressed pixel intensity and location data words to form a difference frame approximation; and
2) adding said difference frame approximation to a previously reconstructed frame to reconstruct said digital image.

45. The method of claim 27, wherein said step of decompressing said pixel location data words further comprises:

1) obtaining information relating to a previously reconstructed digital image; and
2) employing said obtained information in combination with said pixel location data words to decompress said pixel location data words using a facsimile-based decompression technique.

46. The method of claim 27, wherein said step of combining further comprises combining said decompressed pixel intensity and location data words with motion estimation information and information from a previously reconstructed image to reconstruct said digital image.

* * * * *

UNITED STATES PATENT AND TRADEMARK OFFICE
CERTIFICATE OF CORRECTION

PATENT NO. : 5,740,278
DATED : April 14, 1998
INVENTOR(S) : Toby Berger, et. al.

It is certified that error appears in the above-indentified patent and that said Letters Patent is hereby corrected as shown below:

Col. 162, line 23
 replace "digital image delta"
 with --digital image data--.

Signed and Sealed this

Twenty-fifth Day of August, 1998

Attest:

BRUCE LEHMAN

*Attesting Officer*     *Commissioner of Patents and Trademarks*